(12) United States Patent
Kight et al.

(10) Patent No.: US 7,146,338 B2
(45) Date of Patent: Dec. 5, 2006

(54) INTER-NETWORK FINANCIAL SERVICE

(75) Inventors: Peter Kight, Alpharetta, GA (US); Ravi Ganesan, Norcross, GA (US); Matt Lewis, Atlanta, GA (US); Kenneth Hobday, Powell, OH (US); Hans Dreyer, Gahanna, OH (US)

(73) Assignee: CheckFree Services Corporation, Norcross, GA (US)

( * ) Notice: Subject to any disclaimer, the term of this patent is extended or adjusted under 35 U.S.C. 154(b) by 882 days.

(21) Appl. No.: 09/892,897

(22) Filed: Jun. 28, 2001

(65) Prior Publication Data
US 2003/0004867 A1    Jan. 2, 2003

(51) Int. Cl.
*G06Q 40/00* (2006.01)
(52) U.S. Cl. ............................. 705/42; 705/35; 705/40
(58) Field of Classification Search .................. 705/39, 705/40, 42, 44; 795/35, 40, 42
See application file for complete search history.

(56) References Cited

U.S. PATENT DOCUMENTS 5,424,938 A * 6/1995 Wagner et al. ................ 705/42

6,173,272 B1 * 1/2001 Thomas et al. ............... 705/42

FOREIGN PATENT DOCUMENTS

EP         1229480 A1 *  8/2002

OTHER PUBLICATIONS

"Banking and Finance: China Leaps Forward in Financial Systems", Industries in Transition, v 23, n3, Jul. 1995.*
"EFT Digest: MAC Forms Alliances With the Competition", Bank Networks News, Jul. 26, 1993.*

* cited by examiner

*Primary Examiner*—James A Kramer
(74) *Attorney, Agent, or Firm*—Sutherland Asbill & Brennan LLP

(57) ABSTRACT

The present invention provides a method and system for making inter-network payments. A payment request to make a payment on behalf of a payer to a payee is received. A first payment service provider receives this request. The payment is directed to a payee that is associated with a second payment service provider. The first payment service provider determines the identity of the second payment service provider and transmits a payment instruction to the second payment service provider to complete the payment.

50 Claims, 26 Drawing Sheets

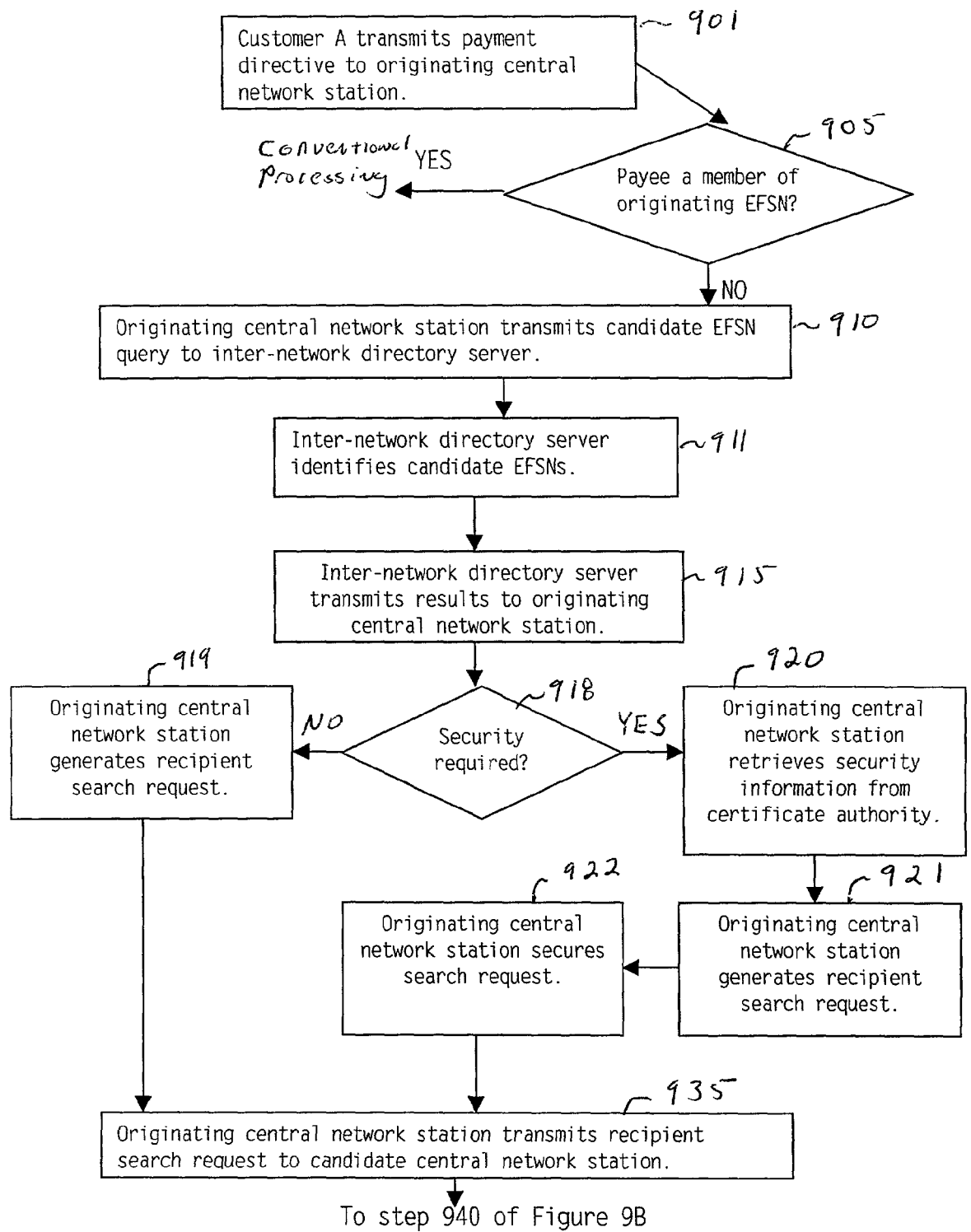
FIRURE 9A

INTER-NETWORK FINANCIAL SERVICE

TECHNICAL FIELD

The present invention relates generally to electronic financial services and more particularly to interoperability among distinct and separate electronic financial service networks.

BACKGROUND ART

FIG. 1A is a generalized exemplary depiction of a conventional electronic financial service network 100. In a most basic form, such a network typically comprises a central network station 101 in communication with multiple user network stations 110A–110N. Network users, who are customers of the financial service network 100, direct the central network station 101 to perform or facilitate financial transactions and/or services on their behalf. These directions are made via user network stations 110A–110N. A user network station is typically a personal computer, though it could be another type device. Another type device could be, but is not limited to, a telephone, a personal digital assistant, a set top box, or a computing device even more powerful than a personal computer. The financial transactions and services typically include, but are not limited to, bill and/or invoice presentment, bill and/or invoice payment, investment services, person-to-person payments, transmissions of financial information, home banking transactions, and purchase transactions. The central network station 101 conventionally maintains a central repository of information relating to services and transactions performed and/or facilitated and disseminates portions of this information to and between respective participants in the network 100, including those associated with user network stations 110A–110N as well as other participants to be discussed below. In providing and/or facilitating some electronic financial services, the central network station 101 causes funds to move among and between deposit accounts associated with various ones of the network users and a deposit account associated with the central network station 101 maintained at a financial institution (FI) 103. Additionally, other types of accounts are often used to move funds, such as stored value accounts and credit accounts.

Each of the user network stations 110A–110N communicates with the central network station 101 via a communication link 190A–190N. A communication link can be established via, but is not limited to, conventional dial-up phone service, wireless phone service, including digital, analog and hybrid systems, an intranet, an extranet, a LAN, a WAN, and the Internet. Additionally, two or more of the user network stations 110A–110N often communicate directly with one another via a communication link. For example, as shown in FIG. 1A, user network stations 110A and 110B communicate with one another via communication link 190D. Communications between a user network station and the central network station, as well as between user network stations, can be made in several forms. They can be real-time communications, also known as in-session communications, they can be made by asynchronous messaging, or they can be made by asynchronous batch file transmission and processing.

Oftentimes two or more user network stations communicate with one another via the central network station. For example, user network stations 110C and 110N communicate with one another via communication links 190C and 190N, with the communications traveling through the central network station 101. The communications between user network stations are often the basis of the financial transactions and/or services performed or facilitated by the central network station 101. These communications include purchase agreements, investment agreements, as well as other agreements relating to financial matters. It should also be noted that communications between network users not made via user network stations can also be the basis of the financial transactions and/or services performed or facilitated by the central network station 101. Network users include, but are not limited to, individuals, businesses, educational institutions, and other organizations.

FIG. 1B is a further depiction of the conventional electronic financial service network 100 of FIG. 1A. FIG. 1B shows additional participants often found in conventional electronic financial service networks, as well as communication links between and among the additional and prior depicted network participants. It should be understood that not all conventional electronic financial service networks include each of the types of participants depicted in FIG. 1B. Furthermore, not all electronic financial service networks provide the same services. The exemplary electronic financial service network 100 includes a customer service provider 105 (CSP), a postal service 170, a biller service provider 112 (BSP), additional user network stations, multiple biller network stations 115A–115N, and a seller network station 118. It will be appreciated that a biller and a seller are each network users. Furthermore, network stations associated with billers and sellers are, for clarity, labeled biller network stations and seller network stations to highlight their associated network user's roles in the electronic financial service network 100. It also will be appreciated that a given network user could have multiple roles. That is, a biller could also be a payer, and so on.

A consumer service provider 105 provides interface access to the central network station 101, and thus network 100, for some network users. A bank or other financial or investment institution is often a consumer service provider. A CSP is also known as a portal. Additionally, a CSP can also offer services to a network user beyond those offered by the central network station 101. Oftentimes the central network station 101 operates behind the scenes in relation to CSP 105. That is, the central network station 101 provides the functionality to provide and/or facilitate financial transactions and/or services, while CSP 105 controls the presentation of such functionality to a network user.

Billers, who access network 100 through biller network stations 115A–115N, often electronically present their customer's bills or invoices for services rendered and/or products sold. This can be for services and/or products sold via network 100, or sold via other methods. The central network station 100 typically receives billing information from billers and then presents either summary or complete billing information to payers. Billers also often receive remittance advice via network 100 for payment of bills, both those presented via network 100, and those only paid via network 100. A biller's access to the central network station 101 is sometimes through a BSP 112 which processes bills for several billers.

The FI 103, introduced above, provides access to at least one financial institution network, including the Automated Clearing House (ACH) network or FEDWIRE network, for financial transactions performed or facilitated by the central network station 101. FI 103 also hosts at least one deposit account associated with network 100. The financial institution also provides other services for the network 100, including settlement and treasury functions. As shown in FIG. 1B, central processor 101 also directly accesses other type financial networks. These networks include credit card networks and ATM/POS networks.

A postal service 170 performs delivery of goods purchased by network users and tracks the movement of these goods, often in concert with central network station 101. A postal service is a participant in payment-on-delivery transactions.

Introduced above, the central network station 101 causes movement of funds between and among deposit accounts. These funds movements are either by paper movement or electronic movement. Paper movement of funds includes checks and drafts prepared under the direction of the central station 101. These checks or drafts may be drawn on an account associated with the central network station 101 and payable to a payee designated by a network user. Or, these checks or drafts may be drawn on an account maintained at a financial institution associated with a network user and payable to a payee designated by a network user or deposited into an account associated with the central network station 101.

Electronic movement of funds is also by direction of the central network station 101. As introduced above, the central network station 101 is associated with a financial institution 103 that performs electronic movement of funds on behalf of the central network station 101. Like paper movement of funds, electronic movement of funds may originate from an account associated with the central network station 101, or may originate from an account associated with a network user. A network user must provide account information to the central network station 101 so that the central network station 101 can access that network user's account, whether the access is electronic or paper.

Some electronic financial service networks are closed systems. In a closed system, funds only move among and between individuals or entities that have a pre-established relationship with the central network station of the respective network. Additionally, information typically flows exclusively electronically in closed systems. Individuals and entities with pre-established relationships with a central network station are known as registered users. In these closed systems, funds can move either electronically or by paper, though preferably electronically. Other electronic financial service networks are open systems. In an open system, funds can move not only among and between registered users, but also to unregistered recipients. For movement to an unregistered recipient, funds must move by paper methods, as a central network station directing the transaction does not have access to the recipient's account. Also, information directed to unregistered recipients moves via paper. Furthermore, some electronic financial service networks are hybrid systems. For example, a given electronic financial service network could be an open system for payments, while the same network could be a closed system for bill presentment. That is, network users of such a network are enabled to pay anyone, while they can only receive bills form a closed list of billers.

It will be recognized by one skilled in the art that electronic movement of funds is more efficient than paper movement of funds. This efficiency arises because of at least two reasons. First, the cost per transaction is less for electronic movement than paper movement. Second, electronic movements require less time to complete than paper movements. Likewise, it will be recognized that electronic movement of information is also more efficient than paper movement of information.

FIG. 2 shows a plurality of electronic financial service networks 200A–200N existing separately. Each of these networks provides one or more of the services described above to network participants who are registered customers with a respective one of the networks 200A–200N. A network participant utilizes the services of an electronic financial service network by interacting with a central network station 205A–205N utilizing a participant network station 210A–210N. A network participant can make payments, receive bills, make purchases, make sells, and perform other financial transactions utilizing a participant network station.

Each electronic financial service network 200A–200N has a customer base of network participants. An electronic financial service network provides value to its customer base by servicing customers' needs in providing and/or facilitating transactions. The broader a range of service a given electronic financial service network can provide, the more valuable the electronic financial service network becomes. A broad range of service is, at least in part, a function of the size of a customer base. The larger a customer base is, the larger the number of network participants with which an electronic financial service network can perform and/or facilitate financial transactions and/or services for a given customer. If an electronic financial service network could extend its reach to other electronic financial service networks, that electronic financial service network would be able to offer a broader range of service to its customer base. That is, the potential numbers of customers with which a given customer could interact would be increased. A broad range of service is also a function of a business decision made by the operator of an electronic financial service network as to the types of financial transactions and/or services performed and/or facilitated by the network. For a first electronic financial service network that does not offer a certain type of financial transaction or service, if that network could extend its reach to a second electronic financial service network which does offer that financial transaction or service, the first electronic financial service network could offer that financial transaction or service to its customers through the second network, thus offering a broader range of service to its customer base. Accordingly, a need exists for a technique whereby an electronic financial service network can provide greater value to its customer base by extending its reach to other electronic financial service networks.

The communications between the participant network stations and the central network stations of each of the networks 200A–200N are performed according to at least one of a real-time interface specification, an asynchronous batch interface specification, or an asynchronous messaging interface specification. These interface specifications are often based upon one of several industry standard or proprietary interface specifications, including BAI, ACH, OFX, GOLD, IFX, and SIS/RPP. Networks that base interface specifications on industry standards often modify the standard to support different functionality, and often these extensions are proprietary. Furthermore, some networks utilize interface specifications that are entirely proprietary. These interface specifications are typically incompatible with one another. As such, there is currently very little electronic interchange of financial transactions and/or information between existing electronic financial service networks. Accordingly, a need exists for a technique that facilitates the flow of electronic financial transactions and/or information between different electronic financial service networks.

One proposed solution addressing this problem is found in Electronic Bill Presentment and Payment Exchange to Wallace et al., U.S. application Ser. No. 09/515,495, which is assigned to the assignee of the present invention. This solution addresses the problem by providing, in part, an Exchange for storing information indicating the interface specification under which a given network operates. The Exchange operates in at least two modes. In a first mode, the Exchange is accessed by a first network to retrieve the interface specification of a second network. Then, the first network formulates a message directed to the second network according to the interface specification of the second network. This message is then sent directly to the second network. In a second mode, the first network transmits a message to the Exchange according to the interface specification of the first network. The Exchange determines the intended recipient network, transforms the message to the interface specification of the second network, and then transmits the transformed message to the second network. While this approach enables networks operating according to different interface specifications to communicate, it also requires a conversion between interface protocols.

Another impediment to exchange of financial transactions and/or information between existing electronic financial service networks is that not only do separate networks operate under disparate interface specifications, but different networks offer different services, also known as functionality. For example, a first electronic financial service network may offer the service of person to person transactions, while a second electronic financial service network may not offer this service. If two distinct electronic financial service networks are to cooperate in completing an inter-network service and/or transaction, each network must support the desired functionality. There is no current technique to determine functionality supported by individual electronic financial service networks. Accordingly, a need exists for a technique to determine functionality offered by electronic financial service networks to perform and/or facilitate inter-network financial transactions and/or services.

Yet another impediment to exchange of financial transactions and/or information between existing electronic financial service networks is that two or more separate networks may offer the same functionality, often by way of the same interface specification, yet network-specific behavior to achieve the same results is often different among separate networks. Accordingly, a need exists for a technique for two or more separate electronic financial service networks, with each having unique behaviors in performing or facilitating a particular financial transaction or service, to cooperate in providing that particular financial transaction or service.

The relationship between a customer and a service operating an electronic financial service network is one of trust. The customer grants the service network access to one or more accounts associated with the customer. The customer also relies upon the service to perform or facilitate the transactions and/or services directed. The service relies upon the customer maintaining funds in the customer's account. Additionally, customers of the service can trust other customers of the service because they each maintain a trust relationship with the service. Yet another impediment to exchange of financial transactions and/or information between existing electronic financial service networks is that there is no established trust relationship between a customer of a first service and a second service, between services, and between customers of these services. Accordingly, a need exists for a technique of inter-network financial transactions and/or services in which trust is established and maintained.

Distinct electronic financial service networks are currently located in several countries. Typically, an electronic financial service network only offers services to customers located in the country in which the network is located. Furthermore, existing electronic financial service networks typically only process financial transactions in the currency of the country in which it is located. There is limited inter-country and inter-currency support for financial transactions. One of these exceptions is that some networks support inter-country financial transactions for transactions between customers located in countries which collaborate tightly with regards to currency and funds transfer. Accordingly, a need exits for a technique to perform and facilitate inter-country and inter-currency financial transactions by electronic financial service networks.

OBJECTIVES OF THE INVENTION

Accordingly, it is an objective of the present invention to provide a technique for extending the reach of an electronic financial service network to another electronic financial service network and customers of that other electronic financial service network.

It is also an objective of the present invention to provide a technique for performing electronic inter-network funds movement between customers of different electronic financial service networks.

It is also an objective of the present invention to provide a technique for performing electronic inter-network bill presentment between customers of different electronic financial service networks.

It is also an objective of the present invention to provide a technique for performing electronic inter-network bill payment between customers of different electronic financial service networks.

It is yet another objective of the present invention to provide a technique for performing electronic inter-network person-to-person payment between customers of different electronic financial service networks.

It is another objective of the present invention to provide a technique for exchanging information between customers of different electronic financial service networks.

It is also an objective of the present invention to provide a technique for performing and/or facilitating inter-network financial transactions and/or services between electronic financial service networks which operate according to different interface standards.

It is a further objective of the present invention to provide a technique to determine the functionality of an electronic financial service network.

It is also an objective of the present invention to provide a technique for performing and/or facilitating inter-network financial transactions and/or services between electronic financial service networks which operate according to different behaviors.

It is another objective of the present invention to provide a technique for performing and/or facilitating trusted inter-network financial transactions and/or services.

It is yet a further objective of the present invention to provide a technique for performing international financial transactions and/or services by electronic financial service networks.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

The present invention discloses a technique for making inter-network payments. A system and a method for implementing the technique are each provided. More specifically, the present invention discloses a technique whereby a payment request generated in a first one of multiple payment network is completed by a second payment network. The first network has a first payment service provider and is associated with multiple payers and payees, and the second payment network has a second payment service provider and is also associated with multiple payers and payees. The first and second payment service provider's work together to provide the service of making a payment on behalf of a payer associated with one payment network to a payee associated with another payment network.

According to the inventive technique, each of the first and the second payment networks comprises multiple devices capable of communicating with one another. The devices could all be the same type of device, or different types of devices. For example, a device could be a personal digital assistant (PDA), a cellular, digital, or traditional telephone, a personal computer, a high powered workstation, a server, a sophisticated mainframe computer, or any type device capable of transmitting and receiving the communications described herein. The communications could be voice communications, digital data communications, or analog data communications. Furthermore, one or more of multiple communications to achieve an inter-network payment could be a different type communication than other communications to achieve the inter-network payment. Each of the first and second payment service providers serve to implement payments directed by payers associated with the payment network with which the payment service provider is associated. Each of the first and second payment service providers also communicates with others to implement inter-network payments.

According to the method, a request to make a payment on behalf of a payer is received at the first payment service provider. The payer could be associated with the first payment network, or could associated with another payment network. The request is to make a payment to a payee that is not associated with the first payment network. The payment could be any type payment, including a payment of a bill, a payment of an invoice, a gift payment, a person-to-merchant payment, or a person-to-person payment. The payment request could include information informing the first payment service provider that the payee is not associated with the first payment network, or the first payment service provider could determine that the payee is not associated with the first payment network. This could include analyzing information contained in the request. The payment request preferably includes, at least, information identifying the payee and an amount for payment. Information identifying the payee could be any type of information identifying a payee, such as, for example, the payee's name, address, or e-mail address. The payment request could include information in addition to identifying information and an amount. Furthermore, the payment request could only include information identifying the payee. In such a case, a payment amount is obtained later.

The first payment service provider transmits a request to determine the payment network with which the payee is associated. This transmitted request preferably includes any identifying information included in the received payment request, though it could include only a portion of this information, or it could include information other than that included in the received payment request. That is, the first payment service provider could add to or modify the information identifying the payee. In response to the transmitted request, the first payment service provider receives information indicating that the payee is associated with the second payment network. The first payment service provider then transmits a payment instruction to the second payment service provider. This payment instruction is an instruction for the second payment service provider to make a payment to the payee.

According to a beneficial aspect of the present invention, the received information indicating that the payee is associated with the second payment network includes a unique identifier that identifies the payee to the second payment service provider. The first payment service provider includes this unique identifier in the payment instruction transmitted to the second payment service provider, thus enabling the second payment service provider to unambiguously identify the payee upon receipt of the payment instruction.

According to a further and especially beneficial aspect of the present invention, first payment service provider stores the received information indicating that the payee is associated with the second payment network. The stored information includes the unique identifier. In this manner, the first payment service provider has a record of the association of the payee with the second payment network and need not again determine the payment with which the payee is associated. According to this further aspect, the first payment service provider receives a second payment request to pay the payee. The first payment service provider retrieves the stored information indicating that the payee is associated with the second payment network. The first payment service provider then transmits a second payment instruction to the second payment service provider including the retrieved unique identifier.

Still further, the received payment request is a request to make a payment on behalf of a first payer, and the second request is a request to make a payment on behalf of either the first payer or a second payer. Thus, the stored information indicating that the payee is associated with the second payment network is available for retrieval any time a payment request directed to the payee is received by the first payment service provider, no matter the identity of the payer.

According to another aspect of the present invention, the request to determine the payment network with which the payee is associated is transmitted to an inter-network directory provider. The inter-network directory provider is preferably not associated with any one of the multiple payment networks, though it could be. The inter-network directory provider, among other functions, aids in determining the payment network with which the payee is associated.

According to a further aspect, the inter-network directory provider identifies one or more of the multiple payment networks as candidate payment networks with which the payee may be associated. This determination is made based upon the transmitted request. Preferably, this determination is made based upon information identifying the payee, discussed above, contained in the transmitted request. A candidate network is a network with which the payee may be associated. That is, according to this further aspect of the present invention, the inter-network directory provider does not conclude that the payee is associated with the second payment network, but rather only identifies candidate payment networks. Another makes this conclusion. The inter-network directory provider could identify a single payment network, multiple payment networks, or no payment networks. The inter-network directory provider transmits information indicating the one or more identified candidate payment networks to the first payment service provider. According to this further aspect, the inter-network directory provider identifies the second payment network as a candidate payment network.

Still further, according to the present invention, the first payment service provider transmits a request to the second payment service provider to determine if the payee is associated with the second payment network. This is a request specifically seeking to determine if the payee is associated with the second payment network. The received information indicating that the payee is associated with the second payment network is received in response to this request transmitted to the second payment service provider by the first payment service provider.

And even further, in accordance with the present invention, the information received from the second payment service provider indicating that the payee is associated with the second network includes information identifying the payee as one candidate payee and information identifying at least one other payee as another candidate payee. The second payment service provider identifies the payee as one candidate payee, and another payee as another candidate payee. This identification is transmitted to the first payment service provider. That is, the information received from the second payment service provider, according to this particular aspect of the present invention, is not a conclusion that the payee is associated with the second network. Rather, similar to the identification of candidate payment networks discussed above, the second payment service provider merely identifies candidate payees that are associated with the second network that may be the intended payee. After receipt of this information identifying candidate payees, a determination is made, based upon one or both of information included in the request transmitted to the second payment service provider and the received information identifying the one and the other candidate payees, that the one candidate payee, and not the other candidate payee, is the intended payee.

According to another aspect of the present invention, the payment request is received from the payer. After the first payment service provider receives, from the second payment service provider, the information identifying the one and the other candidate payees, this information is transmitted to the payer. The payer then selects the correct payee from the candidate payees and transmits the selection to the first payment service provider. The first payment service provider then transmits the payment instruction, to the second payment service provider, as discussed above.

According to another aspect of the present invention, the first service provider selects the correct payee from the candidate payees.

According to yet another aspect, according to the present invention, the information received from the inter-network directory provider includes information identifying a third payment network as a candidate payment network. The third payment network has a third payment service provider. The first payment service provider transmits a request to the third payment service provider to determine if the payee is associated with the third network, as described above in relation to the request transmitted to the second payment service provider. According to this aspect, the third payment service provider determines that the payee is not associated with the payee, and transmits this determination to the first payment service provider. Thus, whenever multiple candidate payment networks are returned by the inter-network directory provider, the first payment service provider transmits requests to payment service providers associated with the candidate payment networks until the correct payment network is determined.

According to another beneficial aspect of the present invention, communications between and among the multiple networks can be secured. The inter-network directory provider stores information indicating if a given payment service provider requires secured communications. A decision on requiring secured communications is made by each payment service provider. According to this aspect, the second payment service provider requires secured communications. Information indicating this fact is returned with the information identifying the second payment network as a candidate payment network. The first payment service provider accesses a certificate authority to retrieve an encryption key associated with the second payment service provider. An encryption key will be understood by one skilled in the art. Further, the certificate authority could be located at, or be a part of, the inter-network directory provider. The request transmitted to the second payment service provider is encrypted with the encryption key prior to transmission.

According to an especially beneficial aspect of the present invention, the information received from the second payment service provider, in response to the request to determine if the payee is associated with the second payment network, is a positive declaration that the payee is associated with the second payment network. That is, the second payment service provider, according to this especially beneficial aspect, concludes that the payee is associated with the second network and transmits an indication of such to the first payment service provider.

According to yet another aspect of the present invention, the inter-network directory provider stores information to facilitate inter-network payments. This stored information includes information associated with the multiple payment service networks and information indicating a network path over which to communicate with a certificate authority, discussed above. The stored information associated with each of the multiple payment networks includes at least one of several types of information. The types of information include, but are not limited to, information indicating a country in which a payment service provider is located, information identifying a network path over which to communicate with a payment service provider, information indicating types of financial transactions supported by a payment service provider, information indicating secured communications requirements of a payment service provider, information identifying a treasury service provider associated with a payment service provider, information identifying a deposit account associated with a payment service provider, information identifying a processing model associated with a payment service provider, and information identifying a settlement method associated with a payment service provider.

According to an advantageous aspect of the present invention, the information stored by the inter-network directory provider is accessed and searched by the first payment service provider. The stored information is retained at the inter-network directory provider. This searching of the information stored at the inter-network directory provider is to identify the payment network with which the payee is associated.

According to another advantageous aspect of the present invention, the information stored by the inter-network directory provider is downloaded and searched by the first payment service provider. Thus, a copy of all or a portion of the information stored at the inter-network directory provider is downloaded by the first payment service provider. The downloaded information is then searched by the first payment service provider to identify the payment network with which the payee is associated.

According to yet another beneficial aspect of the present invention, the inter-network directory provider stores information for each of the multiple payment networks indicating associations between its payment service provider and its payees. This information identifies payees known to a payment service provider. The payment network with which the payee is associated is determined by the inter-network directory provider, based upon the request transmitted to the inter-network directory provider and this stored information. The inter-network directory provider transmits the information indicating that the payee is associated with the second payment network to the first payment service provider. According to this aspect, the information indicating that the payee is associated with the second payment network is a determination that the payee is associated with the second payment network, similar to the discussion above. Thus, according to this aspect, a request to the second payment service is not required or necessary, though this operation could certainly be performed.

According to another aspect of the present invention, the request to determine the payment network with which the payee is associated is transmitted to the second payment service provider, and the received information indicating that the payee is associated with the second payment network is received from the second payment service provider. According to this aspect, the second payment service provider makes a determination if the payee is associated with the second payment network. Thus, according to this aspect, the request to determine the payment network with which the payee is associated is transmitted directly to a payment service provider, and that payment service provider makes a determination if the payee is associated with the same payment network with which that payment service provider is associated. Prior to transmission of the request to the second payment service provider, the first payment service provider may have some information indicating that the payee may be associated with second payment network, or may have no information indicating that the payee is associated with the second payment network. Further, multiple such transmissions could be made by the first payment service provider to different payment service providers associated with different ones of the multiple payment networks. This process could thus continue until the correct payment network is determined.

According to another advantageous aspect of the invention, the first payment network serves as a gateway to other ones of the multiple payment networks. That is, a payment request generated in one payment network is passed to at least one intermediate network, which then passes it on to the payment network with which the payee is associated. According to this aspect, the payment request is received from a third payment service provider associated with a third payment network. The payer, in this aspect, is also associated with the third payment network, though the payer could be associated with another payment network other than the first, second, or third payment networks.

In another beneficial aspect of the present invention, the payment request is structured according to a first message set, and the request to determine the payment network and the payment instruction are structured according to a second message set other than the first message set. Preferably, the second message set is a common message set intended to be used in making inter-network payments. Therefore, a payment service provider can communicate with payers according to any message set desire by the payment service provider, and in turn communicate with other payment service providers, the inter-network directory provider, and the certificate authority according to the common message set.

According to another aspect of the present invention, funds are transferred from an account associated with the payer to an account associated with the first payment service provider, funds are transferred from an second account associated with the first payment service provider to an account associated with the second payment service provider, and funds are transferred from an account associated with the second payment service provider to an account associated with the payee. Thus, with these three funds transfers, the payer makes payment to the payee with the services of the first and the second payment service providers. Preferably, each of these accounts is a deposit account maintained at one or more financial institutions. However, one or more of these accounts could be another type account, such as a stored value account or a credit account. Also, the accounts associated with the first payment service provider could be the same account, and the accounts associated with the second payment service provider could be the same account. Furthermore, preferably none of the funds transfers are dependent upon any of the other funds transfers, though one or more could be. Especially beneficial, any one or all of these transfers can be electronic funds transfers. When each of the transfers is an electronic funds transfer, the payment from the payer to the payee is a completely electronic transaction. It will be recognized that the present invention enables a payment from a payer associated with a first payment network to a payer associated with a second network to be made electronically.

In yet another aspect of the present invention, the first payment service provider transmits remittance advice associated with the payment to the second payment service provider. The remittance advice could be a simple indication of the identity of the payer, or could be detailed information associated with a bill or statement upon which the payment is being made. Furthermore, the remittance advice could be generated by the first payment service, or could be generated by the payer and transmitted to the first payment service. The remittance advice could be transmitted at the same time the payment instruction is transmitted, or at another time. The second payment service transmits the remittance advice to the payee.

According to a further aspect, the remittance advice transmitted from the first payment service provider to the second payment service provider is structured according to a first message set, while the remittance advice transmitted from the second payment service provider to the payee is structured according to a second message set. As will be understood, with reference to the discussion above on message sets, the first message set could be a common message set directed to inter-network payments, and the second message set could be any message set by which a payment service provider communicates with payees associated with the same payment network with which payment service provider is associated.

According to yet another beneficial aspect of the present invention, the second payment service provider determines if the payment instruction will be accepted. That is, if the second payment service provider will make payment to the payee. The results of this determination are transmitted to the first payment service provider. Preferably, the first payment service provider propagates this determination to the payer.

The system to implement the technique includes at least a first payment processing station associated with the first payment network and a second payment processing station associated with the second payment network. Preferably, each of the payment processing stations are servers, though one or each could be any type of computing device capable of performing the functions described herein. The system, according to certain aspects, also includes an inter-network directory station. Preferably, the inter-network directory is also a server. Though, it could be any type computing device capable of operating as described herein. The system, according to other aspects, also includes a payer network station and a payee network station. Preferably, each of these is a personal computer, though either or both could be any type device capable of operating as described herein, including computing devices and simple communications devices. According to yet other aspects of the system, the system includes a certificate authority. The certificate authority an also be any type device capable of functioning as described herein.

BRIEF DESCRIPTION OF DRAWINGS

FIGS. 9A and 9B are simplified flow diagrams of the processing to perform an inter-network payment in accordance with the present invention.

BEST MODE FOR CARRYING OUT THE INVENTION

Figure 1A:
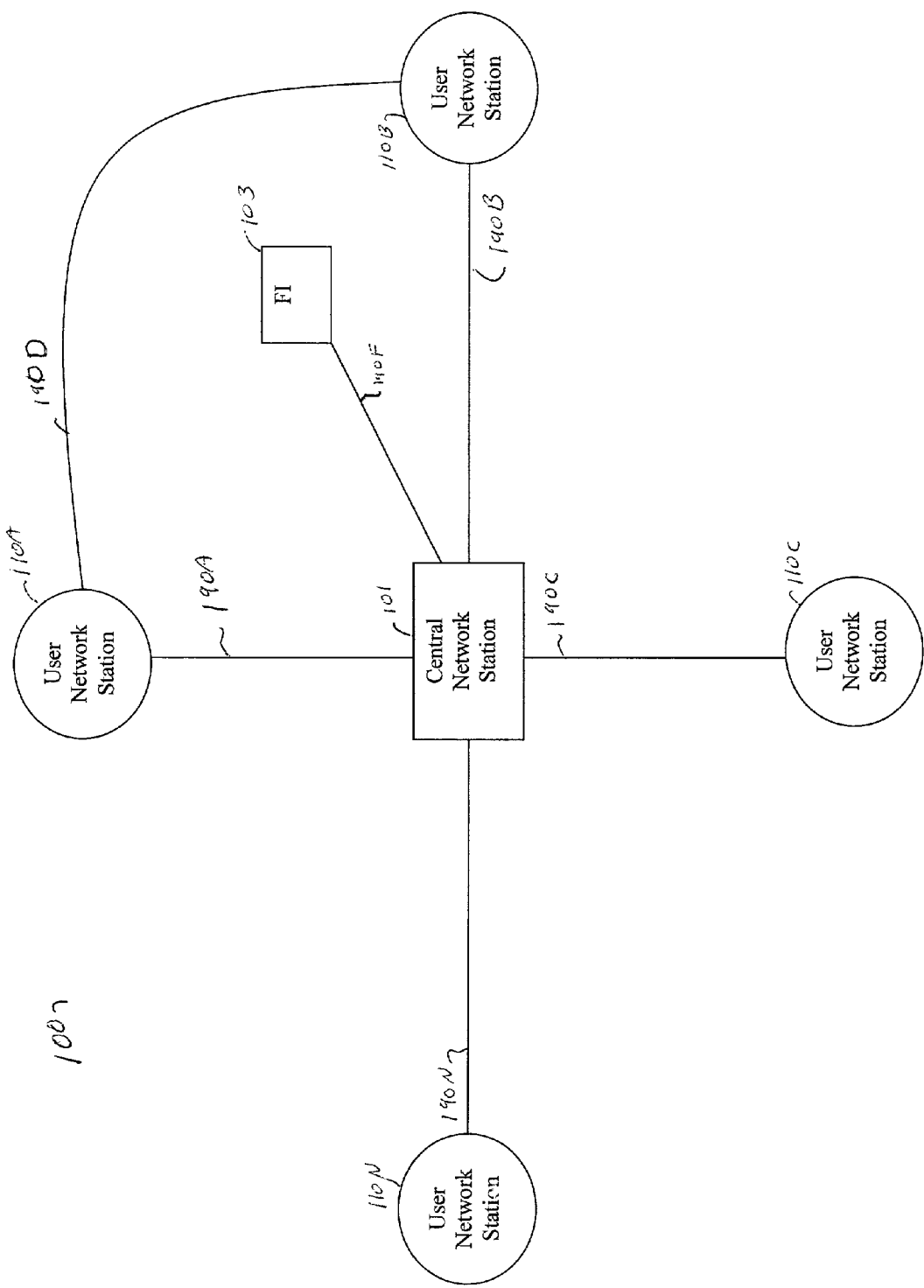
FIG. 1A is a schematic diagram of a prior art electronic financial service network.
Figure 1B:
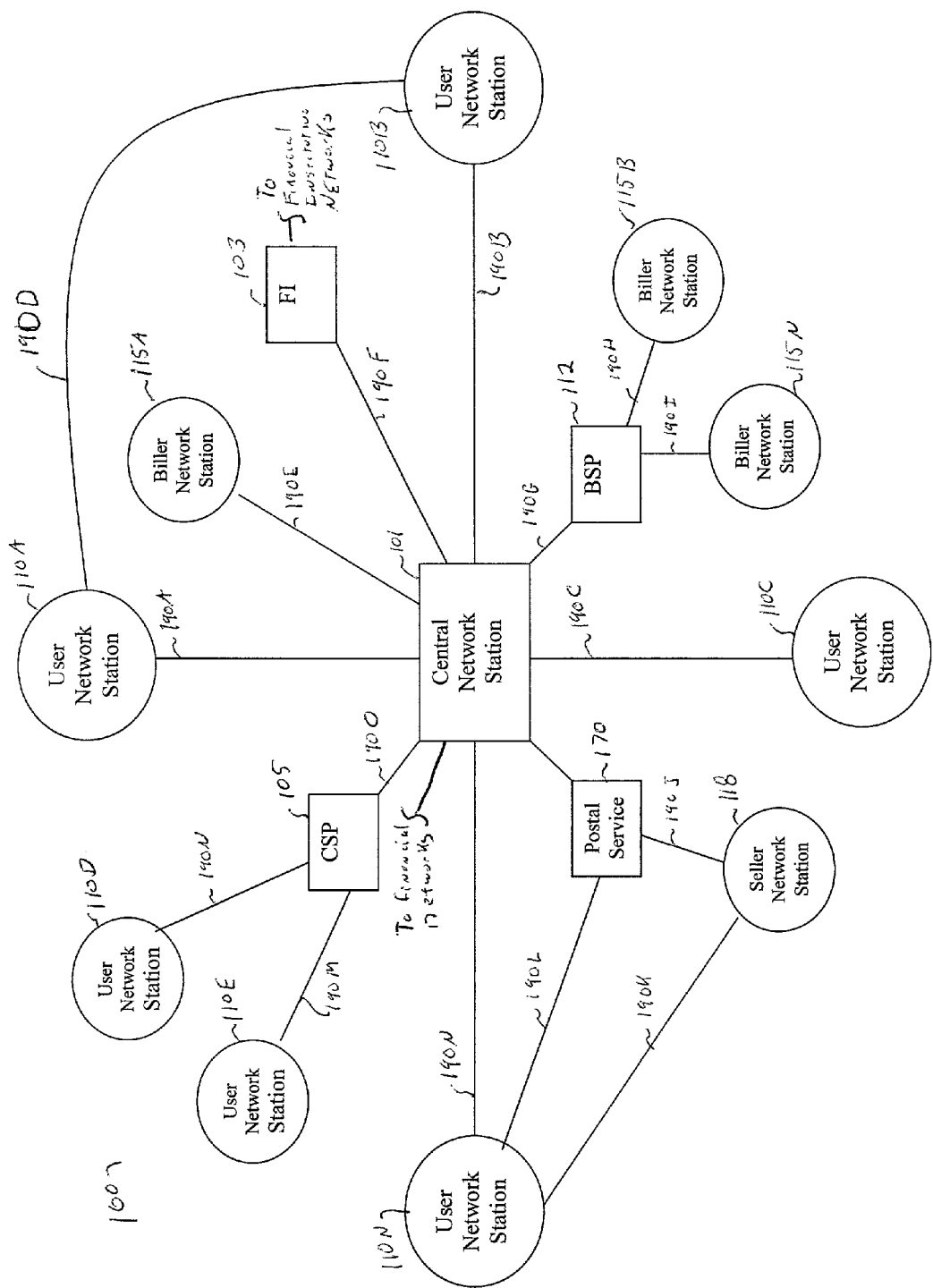
FIG. 1B depicts the prior art electronic financial service network of FIG. 1 with additional network participants.
Figure 2:
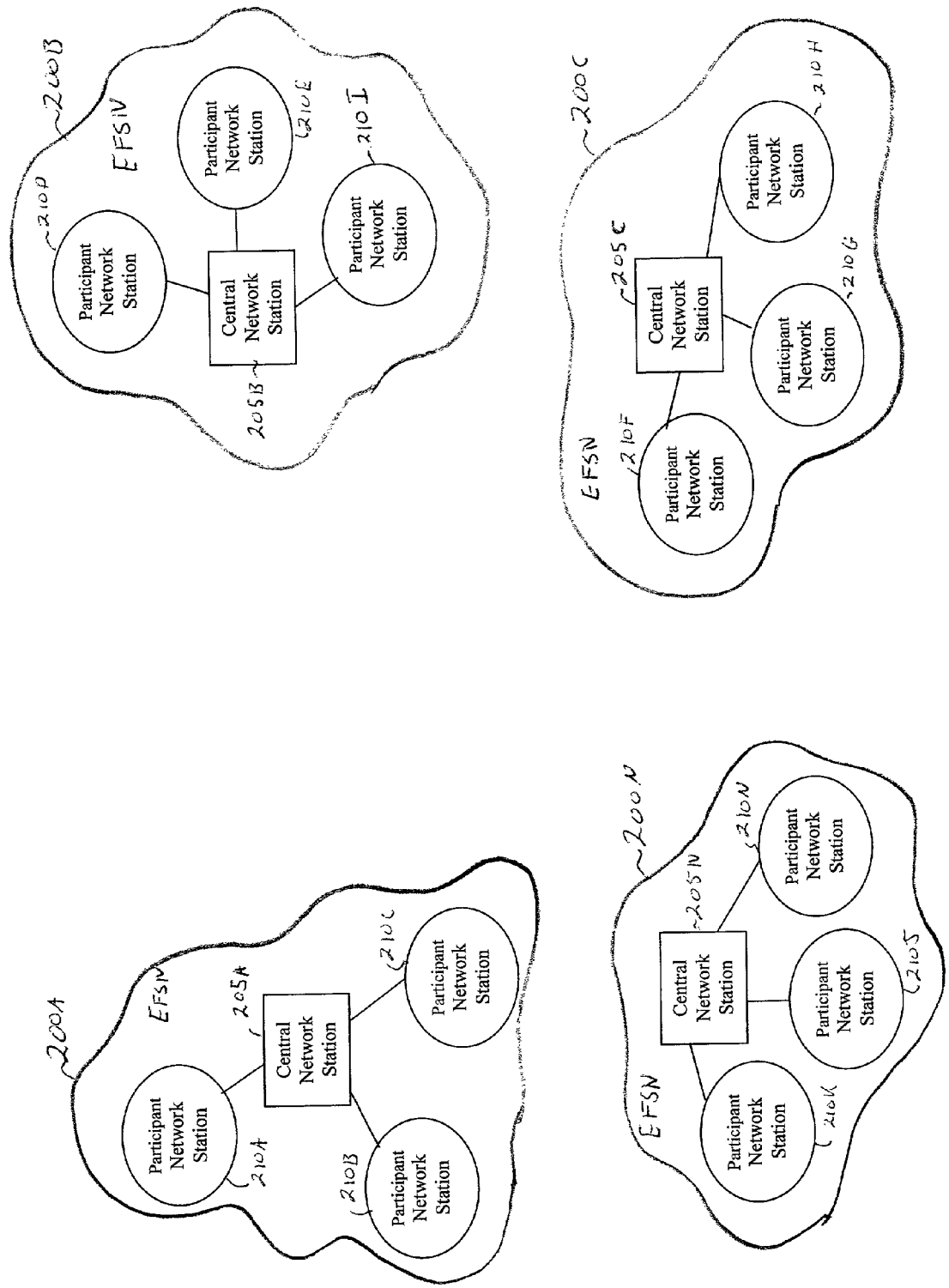
FIG. 2 is a simplified depiction of multiple prior art electronic financial service networks not in communication with one another.
Figure 3:
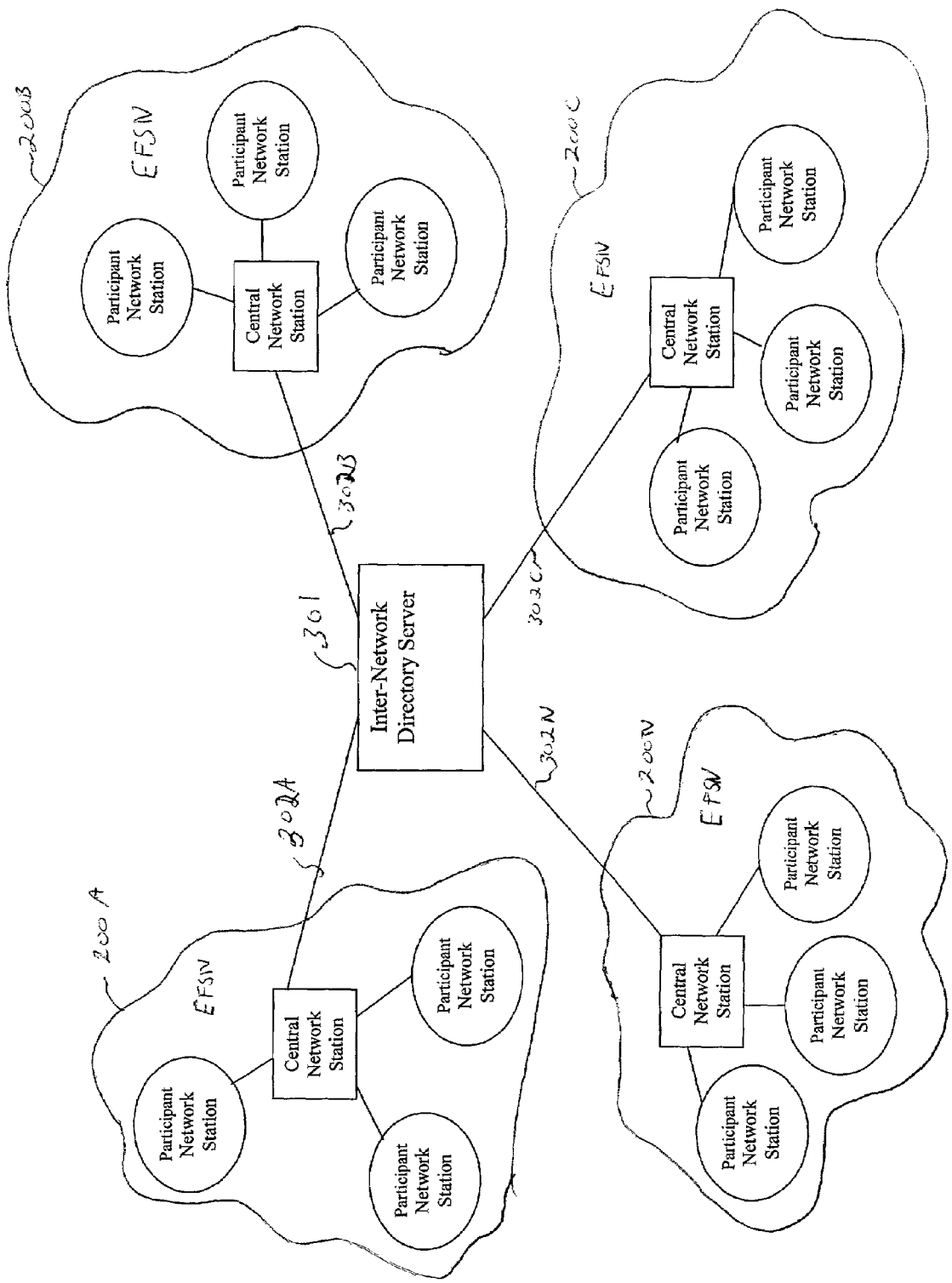
FIG. 3 is a schematic diagram of the communication links between an inter-network directory server and a plurality of electronic financial service networks in accordance with the present invention.

FIG. 3 depicts an inter-network directory server 301 in communication with multiple electronic financial service networks (EFSNs) 200A–200N via communication links 302A-302N in accordance with the present invention. This inter-network directory server 301 facilitates the exchange of electronic financial transactions and services between and among the EFSNs 200A–200N. Each of the multiple EFSNs 200A–200N communicates with the inter-network directory server 301 according to a common message set (CMS) 401. Additionally, each of the multiple EFSNs 200A–200N communicates with one another via the CMS 401, as will be described below. Though not depicted in FIG. 3, a first EFSN could serve as a gateway to the inter-network directory server 301 and other EFSNs for a second EFSN. Communication within a given one of the multiple EFSNs 200A–200N may be made according to any message set, including the CMS 401. It will be understood that a single EFSN can perform internal messages via any message set, while that EFSN will communicate with the inter-network directory server 301 and with other EFSNs via CMS 401 criteria.

Figure 4:
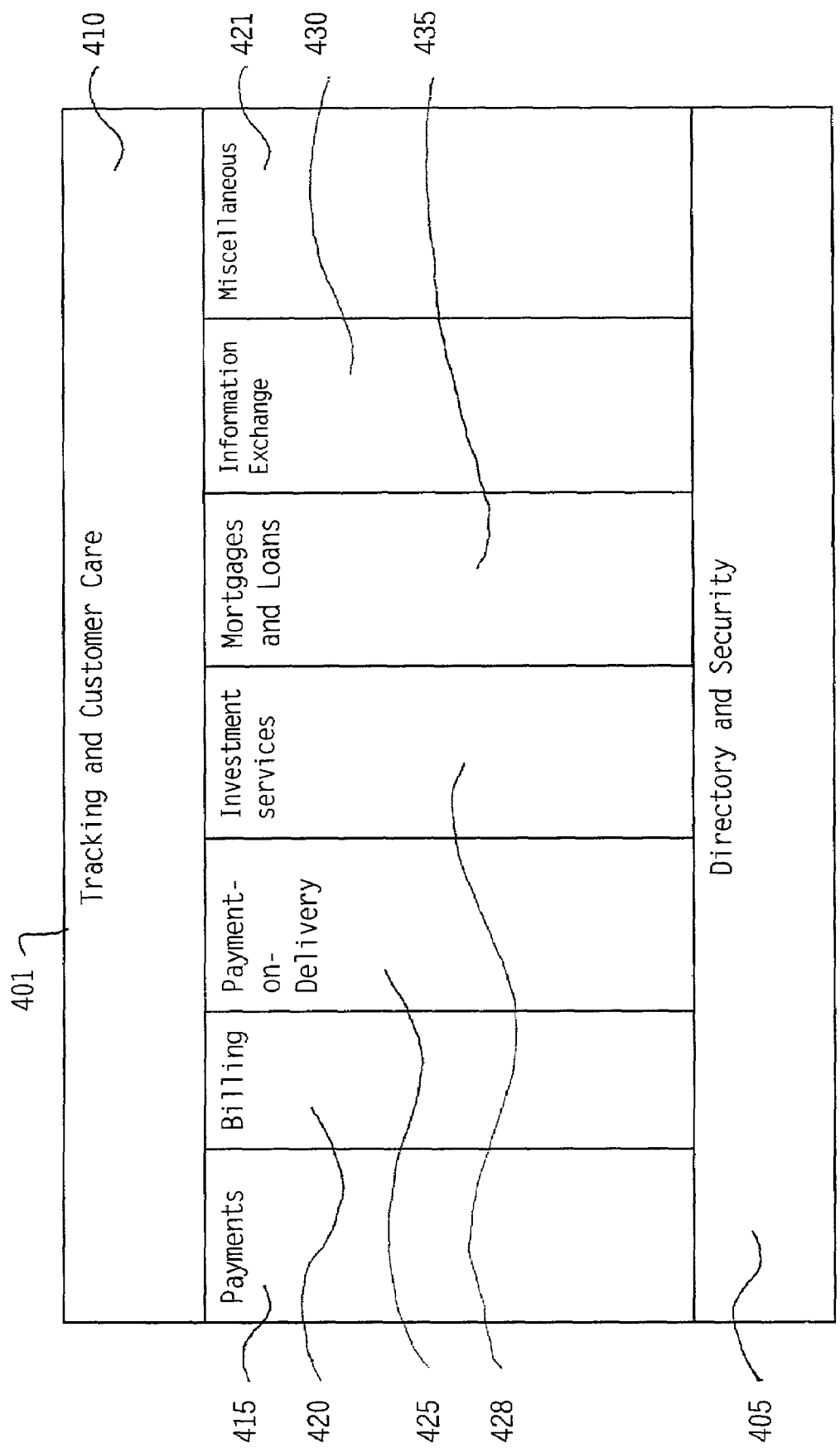
FIG. 4 is a simplified organizational diagram of a common message set for communication among and between the inter-network directory server and the electronic financial service networks of FIG. 3 in accordance with the present invention.
Figure 5:
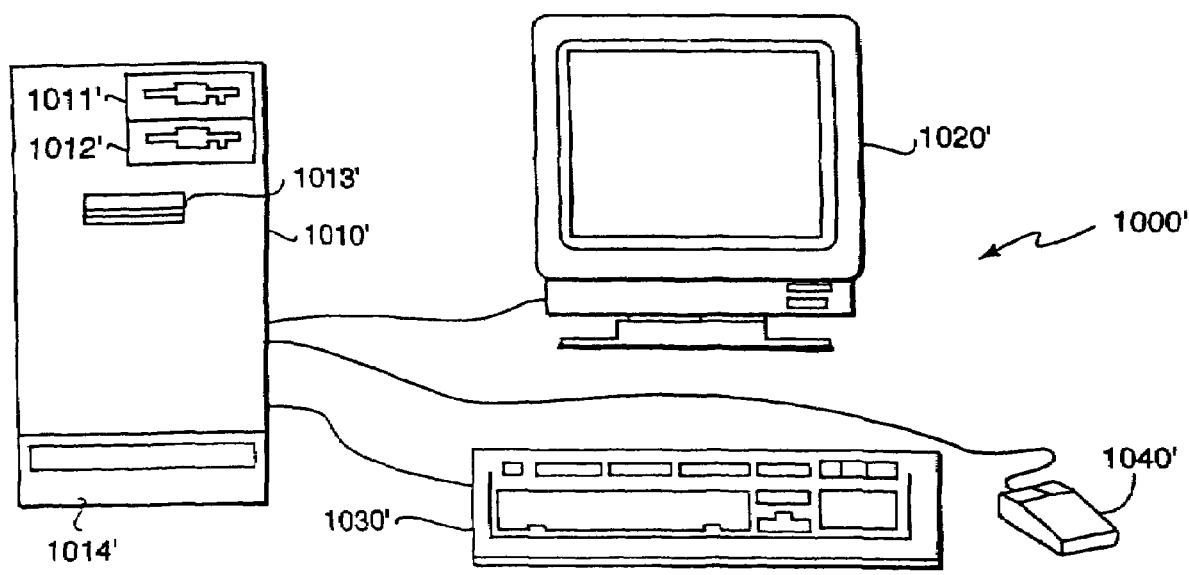
FIG. 5 depicts a server suitable for use as the inter-network directory server of FIG. 3.
Figure 6:
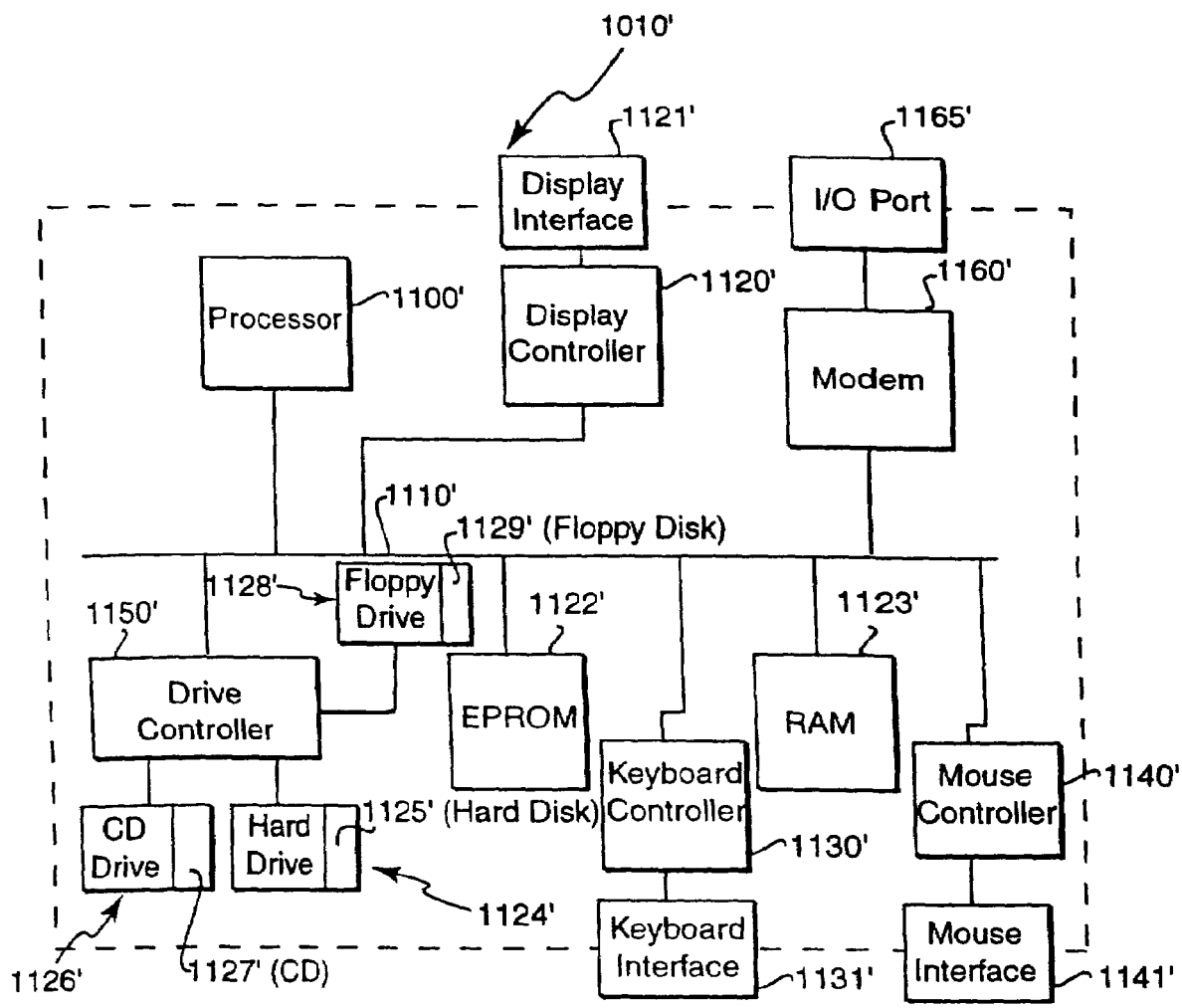
FIG. 6 is an exemplary block diagram of components of the server depicted in FIG. 5.

FIG. 4 is a simplified organizational diagram of the CMS 401. The CMS 401 provides a framework for consistency of messages between and among EFSNs. As shown, the CMS 401 includes subsets of messages directed to services and/or transactions facilitated and/or performed by the EFSNs 200A–200N. Additionally, universal message subsets that relate to all services and/or transactions are also included. Message subsets relating to services and/or transactions include messages directed to payments 415, billing 420, payment on delivery 425, investment services 428, insurance 432, mortgages and other loans 435, information exchange 430, and miscellaneous services and transactions 421, Universal message sets include tracking and customer care 410 messages and directory and security 405 messages, FIGS. 5 and 6 depict an exemplary network server suitable for use as the inter-network directory server 301. The server is preferably a commercially available high power, or mainframe computer. Here again, it will be recognized that the server configuration is exemplary in that other components (not shown) could be added or other components could be substituted for those depicted and certain of the depicted components could be eliminated if desired. Additionally, the directory server 301 could be a cluster of cooperating servers.

The server functions as described herein in accordance with stored programming instructions, which drive its operation. Preferably, the server stores its unique programming instructions on an EPROM or hard disk. It will be recognized that only routine programming is required to implement the instructions required to drive the server to operate in accordance with the invention, as described herein. Further, since the server components and configuration are conventional, routine operations performed by depicted components will generally not be described, such operations being well understood in the art.

Referring to FIG. 5, the server 1000' includes a main unit 1010' with slots 1011', 1012', 1013' and 1014', respectively provided for loading programming or data from a floppy disk, CD, hard disk, and/or other storage means onto the server 1000'. Additionally, the server could access data on a storage area network external to the server. The server 1000' also includes a keyboard 1030' and mouse 1040', which serve as user input devices. A display monitor 1020' is also provided to visually communicate information to the user.

As depicted in FIG. 6, the server 1000' has a main processor 1100' which is interconnected via bus 1110' with various storage devices including EPROM 1122', RAM 1123', hard drive 1124', which has an associated hard disk 1125', CD drive 1126', which has an associated CD 1127', and floppy drive 1128', which has an associated floppy disk 1129'. The memories, disks and CD all serve as storage media on which computer programming or data can be stored for access by the processor 1100'. The memories associated with the server hereafter will be collectively referred to as memory 1170. A drive controller 1150' controls the hard drive 1124', CD drive 1126' and floppy drive 1128'. Also depicted in FIG. 6 is a display controller 1120' interconnected to display interface 1121', a keyboard controller 1130' interconnected to keyboard interface 1130', a mouse controller 1140' interconnected to mouse interface 1141' and a modem 1160' interconnected to I/O port 1165', all of which are connected to the bus 1110'. The modem 1160' and interconnected I/O port 1165' are used to transmit and receive signals via one or more networks. It will be understood that other components may be connected if desired to the bus 1110', including communications components other than a modem and multiple communications components for accessing multiple networks and communications paths. By accessing the stored computer programming, the processor 1100' is driven to operate in accordance with the present invention.

Each of the multiple financial service networks 200A–200N includes one or more servers or other computing device to communicate with the inter-network directory server 301. A server could be any commercially available server capable of performing as described herein. An exemplary server as depicted in FIGS. 5 and 6 could be utilized by an EFSN to communicate with the inter-network directory server 301. This server, or servers, can be exclusively for communicating with the inter-network directory server, or can have additional uses such as communicating with other EFSNs and with participant network stations.

The CMS 401, introduced above, includes standards for each service and/or transaction performed or facilitated by any two or more distinct EFSNs. That is, each piece of information that flows to and/or from the inter-network directory server 301 and between and among multiple EFSNs is structured according to predefined criteria, depending upon the purpose of the message. The CMS 401 is preferably based upon XML, but another language could also be utilized. Some elements of the CMS 401 can be based on batch files or asynchronous messaging. Additionally, some elements can be based upon real-time (in session) request/response messaging. Whether asynchronous batch, asynchronous messaging, or real-time, preferably the CMS 401 is based upon XML. The CMS 401 includes criteria for messages relating to functions performed or facilitated by each of the EFSNs which need to be passed between and among EFSNs. This includes messages related to payments, bill or invoice presentment, investment information, loans, and all other information that may be generated by a first EFSN and transmitted to a second EFSN.

For example, for payments the CMS 401 includes specific criteria for payment of bills, for person-to-person payments, for organization-to-person payments, for micropayments (e.g. for delivery of content or information via a network), and for payments to merchants and/or service providers, whether the purchase is made via a network for goods or services or at a point-of-sale (e.g. at a brick-and-mortar store). The CMS 401 also includes specific criteria for payment-on-delivery payments, including funds escrow. For bill and/or invoice presentment, the CMS 401 includes specific criteria for bills/invoices presented directly from a biller to a payer, for bills/invoices presented via a centralized bill aggregator, and for linking to, or delivery with, non-bill information with a presented bill, among possible types of specific criteria. The CMS 401 also includes specific criteria for propagation of exception information arising from payments, transaction reversal, and customer care information. Especially beneficial, as any two or more EFSNs may be located in different countries, the CMS 401 also includes specific criteria for currency conversion and international funds settlement.

The inter-network directory server 301 stores essential information needed to complete inter-network transactions and services in a directory. Preferably, the directory is a database. This information includes information identifying a path to access a certificate authority, to be discussed below, and an identifier by which a certificate authority knows each of the EFSNs. Also included is information identifying a path for accessing each of the EFSNs 200A–200N, which may be more than one path. For example, different functions offered by an EFSN could be accessed via different paths. An indication of countries and currencies supported by each EFSN 200A–200N are also included in the directory. The directory also includes an indication of a treasury service provider and a depository trust account maintained at the treasury trust provider, for each of the EFSNs 200A–200N. Communications with the inter-network directory server are made according to the universal directory and security services 405 message subset of the CMS 401.

Each one of the EFSNs 200A–200N determines which of the functions it will provide or facilitate for its customers. The directory includes information identifying the functionality supported by each of the EFSNs 200A–200N (e.g., bill payment, person-2-person payment, person-2-merchant payment, bill presentment, recurring payments, multiple payee accounts per payee, future-dated payment, and investment service). The directory also includes information identifying processing models supported by each of the EFSNs 200A–200N (e.g., open system, closed system, guaranteed funds, good funds, risk-based, process-date, and due-date). The functionality and model information is used by a first EFSN to determine if a transaction and/or service can be completed by a second EFSN. This information is also used by a first EFSN to determine when and in what form to initiate a transactions or service which will be completed by a second EFSN. Also, an indication of settlement options (e.g., ACH, wire transfers, etc.) supported by each of the EFSNs, as well as any postal services associated with an EFSN, are also contained in the directory.

The directory could also contain information identifying each customer of each of the EFSNs 200A–200N. However, as this would require vast data storage capabilities, preferably the directory will not include such information. Additionally, the directory could also contain other information. This can include merchant pick lists maintained on behalf of individual EFSNs. Also, the directory could contain information, identifying billers who are customers of a given EFSN.

The central network directory server 301 also stores a library containing the common message set 401. The library can be accessed by any EFSN and portions of, or the whole of, the CMS 401 can then be downloaded by that EFSN. In this manner, the CMS 401 can be propagated to the EFSNs. The central network directory server 301 also function to translate messages from any message set utilized by an individual EFSN to the common message set 401. Thus, the central network directory server 301 receives a message from an originating EFSN structured according to a first message and transforms the message to be structured according to the CMS 401. The central network directory server 301 either then forwards the translated message to its intended recipient, or transmits it back to the originating EFSN.

Figure 7:
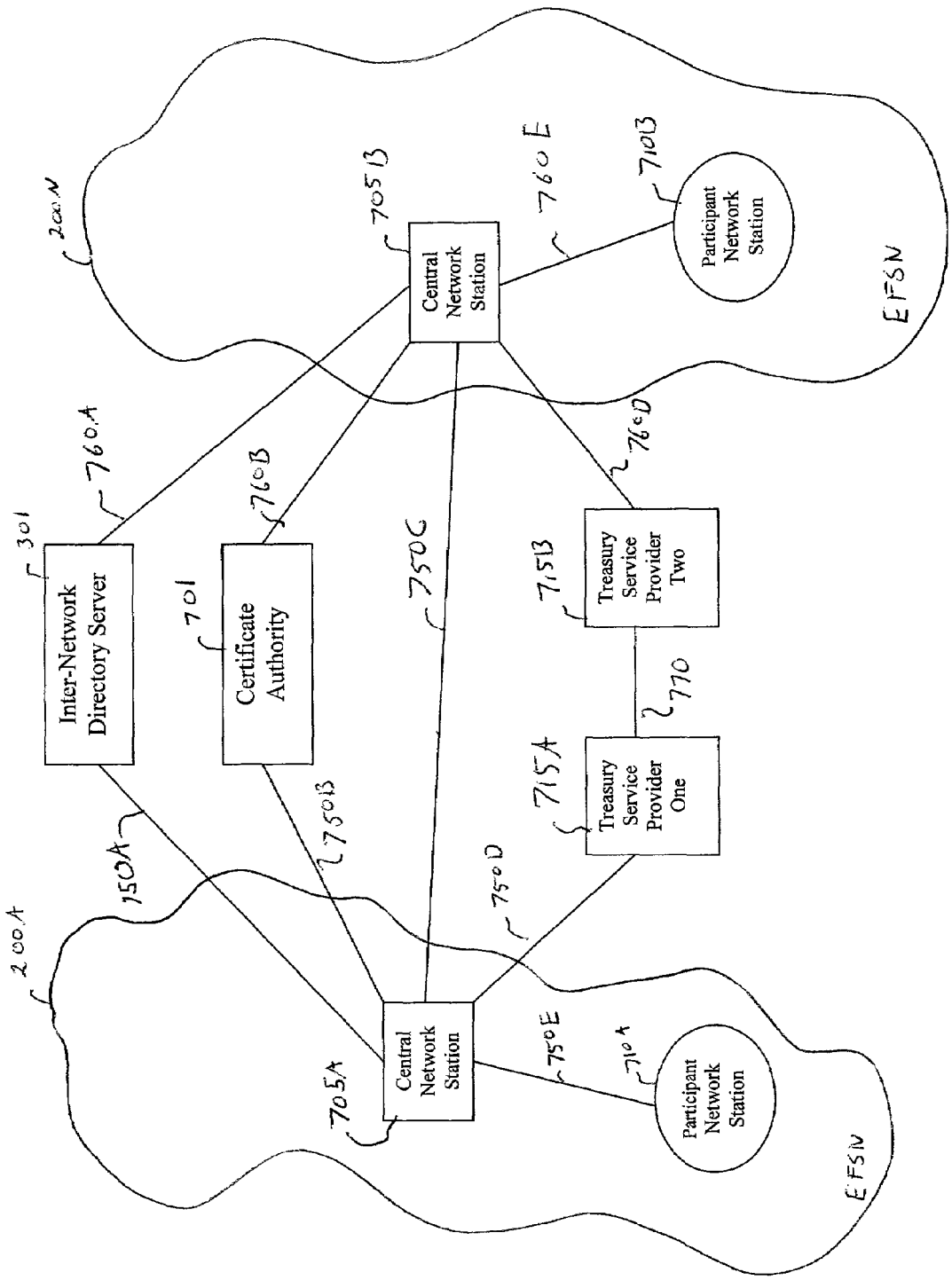
FIG. 7 is a schematic diagram of the communication links between the inter-network directory server, an optional certificate authority, two central network stations, two participant network stations, and two treasury service providers in accordance with a first aspect of the present invention.

FIG. 7 depicts EFSN 200A and EFSN 200B in communication with the inter-network directory server 301. Also shown is an optional certificate authority (CA) 701. A certificate authority (CA) is a trusted provider of information that enables secure communication between and among the multiple EFSNs 200A–200N and the inter-network directory server 301. The optional certificate authority can be located at the inter-network directory server 301, or separately. FIG. 7 depicts the certificate authority 701 as being distinct from the inter-network directory server 301. The CA 701 maintains an index of the EFSNs 200A–200N requiring security. For each included EFSN, the index includes a public digital certificate having an effective date and a public key. This information is used to secure the exchange of information between and among EFSNs 200A–200N and the inter-network directory server 301, as will be further described below. Each of the EFSNs 200A–200N preferably includes a database of customer profiles. As will be understood from the discussion above, such a database could be stored at the inter-network directory server 301, but preferably it is not. Each customer profile includes information to identify the customer. This could include, but is not limited to, the customer's name, address, email address, and other well-known identifying information such as a Dun & Bradstreet number or stock symbol. A profile also preferably includes and is indexed by a unique identifier by which a customer is known to the EFSN to which that customer belongs. Private information, especially if a database is stored at the inter-network directory server 301, about a given customer maintained by an EFSN is preferably not included in a customer profile. This information could include social security numbers, driver's license numbers, and bank account information. Individual EFSNs could allow their customers to choose what information is included in their profiles. Or, if private information is included in a customer profile, that information could be stored as private information only accessible by the customer to whom it relates and that customer's EFSN.

The following examples of the operation of the present invention are merely exemplary of the capabilities of the present invention and should not be taken as limiting.

Inter-Network Payment

FIG. 7 depicts EFSN 200A in communication with the inter-network directory server 301 via communication link 750A, in communication with the CA 701 via communication link 750B, in communication with EFSN 200B via communication link 750C, and in communication with treasury service provider one (TSP one) 715A via communication link 750D. This Figure also depicts EFSN 200B in communication with the inter-network directory server 301 via communication link 760A, in communication with the CA 701 via communication link 760B, in communication with EFSN 200A via communication link 750C, and in communication with treasury service provider two (TSP two) 715B via communication link 760D. Introduced above, a TSP provides support to an EFSN, including facilitating some electronic fund transfers. TSP one 715A and TSP two 715B communicate via communication link 770. It should be noted that communication link 770 could be a part of a separate network linking TSPs. The CA 701 could also be a part of the inter-network directory server 301. In such a case, communication links 750A and 750B, as well as 760A and 760B, could be the same communication link. It also should be noted that CA 701 is shown because, in this example, both EFSNs 200A and 200B require security.

Also shown in FIG. 7, EFSN 200A includes a central network station 705A which, among other capabilities processes payments which are directed by or directed to customers of EFSN 200A. Likewise, EFSN 200B also includes a central network station 705B which also, among other capabilities, processes payments which are directed by or directed to customers of EFSN 200B. Central network stations 705A and 705B are shown in direct communication with the inter-network directory server 301, with the CA 701, the other EFSN, and the respective TSP. However, it will be understood that one or more other processors and/or servers, under control of the respective EFSN, could be between a central network station and one or more of these components. And, a central network station could be a server as described above. Also depicted is participant network station 710A, which is associated with customer A of EFSN 200A, in communication with central network station 705A via communication link 750E. And likewise, participant network station 710B, which is associated with customer B of EFSN 200B, is shown in communication with central network station 705B via communication link 760E.

In this example, customer A directs that a payment be made on his behalf to customer B. EFSN 200A is the originating EFSN, customer A is the payer, and customer B is the recipient/payee. In this example, customer A has received a bill from customer B via traditional delivery means, i.e., not electronic presentment, and is making payment of the received bill. Customer B, in this example, is a biller. However, it should be understood that the payment could be payment of any type obligation, a gift payment, a charitable donation, or any other type payment. It will be understood from the discussion above that conventionally, as customer A and customer B are not customers of the same EFSN, a payment directed by customer A to customer B would be executed as a paper payment (check or draft) by central network station 705A. Furthermore, if customer A and customer B were located in different countries, payment might not be able to be made in any form by central network station 705A. International inter-network payments will be discussed further below. Utilizing the inter-network directory server 301 and the CMS 401, a payment from customer A to customer B can be made by a means other than check or draft.

Figure 9B:
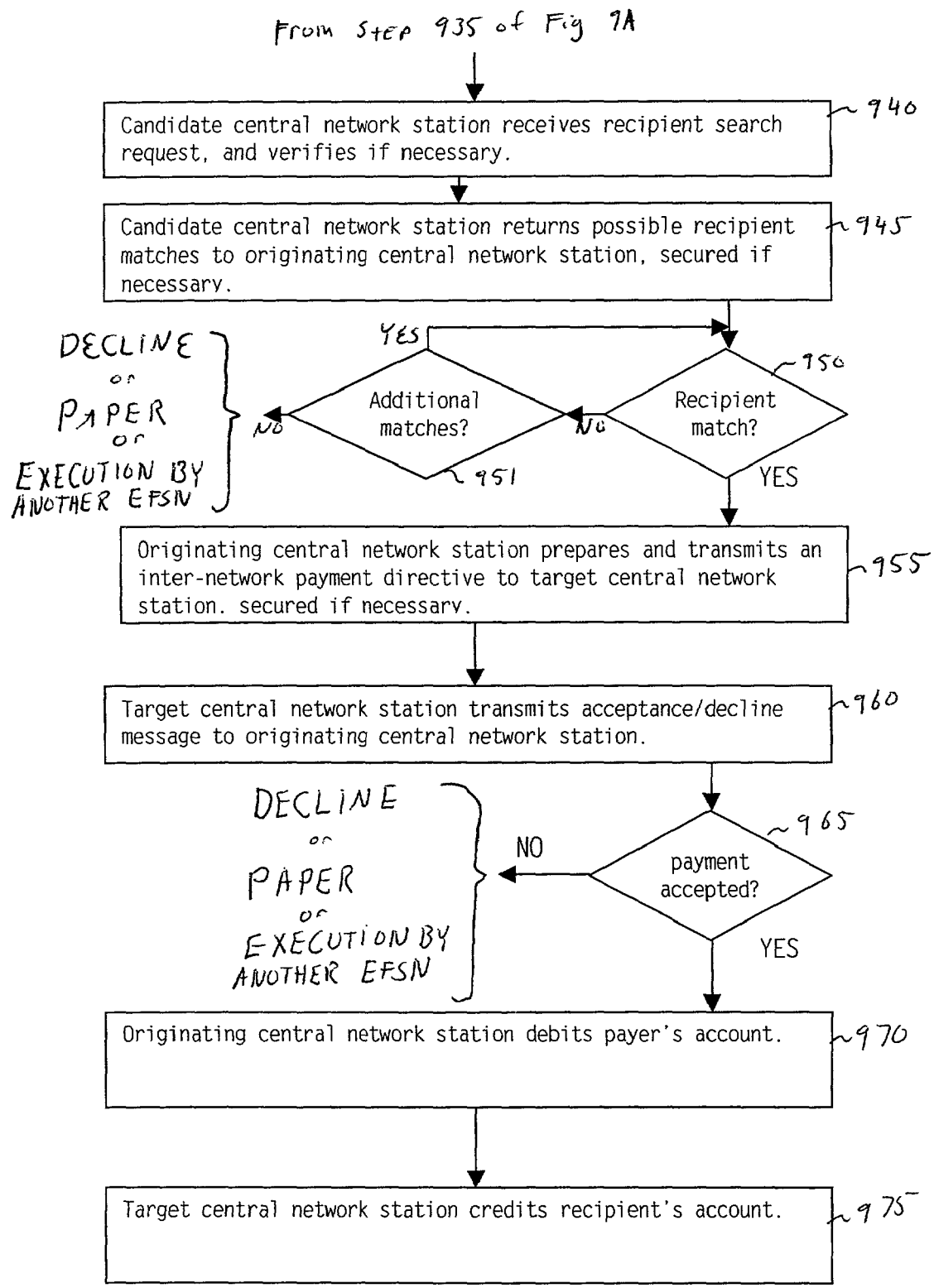

FIGS. 9A and 9B are flow charts showing the operations to make an inter-network payment. In step 901 of FIG. 9A, customer A, using participant network station 710A, transmits a payment directive via communication link 750E to central network station 705A, the originating central network station. This payment directive includes, at a minimum, a payment amount and information, identifying customer B. The identifying information could be customer B's name, email address, address, or other commonly known identifying information, such as a Dun & Bradstreet number or a stock symbol. The payment directive can also include a customer number by which customer B knows customer A. This payment directive can be structured according to any message set understood by central network station 705A. At step 905, central network station 705A determines if customer B is a customer of EFSN 200A. If the results of the determination are positive, the payment is handled in any conventional manner in which an EFSN may handle a payment directive between two customers of the EFSN.

If the results of the determination are negative, central network station 705A transmits a query to inter-network directory server 301 via communication link 750A, step 910. This query is structured according to universal directory and security message set 405 criteria set forth in the CMS 401. The query is a request for the inter-network directory server 301 to identify candidate EFSNs of which customer B 710B could be a customer. The request includes identifying information supplied by customer A to EFSN 200A. The inter-network directory server 301, at step 911, identifies candidate EFSNs. At step 915, the inter-network directory server 301 returns search results to central network station 705A via communication link 750A, also according to the CMS 401. Positive results include identifiers of candidate EFSNs and identifiers of paths to electronically reach the candidate EFSNs. If no candidate EFSNs are found, the transmission of step 915 indicates such.

In the present example, the inter-network directory server 301 returns only one candidate EFSN, EFSN 200B. However, it should be understood that multiple candidate EFSNs could be returned. Also, no candidate EFSN could be returned. In such a case, the payment directive could be processed in at least three ways. The payment could be executed conventionally, that is, in paper form (check or draft) by EFSN 200A, the payment request could be declined, or the payment could be issued by another EFSN, as will be further discussed below.

Not every EFSN requires secure communication. Also returned with candidate information is information identifying if a candidate EFSN requires secure communication with other EFSNs. At step 918 the originating central network station 705A determines if candidate EFSN requires security. If a candidate requires secure communication, central network station 705A then accesses, at step 920, the CA 701 to retrieve information associated with that candidate network to allow inter-network communications to be secured. This accessing is also made according to the universal directory and service message subset 405 of the CMS 401. This access is via communication link 750B. The accessed information includes information indicating authentication required and encryption required by a candidate EFSN and retrieval of public keys associated with a candidate network. The central network station 705A generates a recipient search request according to CMS 401 criteria, step 921. The recipient search request includes the information identifying the intended recipient of the payment, in this example customer B, received from customer A. The generated recipient search request is secured, step 922. This includes electronically signing the search request using a private key belonging to EFSN 200A. The signed search request is then encrypted using the public key of a candidate EFSN, in this example EFSN 200B, obtained from the CA 701.

If a candidate does not require secure inter-network communication, at step 919, the originating central network station generates the recipient search request. Operations then continue with step 935.

Of course, the recipient search request could be generated prior to determining if security is required. In such a case, if security were not required, the generated search request would be transmitted to the candidate central network station. And, if security is required, the originating central network station would then retrieve security information from the certificate authority, secure the generated search request, and then transmit the secured request to the candidate central network station.

The generated recipient search request, signed and encrypted if required, is then transmitted, via communication link 750C and at step 935, to the central network station associated with a candidate EFSN, in this example central network station 705B. It will be understood that when multiple candidate EFSNs are returned, multiple recipient search requests, each secured using a public key associated with a respective candidate EFSN if necessary, are transmitted to the respective candidate EFSNs. These recipient search requests could be transmitted in series or in parallel.

The candidate network, in this example EFSN 200B, receives the recipient search request at central network station 705B and verifies the authenticity of the request if the recipient search request is secured, step 940. Verifying the authenticity of the request includes decrypting the search request using a private key associated with the candidate EFSN, and then verifying the electronic signature using a public key associated with the requesting EFSN, EFSN 200A. At step 942 central network station 705B identifies possible recipient matches and then returns information identifying possible recipient matches to the originating EFSN via the same communication link. This return transmission is secured as described above if necessary, and is also structured according to CMS 401 criteria. If no recipient matches are found, the transmission made at step 942 indicates that no matches were found.

As introduced above, a public profile of customers of each of the multiple EFSNs 200A–200N could be stored at the inter-network directory server 301. In such a case, at least three distinct alternatives to locate a recipient could be performed. In a first alternative, central network station 705A submits the recipient search request to the inter-network directory server 301. The inter-network directory server then identifies and returns possible recipient matches. In a second alternative, central network station 200A directly access the directory stored at the inter-network directory server 301 to search for recipient matches. And, in a third alternative, central network station 705A could host at least a portion directory and locally search the directory. In such a case, a central network station could either periodically download changes to the directory from the inter-network directory server 301 or periodically have updates pushed to it in order to keep the directory current. If only a portion of the directory is stored at a central network station, that portion could be, for example, often paid customers of another network or billers belonging to another network. Furthermore, different ones of the alternative approaches to locating a customer can be combined. For example, a portion of the directory could be stored locally at a central network station. If an intended recipient is not found locally, a search against the inter-network directory server would then be performed. If the intended recipient is not found by a search against the inter-network directory server, then the processing described above in and shown in steps 910–945 would be performed. Other combinations of the described alternatives are also within the scope of the present invention.

In the present example, once central network station 705A receives the search results from central network station 705B, central network station 705A determines if one of the recipient matches identifies the intended recipient, step 950. If not, at step 951, the central network station 705A determines if additional recipient matches have been returned, If so, operations continue with step 950. If no match is found, in any of multiple candidate networks if so applicable, the payment request could be executed as a paper payment by central network station 705A if paper is an available option, the request could be declined, or the request could be executed by another EFSN. Further, if the central network station 705A is unable to unambiguously match a recipient, the possible alternatives could be transmitted to participant network station 710A for selection of one or none of the alternatives. This is especially advantageous when communications between a participant network station and a central network station are in-session communications. Execution of payments by other EFSNs is especially beneficial when an unlocatable intended recipient is in a different country than the central network station directing that payment be made. Typically, such payments will be made by check or draft, though other payment methods could be utilized. The location of the recipient will be known when the customer directing payment to be made on his behalf includes the recipient's address in the payment directive. For example, if central network station 705A is unable to locate customer B, yet central network station 705A identifies that customer B is located in a country different than central network station 705A, and identifies that country, central network station A accesses the directory to determine if any other central network station associated with another EFSN is located in customer B's country. This also includes determining if any EFSNs located in customer B's country are open systems, as indicated by information stored at the inter-network directory server. If so, a path to electronically reach that central network station is also obtained from the directory. Central network station 705A then accesses, if necessary, the CA 701 and retrieves security information about that other central network station, as will be understood from the discussion above. Central network station 705A then generates a message, according to CMS 401 criteria, instructing that a payment be made to customer B. This message is secured if necessary, as described above. The message includes the recipient's name and address. The message could also include remittance advice such as the name of the payer. If the other EFSN accepts the request, the other EFSN prepares a credit, in the currency of that country, and in favor of the recipient. International settlement between EFSNs will be described further below.

Of course, this procedure could also be utilized when the recipient is located in the same country as the EFSN from which the payment directive arises. For example, an EFSN could be a closed system in that the EFSN will only facilitate payments to a closed list of payees. In such a case, that EFSN could cooperate with another open EFSN to make a payment to a payee that is not a member of the closed list. In the example of FIGS. 7, 9A and 9B, central network station 705A determines that customer B is a customer of EFSN 200B. The recipient's unique identifier associated with EFSN 200B is included in the possible match information transmitted at step 945. The location of customer B could be stored by EFSN 200A in a persistent state in a data repository. In this manner, EFSN 200A would not have to search for customer B if another payment is directed to customer B.

Central network station 705A prepares and transmits an inter-network payment directive message, including at least the unique identifier and payment amount, to central network station 705B, step 955. The message could also include remittance advice, such as the name of the payer. This payment directive message is structured according to payment message subset 415 of CMS 401 criteria, and secured as described above if necessary. It should be noted that the payment directive message does not include any information identifying funding accounts associated with either customer A or customer B. Central network station 705B then transmits an acceptance or decline message back to central network station 705A, step 960. At step 965, central network station 705A determines if the payment has been accepted for execution by central network station 705B. If central network station 705B declines to execute the payment for some reason, central network station 705A could either issue the payment itself in paper form, determine another EFSN which could issue the payment, or decline the request. The acceptance or decline message will be structured according to the payment message subset 415 of CMS 401 criteria, and will also be secured if necessary.

In the present example, central network station 705B accepts the payment request for execution. Upon receiving an acceptance message, central network station 705A debits an account associated with customer A, step 970. This debit is preferably electronic, though it may be by a check or draft. In any event, this debit results in a credit to an account associated with EFSN 200A maintained at TSP one 715A. If electronic, central network station 705A transmits a payment directive to TSP one 715A via communication link 750D. TSP one 715A electronically obtains funds from the customer A account. It should be noted that the account associated with customer A could be maintained at any financial institution, or could be a stored value account maintained by central network station 705A, or be another type account. If the account is maintained at a financial institution, to electronically debit customer A's account, the account must be maintained at a financial institution that is a part of at least one electronic funds transfer network. It should also be noted that if this debit is unsuccessful, the payment transaction couldn't be completed. Funds availability could be determined or funds could be obtained from the payer before the payment request is transmitted from one EFSN to another EFSN.

After central network station 705B accepts the payment for execution, central network station 705B credits an account associated with customer B, step 975. This crediting could take place after settlement between EFSNs has taken place, or before. It should be understood that the debit of step 970 and the credit of step 975 are not dependent upon one another. That is, they are separate financial transactions. Furthermore, though step 975 is shown as being subsequent to step 970 in FIG. 9B, it could be concurrent with step 970 or precede step 970.

Many EFSNs maintain payee pick-lists for their customers. Payee pick-lists are lists of frequent payees. Some pick-lists are customer specific, while others are available to all customers of an EFSN. Some EFSNs allow customers to add a given payee to a customer specific payee pick-list before a customer directs that a payment be made on their behalf to the given payee. The present invention enables a central network station to locate that given payee, as described above, and store the location information in that customer's pick-list. Thus, whenever that customer wishes to pay that payee, the above described location operations do not have to be performed. Of course, a customer could also add a payee to a customer specific pick-list after that customer has directed to a payment be made to that payee.

The inter-network directory server 301, could also include in the directory one or more subsets of each EFSN's customers. For example, any EFSN could post a list of customers who often receive payments, such as merchants and/or service providers and other billers. These lists would be smaller in size than broad customer lists and thus easier to store and access to search for payees. Furthermore, merchants and/or billers could supply information indicating the EFSN of which they are customers, along with their unique identifiers to their customers. In turn, the customers could include this information in payment directives transmitted to their respective central network stations. This information could be supplied with a bill or invoice, either presented electronically or presented on paper. The bill or invoice could be for services rendered, such as a utility, or for goods purchased, either on-line or at a brick-and-mortar store.

It should be clear from the above-described example that electronic payments across EFSNs require a minimal number of messages between EFSNs in accordance with the present invention. The majority of the processing to effect an inter-network payment is performed by the originating EFSNs. Also, the majority of the data necessary to effect inter-network payments is retained by the originating EFSNs. Thus, any customer-specific payee lists are maintained by those customers' EFSNs. Also, future-dated payment requests and recurring payment requests are maintained by originating EFSNs. As well, customer-specific payment histories are also maintained by those customers' EFSNs. And, any customer-care or self-care requests are also supported from data maintained by requesting customers' EFSNs. Inter-network customer care messages can include requests for event histories stored by other EFSNs. These messages will, as above, be structured according to the universal customer care and service message set 410 of the CMS 401. Any information which must travel between EFSNs is transmitted in a "just in time" manner. That is, information is not transmitted until and unless it needs to be acted upon. Also, messages between EFSNs could be batch file transmissions, real-time in-session transmissions, or by asynchronous messaging.

Inter-Network Settlement

Settlement between EFSNs 200A and 200B can occur through a common Electronic Funds Transfer mechanism. That is, if TSP one 715A and TSP two 715B are members of the same financial network, such as the ACH network, settlement is by electronic funds transfers between accounts. Settlement is performed periodically. Preferably settlement is performed daily, though it could be performed at other times and according to other periods.

An EFSN (source EFSN) identifies the total amount of payments directed to a given other EFSN (target EFSN) for a period. Of course, settlement could be net settlement, i.e., credits from the target EFSN could be taken into account. The source EFSN generates a funds transfer request directed to the target EFSN's TSP. This request includes an identifier of the source EFSN, an identifier of the source EFSN's account at the TSP, an identifier of the target EFSN's TSP and identifier of the target EFSN's account at the target EFSN's TSP, and the total amount to be transferred. This total amount is the identified total amount of payments directed to the target EFSN that period. The source TSP causes funds in this amount to be transferred, preferably electronically, to the target EFSN account at the target TSP. Some EFSNs have the capability to perform settlement without a TSP. In such instances, a central network station accesses a financial network itself.

The source EFSN also provides a detailed list of all payments directed to the target EFSN for the period. Each entry in the list includes at least information identifying the payer, information identifying the payee, preferably the unique identifier by which the target EFSN knows the payee, and the amount of the payment.

Inter-Network Remittance Advice

In conventional EFSN payments, a recipient of a payment is typically notified of the payment by the EFSN executing the payment. If the payment is a paper payment, the check or draft itself serves to notice the recipient of the payment. Oftentimes other information is printed on the check or on attached material. This other information is known as remittance advice. For example, remittance advice associated with payment of a bill conventionally includes the payer's name and any account number by which the recipient identifies the payer. When a payment is made electronically, remittance advice is also typically supplied to the payee. The remittance advice is delivered to the payee electronically.

The present invention also supports transmission of remittance advice across EFSNs. Remittance advice for any given payment is generated by the originating EFSN. The generated remittance advice is formulated into an inter-network remittance advice message according to CMS 401 criteria, including the recipient's unique identifier. The remittance advice message is then secured if necessary, as described above, and transmitted to the central network station of the EFSN of which the recipient is a customer. Remittance advice can be supplied by the originating EFSN in at least two ways. First, as part of a batch of payments. Secondly, remittance advice could be supplied in real-time, associated with the individual payment directive sent from the originating EFSN. The receiving central network station electronically delivers the remittance advice to the recipient. The receiving central network station determines the content of the remittance advice delivered to the recipient, the format of the delivered remittance advice, and in what manner the remittance advice is delivered to the recipient.

International Inter-Network Payment and Settlement

Figure 8:
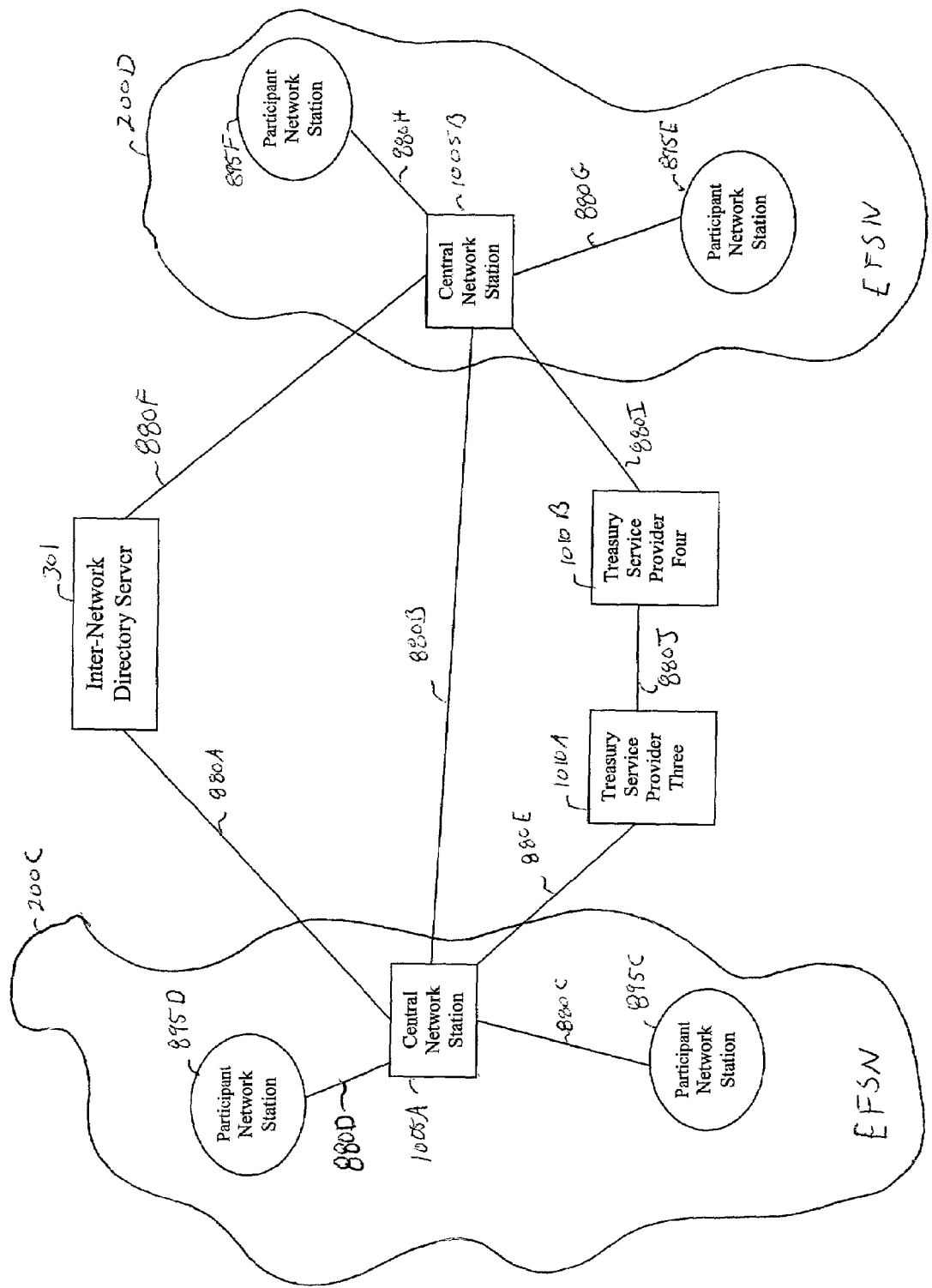
FIG. 8 is a schematic diagram of the communication links between the inter-network directory server, two central network stations, four participant network stations, and two treasury service providers in accordance with a second aspect of the present invention.

Introduced above, a special subset of inter-network payments is international inter-network payments. These payments often involve currency conversion. The following example illustrates international inter-network settlement in accordance with the present invention. FIG. 8 depicts two EFSN networks, EFSN 200C and EFSN 200D. For this example, EFSN 200C is located in the United States of America and EFSN 200D is located in Germany. It will be appreciated that EFSN 200C and EFSN 200D could be located in any two different countries.

EFSN 200C includes a central network station 1005A configured to, among other activities, facilitate international inter-network payments. Also included in EFSN 200C are participant network stations 895C and 895D. EFSN 200C is associated with TSP three 1010A. Central network station 1005A communicates with the inter-network directory server 301 via communication link 880A, with central network station 1005B via communication link 880B, with participant network station 895C via communication link 880C, with participant network station 895D via communication link 880D, and with TSP three 1011A via communication link 880E. EFSN 200D includes a central network station 1005B configured to, among other activities, facilitate international inter-network payments. Also included in EFSN 200D are participant network stations 895E and 895F. EFSN 200D is associated with TSP four 1010B. Central network station 1005B communicates with the inter-network directory server 301 via communication link 880F, with central network station 1005A via communication link 880B, with participant network station 895E via communication link 880G, with participant network station 895F via communication link 880H, and with TSP four 1010B via communication link 880I. TSP three 1010A and TSP four 1010B communicate via communication link 880J. In this example of international inter-network payments, neither EFSN 200C nor EFSN 200D require secure communications with other EFSNs. Though, it will be appreciated that one or more EFSNs involved in international inter-network payments could require secure communications. Though not depicted, other components could be included in either or both of EFSN 200C and EFSN 200D.

Two customers of EFSN 200C, customer C and customer D, direct that payments be made on their behalf. Customer C directs, utilizing participant network station 895C, that the sum of 50 United States Dollars ($) be paid to recipient E and that the sum of 100 German Deutsche Marks (DM) be paid to recipient F. Customer D directs, utilizing participant network station 895D, that the sum of 75 DM be paid to recipient E, and that the sum of $50 be paid to recipient F. Each of these individual payment directives are structured as described above in inter-network payments. After receiving the payment directives central network station 1005A searches for the recipients, as described above. In this example, the search reveals that each of the recipients is a customer of EFSN 200D.

Central network station 1005A, after locating the recipients, generates and transmits four inter-network payment directives to central network station 1005B via communication link 880B, as described above. To obtain funds from customer C, central network station 1005A calculates the value of 100 DM in United States Dollars. As an example only, this value could be $85. Central network station 1005A could then twice debit, preferably electronically, an account associated with customer C, one debit being for $85, the other for $50. Or, central network station 1005A could debit this account once for the amount of $135, the sum of the two payments in United States Dollars.

Central network station 1005A also performs a conversion for the payment in German Deutsche Marks directed by customer D. As an example only, this conversion could result in a value of $64. As above, two debits, one for $64 and one for $50 could be initiated against an account associated with customer D. Or, one debit for $114 dollars could be initiated against the customer D account. Preferably, the conversion rate is obtained from TSP three 1010A, though it could be obtained elsewhere. TSP three 1010A could reserve blocks of funds to stabilize the conversion rate.

Central network station 1005A, to perform settlement between EFSN 200C and EFSN 200D, directs, via communication link 880E, TSP three 1010A to transfer the sum of $100 to an account associated with EFSN 200D maintained at TSP four 1010B. Central network station 1005A also directs TSP three 1010A to transfer the sum of 175 DM to this account. The $100 is the sum of the payments directed to be made in United States Dollars, and the 175 DM is the sum of the payments directed to be made in German Deutsche Marks.

TSP three 1010A debits the EFSN 200C account for the amount of $100. TSP three 1010A also converts 175 DM into United States Dollars and debits the EFSN 200C account for the determined amount of United States Dollars. This conversion rate is preferably transmitted to TSP three 1010A by the central network station 1005A.

Central network station 1005B, after receiving the four payment directives, makes payment to each of the recipients. These could be either electronic payments or paper payments. For payments which were directed to be in United States dollars, payment processor 1005B preferably makes these payments according to the conversion rate at which the funds were deposited into the EFSN 200D account.

Inter-Network Billing

The present invention enables a biller to electronically present bills to payers that are not a part of an EFSN of which the biller is a part, the biller's home network. The biller need not change or in any way modify conventional electronic procedures. The biller need not be aware that a payer is not a part of the biller's home network. Likewise, a payer need not be aware that a biller is not a part of the payer's home network, though a payer certainly could be aware. In any event, operations for inter-network billing in accordance with the present invention do not change based upon either a biller's knowledge, or lack thereof, of a payer's home network, or a payer's knowledge, or lack thereof, of a biller's home network. The operations to electronically present bills across EFSNs are performed by the EFSNs. Inter-network billing messages are structured according to the billing message subset 420 of the CMS 401.

Figure 11:
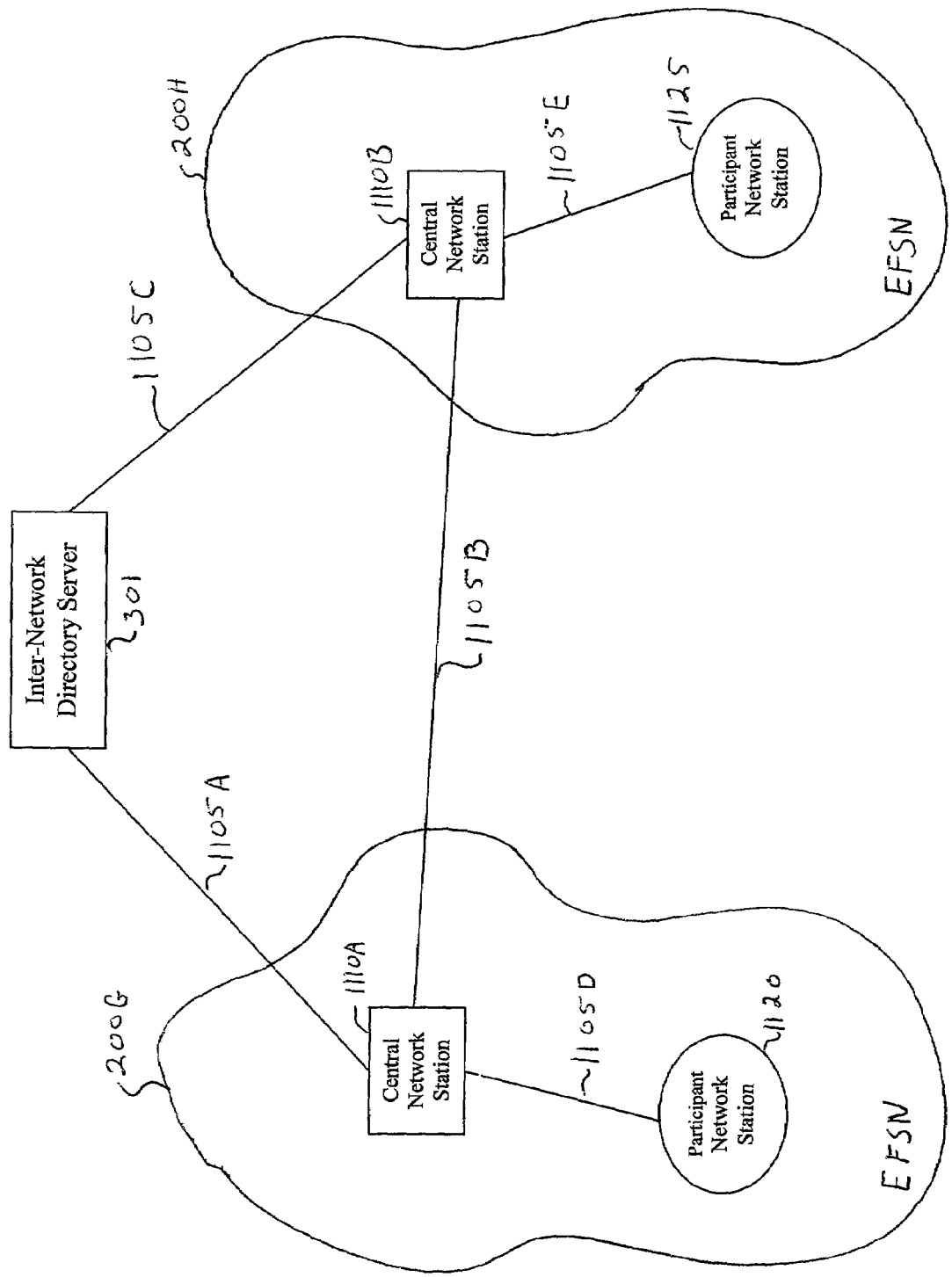
FIG. 11 is a schematic diagram of the communication links between the inter-network directory server, two central network stations, and two participant network stations in accordance with a fourth aspect of the present invention.

FIG. 11 depicts EFSN 200G in communication with the inter-network directory server 301 via communication link 1105A and in communication with EFSN 200H via communication link 1105B. FIG. 11 also depicts EFSN 200H in communication with the inter-network directory server 301 via communication link 1105C. It should be noted that CA 701 is not shown in FIG. 11 because, in this example, both EFSNs 200G and 200H do not require security. Though, it will be understood that both, or only one of, EFSN 200G and 200H could require security.

Also shown in FIG. 11, EFSN 200G includes a central network station 1110A which, among other capabilities, as will be understood from the discussion herein, presents electronic bills. Also shown, EFSN 200H includes a central network station 1110B which also, among other capabilities, presents electronic bills. As in the previous examples, central network stations 1110A and 1110B are shown in direct communication with the inter-network directory server 301. And, also as in the previous examples, one or more other processors and/or servers could be between a central network station and one or more of these components. Also depicted is participant network station 1120, which is associated with customer E of EFSN 200G, in communication with central network station 1110A via communication link 1105D. Thus, EFSN 200G is the home network of customer E. Also shown is participant network station 1125 in communication with central network station 1110B via communication link 1105E. Participant network station 1125 is associated with customer F of EFSN 200H. Thus, EFSN 200H is the home network of customer F. EFSN 200H electronically presents bills on behalf of customer F. Because customer F is a biller, customer F will be referred to as biller F from this point forward.

It will be appreciated that conventionally EFSN 200H could only electronically present a bill to a customer of biller F if that customer was also a customer of EFSN 200H. That is, if that customer's home network was EFSN 200H. In this example, customer E is a customer of biller F. Customer E is also a customer of EFSN 200G, not EFSN 200H. Thus, conventionally, customer E could not electronically receive a bill from biller F via EFSN 200G. However, the present invention enables a bill generated by a biller whose home network is different than the home network of a customer of the biller to be electronically presented to the customer via the customer's home network.

Figure 12:
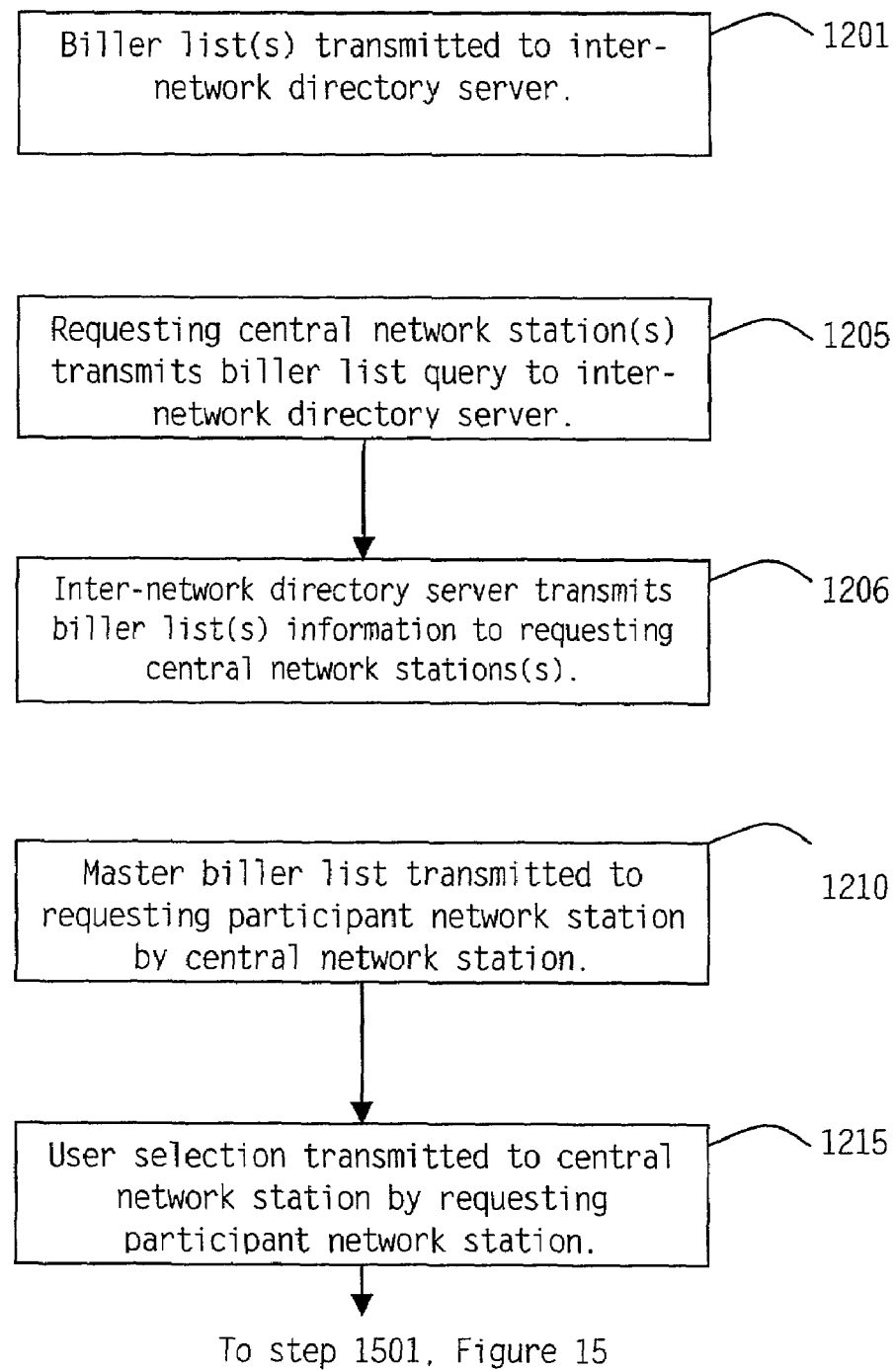
FIG. 12 is a simplified flow diagram of first alternative processing to initiate inter-network biller activation in accordance with the present invention.
Figure 13:
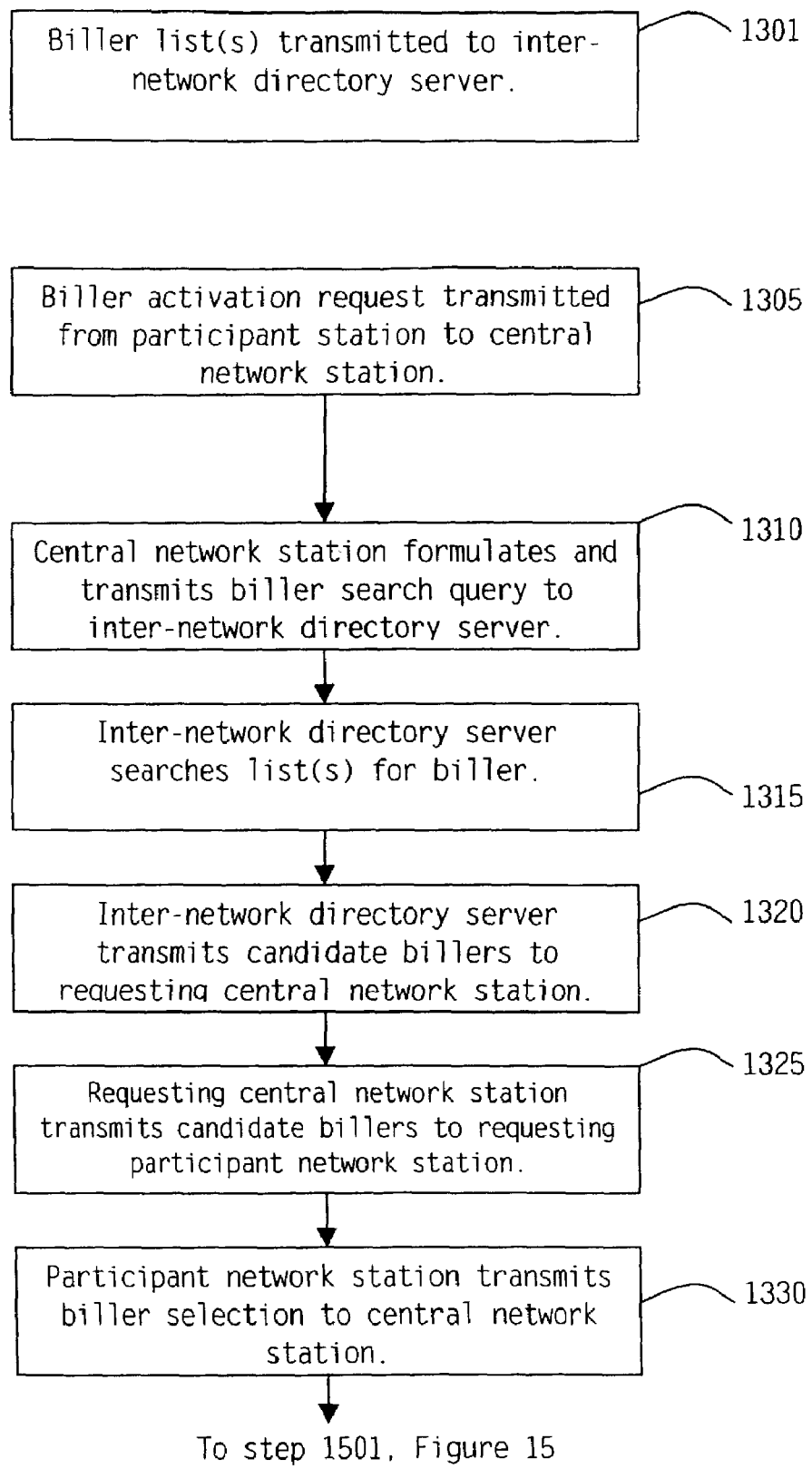
FIG. 13 is a simplified flow diagram of second alternative processing to initiate inter-network biller activation in accordance with the present invention.
Figure 14:
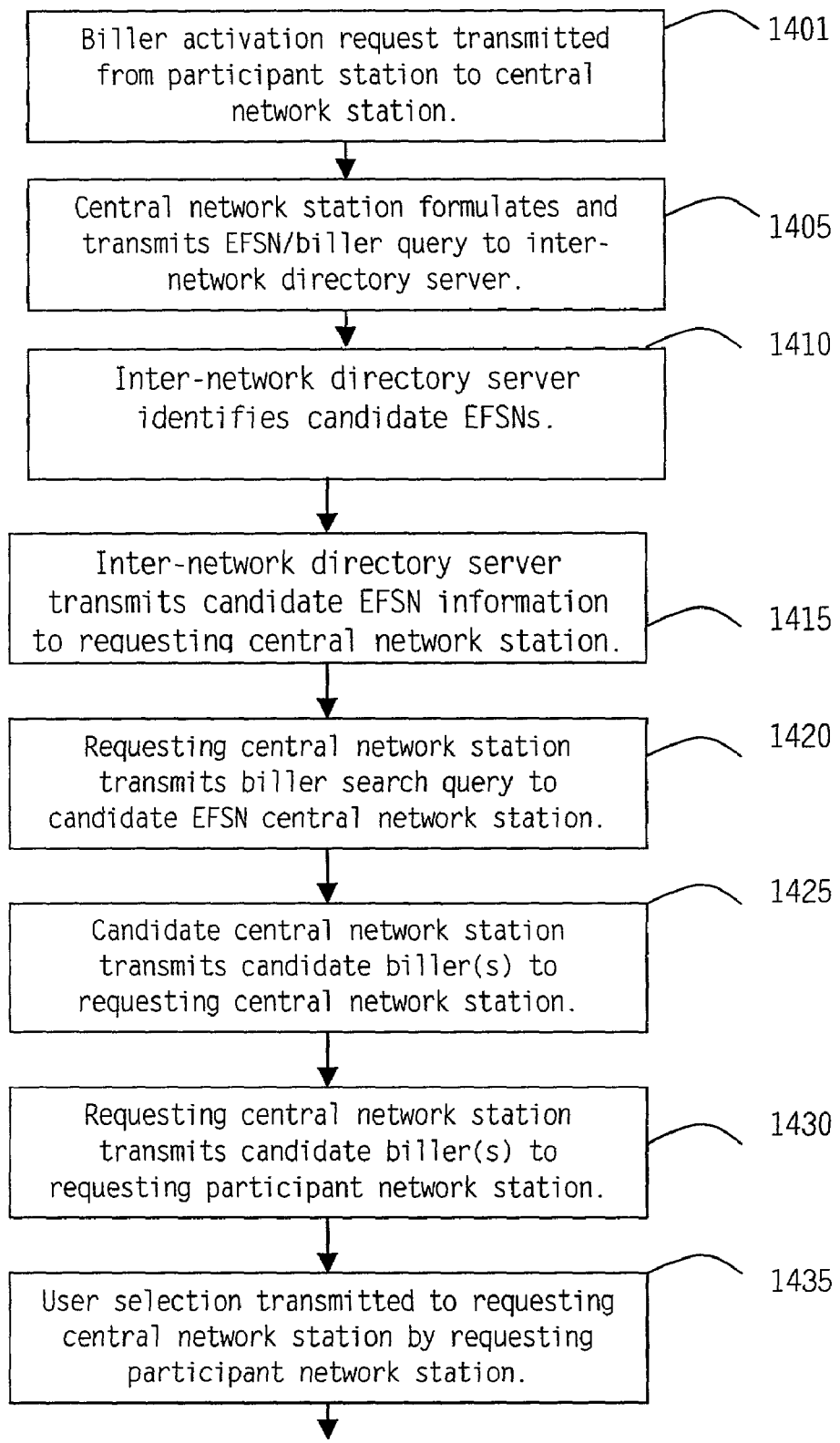
FIG. 14 is a simplified flow diagram of third alternative processing to initiate inter-network biller activation in accordance with the present invention.
Figure 15:
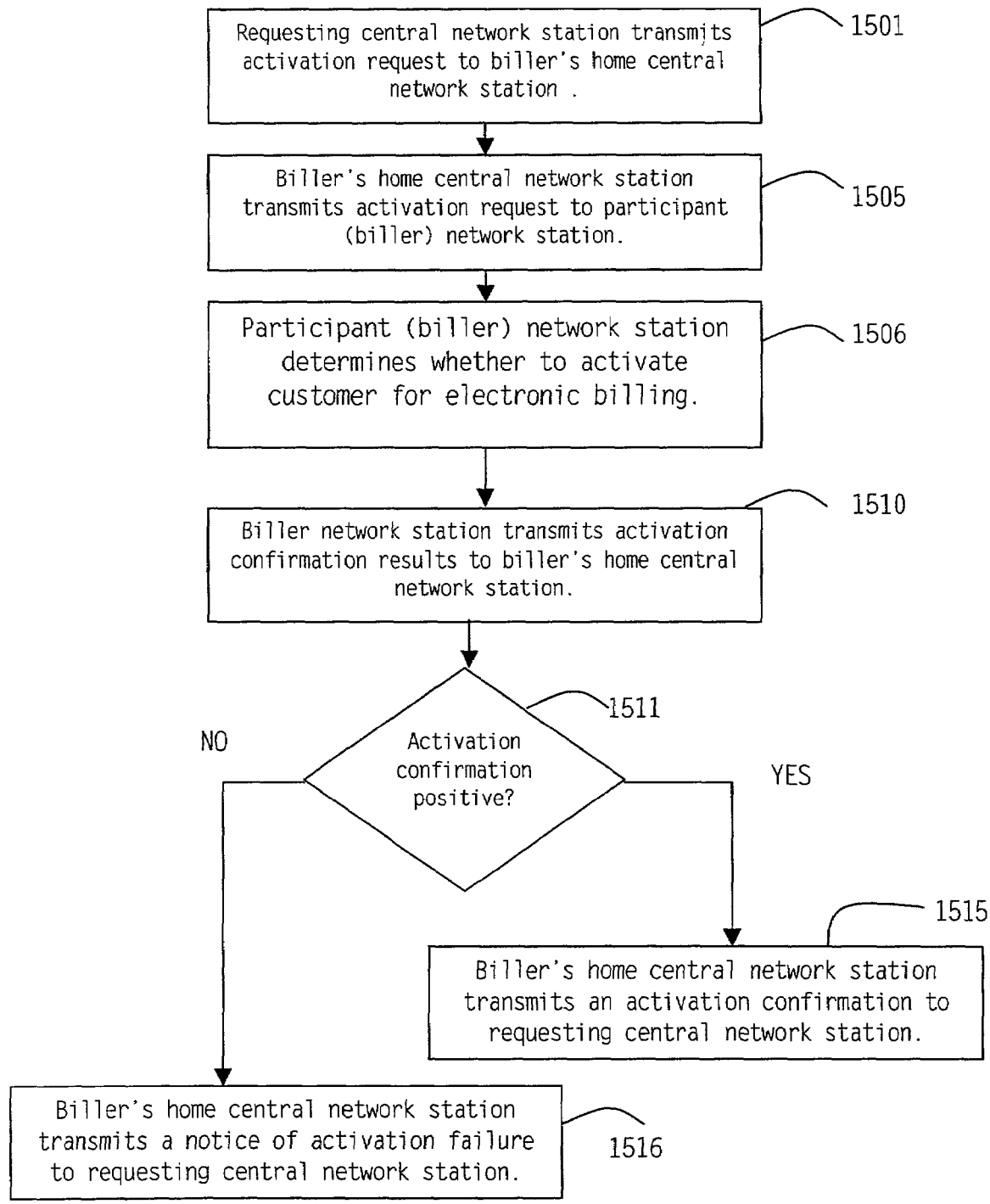
FIG. 15 is a simplified flow diagram of processing to complete inter-network biller activation in accordance with the present invention.

As will be understood by one skilled in the art, customer E must first activate electronic billing from biller F before customer E can electronically receive a bill from biller F. The present invention includes several biller activation options. FIGS. 12–14 are flow charts depicting alternative biller activation operations involving a participant network station associated with a customer requesting activation, a central network station of that customer's home network, and the inter-network directory server 301. FIG. 12 depicts biller activation according to a first option. FIG. 13 depicts biller activation according to a second option. FIG. 14 depicts biller activation according to a third option. FIG. 15 is a flow chart depicting biller activation and bill presentment operations involving the participant network station associated with the customer, the central network station of the customer's home network, and the central network station of the biller's home network subsequent to the operations shown in FIGS. 12–14.

In the first and the second options, any one, any combination, or all EFSNs maintain and electronically publish a list of billers associated with a respective EFSN. In the present example, biller F is included in the list associated with EFSN 200H. Associated with each entry in a list is information identifying a given biller. Preferably, this information includes the biller's name, address, and unique identifier used within that biller's home EFSN, as well as information identifying that biller's home EFSN. This list, as well lists maintained by other EFSNs, is transmitted to and maintained at the inter-network directory server 301 according to the first and second options. As shown in step 1201 of FIG. 12, and in step 1301 of FIG. 13, each list is transmitted to the inter-network server 301. It should be understood that transmission of lists to the inter-network directory server by various EFSNs is not triggered by a customer request for biller activation. Furthermore, transmission of lists to the inter-network directory server by various EFSNs does not trigger requests for such lists from various central network stations. In the present example, central network station 1110B transmits the list of billers associated with EFSN 200H to the inter-network directory server 301 via communication link 1105C. Preferably, the lists transmitted to the inter-network directory server 301 by each EFSN are combined into a master list of all billers. However, the lists could be maintained separately by the inter-network directory server 301. It should be understood that each EFSN transmits list updates to the inter-network directory server 301 periodically or as needed.

According to the first option, the master list or individual lists are downloaded from the inter-network directory server 301 by each EFSN. In the present example, central network station 1110A transmits a biller list query to the inter-network directory server 301, step 1205 of FIG. 12 via communication link 1105A. This query is structured according to the CMS 401. The inter-network directory server 301 retrieves the biller information and transmits it to central network station 1110A via communication link 1105A, step 1206 of FIG. 12. The billers included in each downloaded list, as well as billers associated with the EFSN downloading the list or lists, can then be searched to identify a biller for activation. In this first option, a master biller list of all available billers, including those associated with EFSN 200G, EFSN 200H, as well as other EFSNs, are transmitted to participant network station 1120, via communication link 1105D and at step 1210 of FIG. 12, after the customer requests biller activation. Customer E selects biller F from the list for activation. This list could be presented in a pull-down menu, or in another form. The presented list preferably includes only biller names, but it could also include other information identifying billers. Also, only a portion of the list could be transmitted to the participant network station 1120. Once customer E selects a biller, in this example, biller F, this selection is transmitted to central network station 1110A from participant network station 1120 via communication link 1105D, step 1215 of FIG. 12. The biller activation request is now pending. Operations continue with step 1501 of FIG. 15.

According to the second option, the lists are not downloaded from the inter-network directory server 301, rather the biller lists are maintained at the inter-network directory server. It will be understood that lists from multiple EFSNs could be combined into a single master list. As an example of utilizing this option, customer E transmits a request to activate biller F utilizing participant network station 1120A and via communication link 1105D, step 1305. This request includes, at a minimum, the biller's name. Though, preferably, the request includes additional identifying information. Central network station 1110A determines if the requested biller is a customer of EFSN 200G. In this example, biller F is not a customer of EFSN 200G, thus central network station 1110A formulates a biller search query and transmits the query to the inter-network directory server 301 via communication link 1105A, step 1310. It will be understood that the biller search query is structured according to the CMS 401. The query preferably includes all the identifying information provided by customer E. The inter-network directory server 301 then searches for the biller utilizing the criteria supplied by the central network station 1110A, step 1315. If the inter-network directory server 301 stores individual biller lists associated with single EFSNs, the central network station 1110A could include in the query limiting information. For example, the query could contain a request billers whose home EFSN is within a given geographical region. Further, the central network station 1110A could identify candidate networks, and the query would then be for a search of the list associated with the candidate network. Upon identification of candidate billers, the information associated with that biller maintained by the inter-network directory server 301 is transmitted to central network station 1110A via communication link 1105A, step 1320. This transmission is structured according to the CMS 401. The central network station 1110A then transmits, if any candidate billers have been returned, the candidate billers to the participant network station 1120 via communication link 1105D, step 1325. If no candidate billers have been returned, the central network station 1110A could either inform customer that biller activation is unavailable for this biller, or further identifying information could be requested from the customer. In the present example, biller F is included in the returned results. As in the previous option, customer E selects biller F from the presented list and transmits this selection to central network station 1110A via communication link 1105D, step 1333. The biller activation request is now pending. Operations continue with step 1501 of FIG. 15.

It will be recognized that the first two options require storage of lists. The third option does not require storage of biller a list or lists of billers by the inter-network directory server 301. Operations to identify a biller in this third option, as will be recognized, are similar to identification of a payee in inter-network payments discussed above. In step 1401, and via communication link 1105A, customer E transmits a request to activate biller F utilizing participant network station 1110A. This request is the same customer request as in option two. Central network station 1110A determines if the requested biller is a customer of EFSN 200G. In this example biller F is not a customer of customer EFSN 200G. Central network station 1110A generates and transmits a candidate EFSN/biller search query to the inter-network directory server 301, step 1405 and via communication link 1105A. This query is structured according to the CMS 401. This query is a request for the inter-network directory server 301 to identify candidate EFSNs of which biller F could be a customer. The query preferably includes all the identifying information supplied by customer E. The inter-network directory server 301 identifies candidate EFSNs according to the identifying information, step 1410. Information identifying candidate networks, as described above in inter-network payments, is transmitted to central network station 1110A, step 1415 of FIG. 14 and via communication link 1105A. The information include identifiers of candidate EFSNs and identifiers of paths to electronically reach the candidate EFSNs.

In the present example, the inter-network directory server returns only one candidate EFSN, EFSN 200H. As in inter-network payments discussed above, multiple candidate EFSNs could be returned, or no candidate EFSN could be returned. If no candidate networks are returned, biller activation fails. If multiple candidate networks are returned, the operations depicted in steps 1420–1435 are repeated for each returned candidate network until the biller is either found or each candidate network has been queried. Central network station 1110A generates and transmits a biller search query to the central network station 1110B according to CMS 401 criteria, step 1420 via communication link 1105B. Central network station 1110B then searches for and returns information identifying possible biller matches to central network station 1110A via communication link 1105B, step 1425. This return transmission is structured according to the CMS 401. The candidate biller information, if any is returned, is then transmitted from central network station 1110A to participant network station 1120 via communication link 1605D, step 1430. As in the previous options, customer E selects biller F from the presented candidate billers and transmits this selection to central network station 1110A via communication link 1105D, step 1435. The biller activation request is now pending. Operations continue with step 1501 of FIG. 15.

In step 1501 of FIG. 15, central network station 1110A transmits an activation request to central network station 1110B via communication link 1105B. This activation request is structured according to the CMS 401. The activation request includes information, identifying customer E to biller F. This information includes at least a merchant account number by which customer E is known to biller F. The activation request also includes preferably the unique identifier by which biller F is known to EFSN 200H.

After receipt of the activation request, central network station 1110B transmits an activation request to biller network station 1125 via communication link 1105E, step 1505. This activation request between central network station 1110B and biller network station 1125 is no different than an activation request for a customer of both EFSN 200H and biller F. This activation request could be either in session (via a request/response protocol) or asynchronous (via a periodic batch file interface or a messaging interface). The biller then determines whether to accept the activation request, step 1506. The biller then transmits an activation confirmation to central network station 1110B utilizing biller network station 1125 and via communication link 1105E, step 1510. The confirmation can include information, such as corrective account information, directed to central network station 1110A, 1110B, or the requesting customer. At step 1511, central network station 1110B determines if the activation request was accepted by the biller. Central network station 1110B preferably stores an indication that customer E is a customer of EFSN 200G. If the activation request has been accepted, central network station 1110B also transmits an activation confirmation to central network station 1110A via communication link 1105B, step 1515. If the activation request was not accepted, at step 1516 a notice of activation failure is transmitted to central network station 1110A. The activation confirmation or notice of activation failure is transmitted according to the CMS 401. Preferably, the confirmation or notice of failure is transmitted in session. However, if communications between central network station 1110B and biller network station 1125 are asynchronous, this will be sent as a subsequent event message. Upon receipt of an activation confirmation, biller activation is no longer pending, but approved. The central network station 1110A propagates the results of the activation to customer E. This can be made by a variety of means, including transmission of a message to the participant network station associated with customer E.

It will be recognized by one skilled in the art that often a biller requires either additional information than that supplied in an activation request, or even corrective information. If this is the case with inter-network biller activation, biller network station 1125 transmits a request for additional or corrective information to central network station 1110B.

This request is then structured according to the CMS 401 and transmitted to central network station 1110A by central network station 1110B. Central network station 1110A could have the requested information available, or could transmit a request to participant network station 1120 for the requested information. In any event, the requested information is transmitted back to central network station 1110B by central network station 1110A, via the CMS 401. Then, the requested information is transmitted to biller network station 1125 by central network station 1110B. Biller activation then proceeds as described above.

Figure 16A:
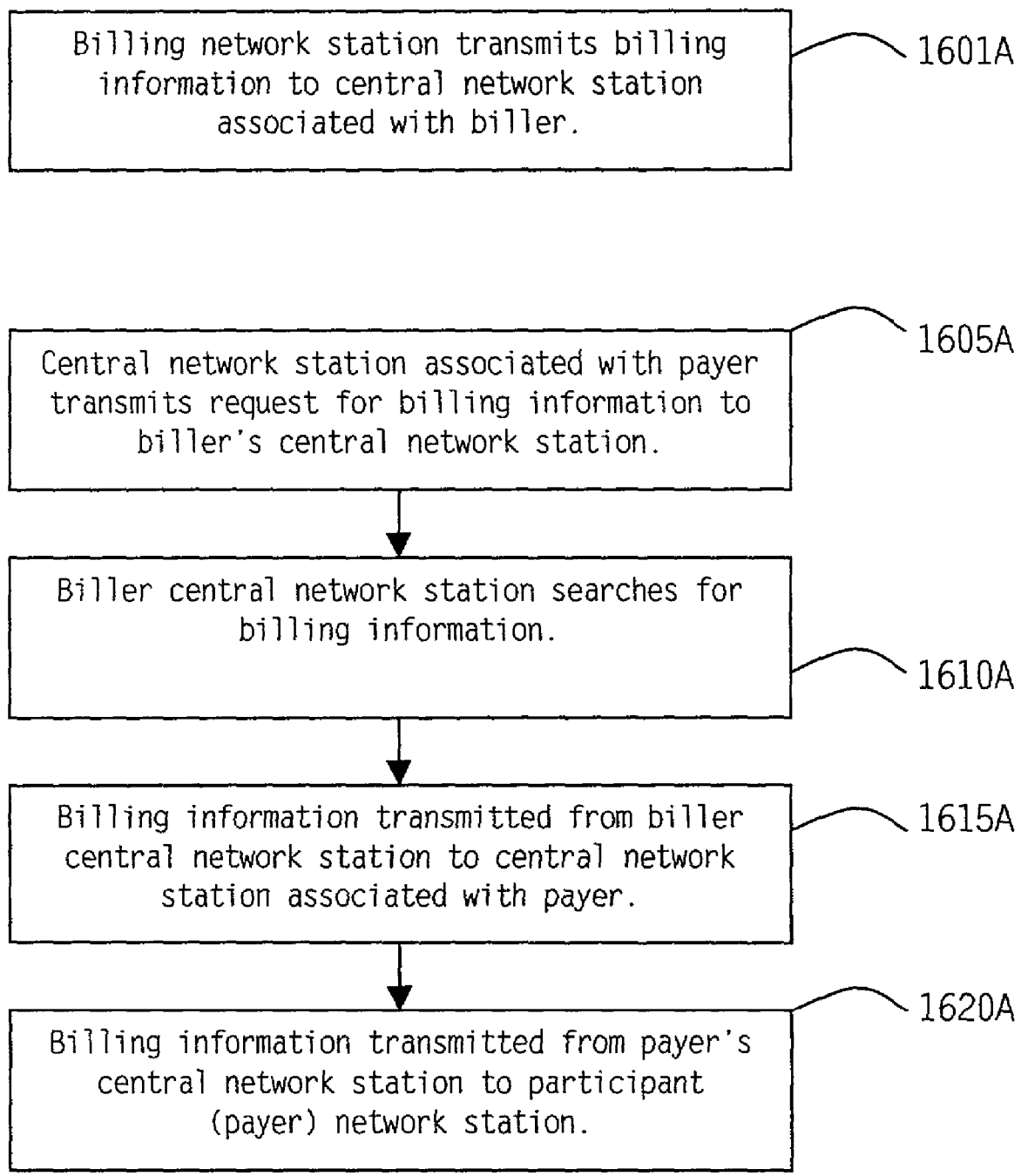
FIGS. 16A–16B are simplified flow diagrams of processing to perform inter-network bill presentment in accordance with the present invention.

FIG. 16A is a flow chart depicting first optional inter-network billing operations subsequent to successful biller activation. Customer E will be referred to as payer E for discussion of bill delivery. At step 1601A, and via communication link 1105E, billing information for payer E is transmitted from biller network station 1125 to central network station 1110B. This transmission is not made in response to any request. This billing information could be summary billing information, or detailed billing information. If summary billing information, a pointer, e.g. URL, to detailed billing information would also be transmitted. In this first option, the billing information is stored at central station 1110B. Either periodically, or upon request by payer E, central network station 1110A transmits a request via communication link 1105B for billing information directed to payer E, step 1605A. Thus, billing information is pulled from central network station 1110B by central network station 1110A. Central network station 1110B searches for billing information for payer E, step 1610A. It will be appreciated that central network station 1110A could request billing information directed to all customers of EFSN 200G, and all such billing information could be returned. In any event, billing information for payer E is then transmitted, via the CMS 401 and over communication link 1105B from central network station 1110B to central network station 1110A, step 1615A. The billing information is then transmitted from central network station 1110A to participant network station 1120 via communication link 1105D, step 1620A.

Figure 16B:
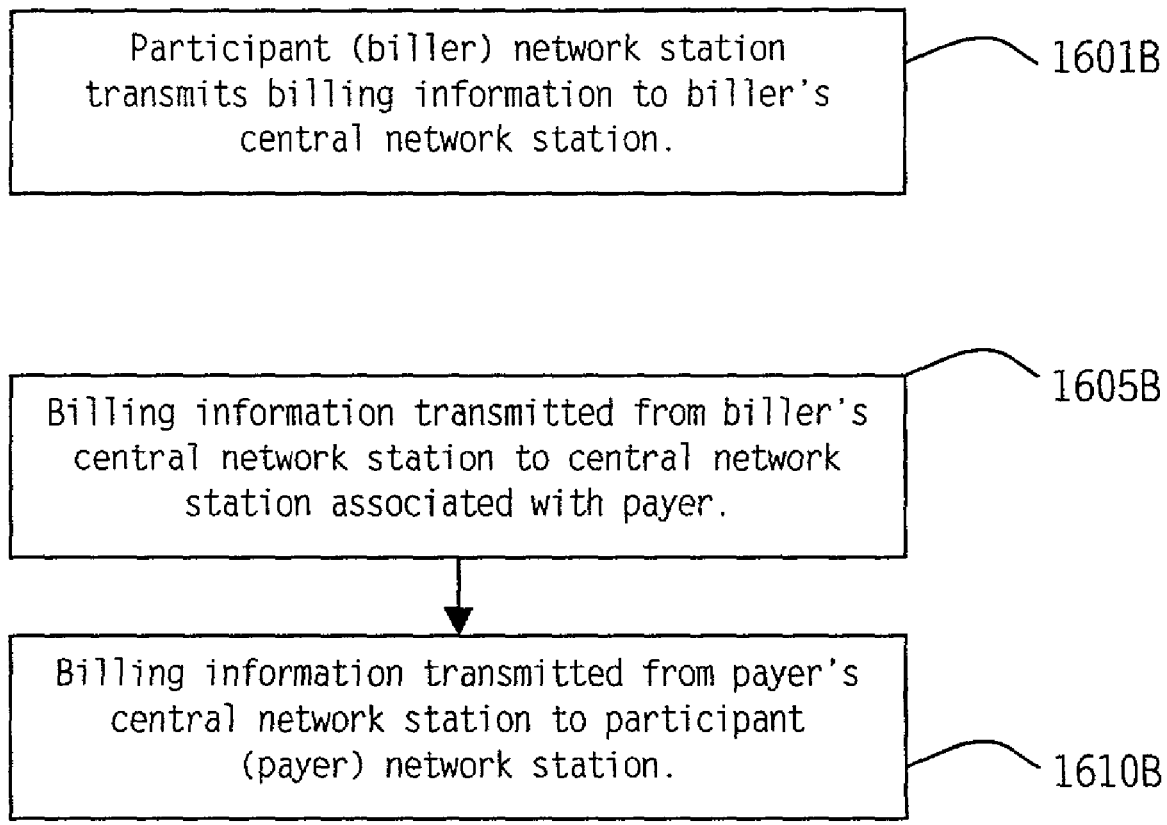

FIG. 16B is a flow chart depicting second optional inter-network billing operations subsequent to successful biller activation. At step 1601B, and via communication link 1105E, billing information for payer E is transmitted from biller network station 1125 to central network station 1110B, without a request. This billing information could be summary billing information, or detailed billing information. If summary billing information, a pointer, e.g. URL, to detailed billing information would also be transmitted. In this second option, the billing information is transmitted to central network station 1110B without a request, step 1605B. Thus, billing information is pushed by central network station 1110B to central network station 1110A. It will be appreciated that as a central network station stores an indication of the EFSN with each a customer is associated, the central network station can push billing information to many other central network stations. The pushed billing information is then transmitted from central network station 1110A to participant network station 1120 via communication link 1105D, step 1610B. It will be appreciated that the billing information could be transmitted to participant network station 1120 automatically, or upon request by customer E. That is, the billing information could be stored at central network station 1110A until requested, or could be pushed to participant network station 1120. In either option, electronic bill presentment from a central network station to a participant network station is in the form and according to operations determined by an individual EFSN. That is, the present invention does not disturb established bill presentment procedures. Further, it will be appreciated that the inter-network payments provisions described earlier enable a customer associated with a first EFSN to not only electronically receive a bill from a biller that is associated with a second EFSN, but to electronically pay that bill.

International Inter-Network Billing

The present invention enables a bill from a payer in one country to be electronically presented to a customer (payer) in a second country. As will be understood, bills are typically presented in the currency of the country in which the biller is located. For bills presented internationally, a currency conversion must be made if the customer is to pay the bill in the currency of the customer's country. Introduced above, the present invention provides for currency conversion at the time a payment is made. The present invention also provides options for currency conversion at bill presentment.

In a first option, upon receipt of the billing information from a biller network station, the central network station receiving the billing information could determine a total amount billed, and perform currency conversion. The currency conversion could be based upon a conversion rate supplied by a TSP associated with that central network station's EFSN. Though, another source of a conversion rate could be used. For example, a currency conversion rate could be supplied by a TSP associated with an EFSN associated with the payer, with a TSP associated with the inter-network directory server 301, or another TSP or other source agreed upon by the EFSNs utilizing the present invention. The bill, with the amount owned calculated in the payer's currency, is then transmitted to the central network station associated with the payer's EFSN. Of course, the bill could also still include the amount owed expressed in the biller's currency. Conversion by the central network station associated with the biller is performed immediately upon receipt of the billing information if the billing information is to be transmitted in a push scenario, described above. If the billing information is to be transmitted in a pull scenario, the conversion could talk place at any time prior to the transmission.

In a second option, currency conversion is performed upon receipt of the billing information from a biller's EFSN by a central network station associated with a payer. As above, the payer's central network station determines an amount owed, obtains a conversion rate, and calculates the amount owned in the currency of the payer's country. The conversion rate could be supplied by any of the sources discussed above, or by another source. The bill is then electronically presented with the amount owed in the payer's currency, perhaps also with an indication of the amount owed in the biller's currency. The conversion could take place, in the option, as soon as the payer's central network station receives the billing information, or just prior of transmission of the billing information to the payer.

In a third option, the bill is presented to the payer in the biller's currency with the amount of the bill in the biller's currency. However, the electronically presented bill includes a link to, or other means to request, a conversion of the bill from the biller's currency to the payer's currency. This conversion could be only a conversion of the total amount due, or conversion of all financial amounts within bill detail included in the electronically presented bill. Upon request, the bill is presented to the payer in the payer's currency. The actual conversion could be performed upon request by the payer's central network station. The conversion could be based upon a current conversion rate obtained by the payer's central network station from any of the sources described above, or from another source. Further, the conversion rate could be a conversion rate in force the day the bill was issued by the biller, or at any time between issuance and presentment. Additionally, the conversion request could be performed by the biller's central network station. In such a case, a conversion request is transmitted by the payer's central network station to the biller's central network station. This request is via the CMS 401. The conversion is made by the biller's central network station, and then transmitted back to the payer's central network station, that then presents the conversion to the payer. As above, the conversion rate used could come from one of many sources, and be the rate in force on any day between bill issuance and the request for conversion.

Inter-Network Person-to-Person Invitation and Payment

Some conventional EFSNs offer what is commonly referred to as person-to-person payments, or P-2-P payments. Each customer of an EFSN is assigned a unique identifier. A payment from one customer to another customer is made by simply supplying the unique identifier of the payee and a payment amount to the EFSN by the payer. Funds are then electronically debited from an account associated with payer and electronically credited to an account associated with the payee. Typically, the payee is notified of receipt of funds by e-mail or other electronic message. Such payments have several advantages. In one advantage, information associated with parties to a transaction, including information identifying accounts of both the payer and payee, can be shielded from opposing parties to the transaction. These accounts, known as funding accounts, can be deposit accounts maintained at financial institutions, credit card accounts, or stored value accounts, among possible types of accounts. Different EFSNs utilize different types of funding accounts.

Associated with P-2-P payments are P-2-P invitations. Oftentimes a conventional EFSN offers to customers the opportunity to invite others to become customers of the that EFSN. Furthermore, some invitations are issued by EFSNs themselves. Invitations to become a customer are commonly referred to as P-2-P invitations. Invitations allow an EFSN's customer base to expand.

Typically, all that is required to issue a P-2-P invitation initiated by a customer is for the customer to supply an e-mail address of an invitee to the central network station of that customer's home EFSN. The central network station then generates an invitation in the form of an e-mail message and transmits the message to the invitee. The e-mail message can contain all manner of information, including information identifying the inviting customer. Advantageously, some EFSNs enable payments to be included with invitations. That is, a customer, or an EFSN itself, directs that funds be transferred to an invitee. These funds could be for payment of an obligation of some type, or could be a gift or other donation. Also, some EFSNs enable gift certificates to be included with invitations. The e-mail invitation includes an indication that the funds or certificate are available upon becoming a customer of that EFSN. An invitee could be a customer of a first EFSN, and receive an invitation from a second EFSN. That invitee may not wish to be a customer of multiple EFSNs. Or, may not wish to become a customer of the second ESFN because the second EFSN might not offer P-2-P payment in the form the customer wishes. The present invention enables the invitee to receive the benefit of electronic payments, in the form the invitee wishes, from customers of the second EFSN, while remaining a member of only the first EFSN.

Figure 17:
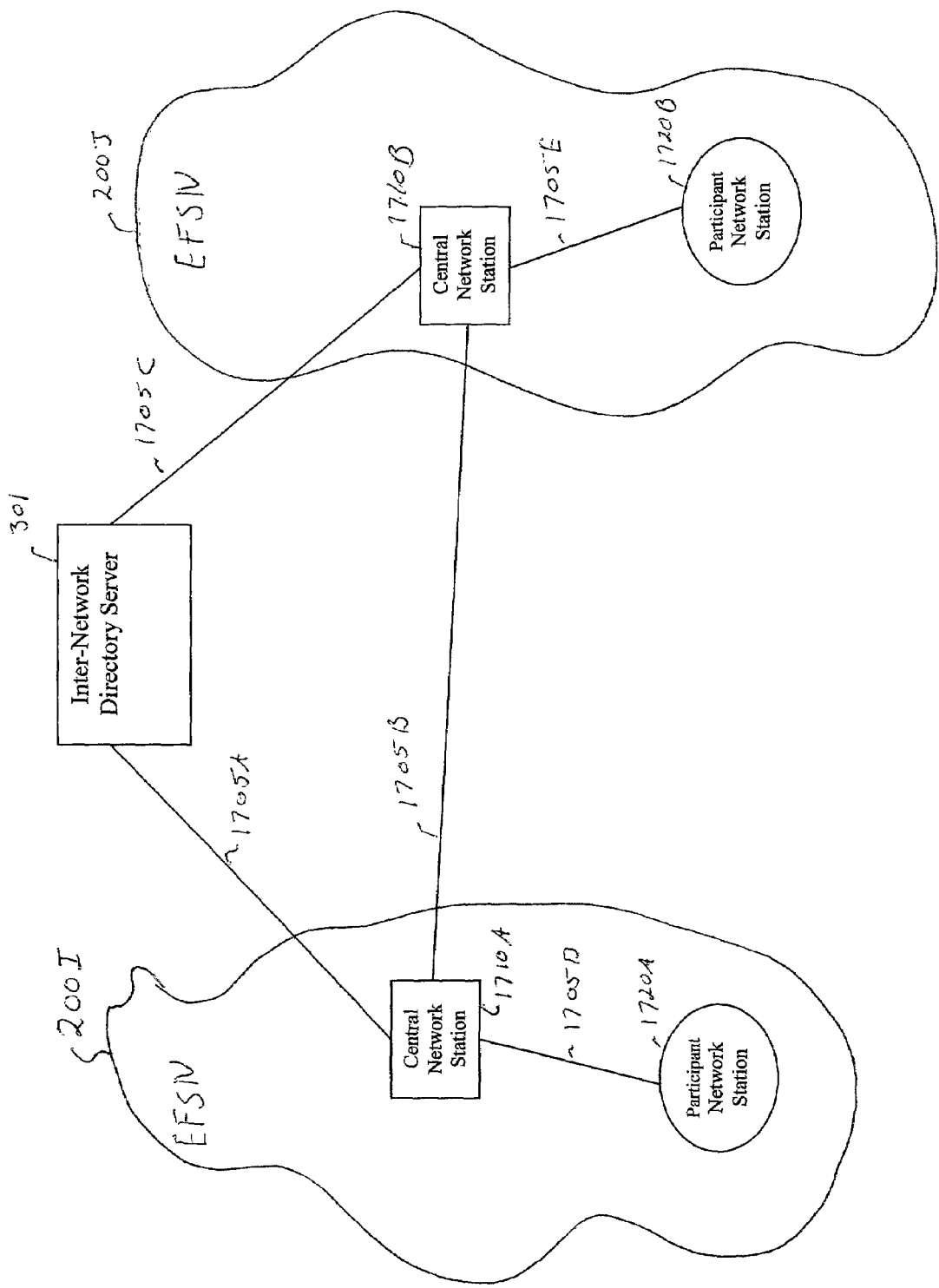
FIG. 17 is a schematic diagram of the communication links between the inter-network directory server, two central network stations, and two participant network stations in accordance with a fifth aspect of the present invention.

FIG. 17 depicts EFSN 200I in communication with the inter-network directory server 301 via communication link 1705A and in communication with EFSN 200J via communication link 1705B. FIG. 17 also depicts EFSN 200J in communication with the inter-network directory server 301 via communication link 1705C. It should be noted that CA 701 is not shown in FIG. 17 because, in this example, both EFSNs 200I and 200J do not require security. Though, it will be understood that both, or only one of, EFSN 200I and 200J could require security for inter-network transmissions. Furthermore, other devices and components, though not shown, could be present in one or both of EFSN 200I and 200J.

Also shown in FIG. 17, EFSN 200I includes a central network station 1710A which, among other capabilities, as will be understood from the discussion herein, issues P-2-P invitations and executes inter-network P-2-P payments. Also shown, EFSN 200J includes a central network station 1710B which also, among other capabilities, facilitates P-2-P invitations originating in other EFSNs and P-2-P payments originating in other EFSNs. As in the previous examples, central network stations 1710A and 1710B are shown in direct communication with the inter-network directory server 301. And, also as in the previous examples, one or more other processors and/or servers could be between a central network station and one or more of these components. Also depicted is participant network station 1720A, which is associated with customer I of EFSN 200I, in communication with central network station 1710A via communication link 1705D. Thus, EFSN 200I is the home network of customer I. Also shown is participant network station 1720B in communication with central network station 1710B via communication link 1705E. Participant network station 1720B is associated with customer J of EFSN 200J. Thus, EFSN 200J is the home network of customer J.

Figure 18A:
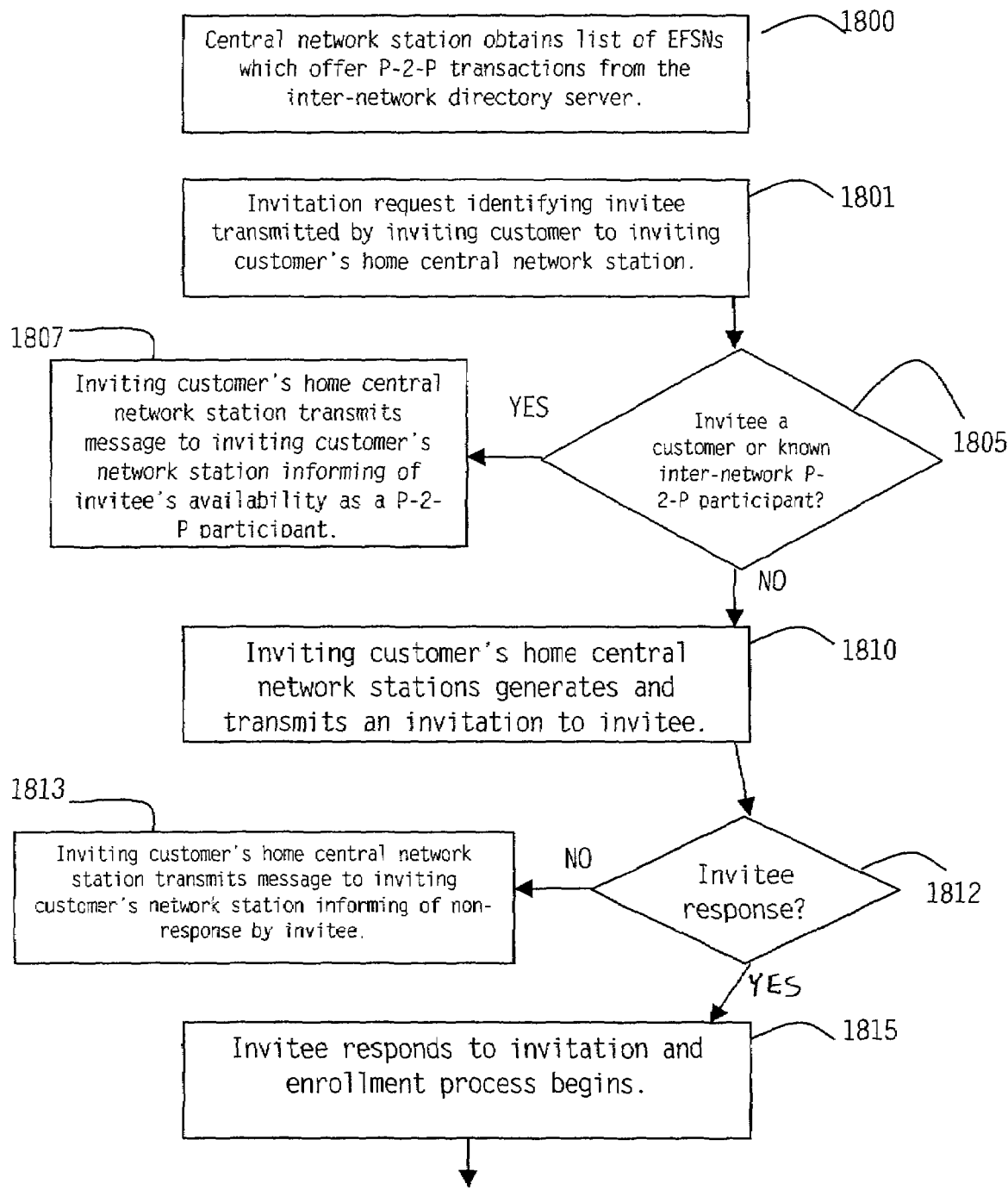
FIGS. 18A–18B are simplified flow diagrams of processing to execute an inter-network person-to-person invitation.
Figure 18B:
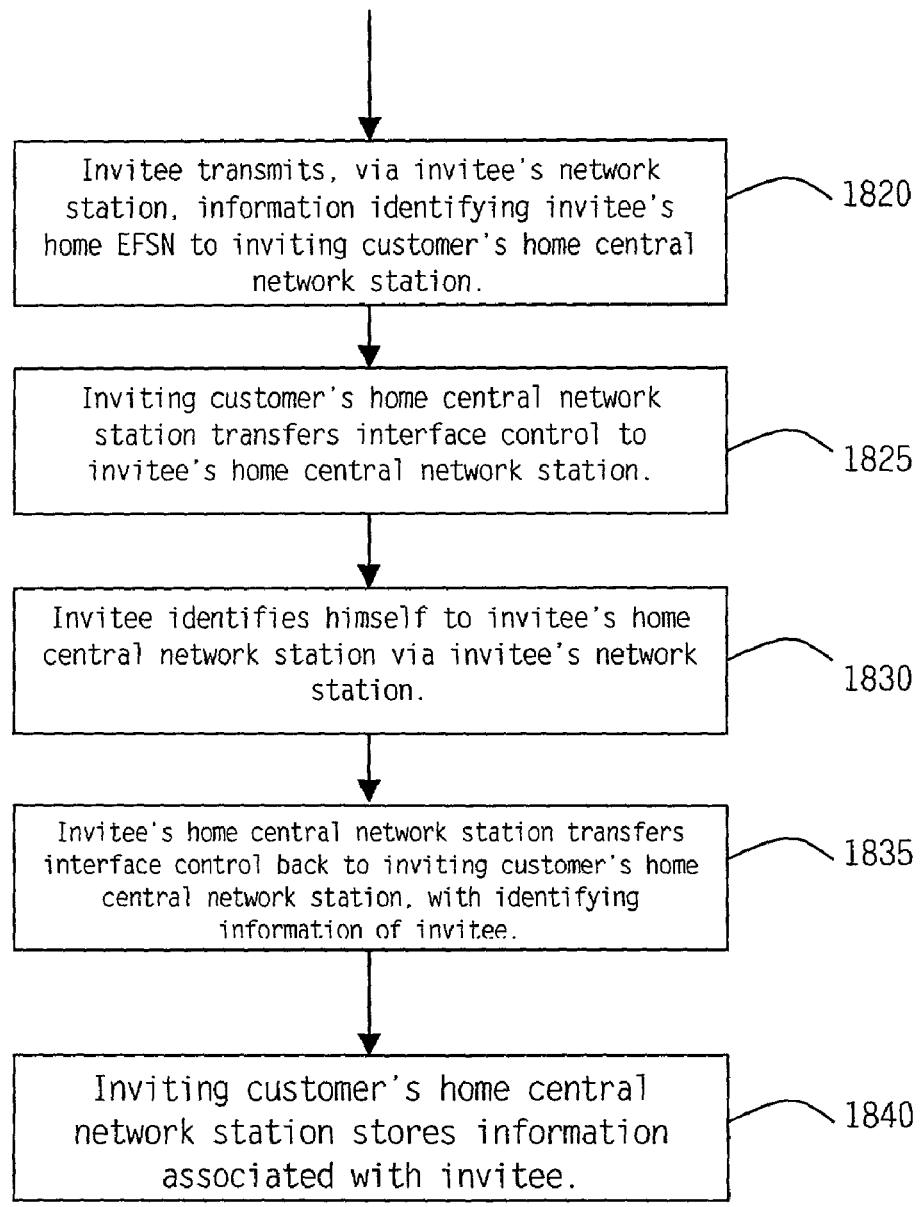

FIGS. 18A and 18B depict the operations to issue a P-2-P invitation from a customer of a first EFSN to a customer of a second EFSN. At step 1801, and via communication link 1705D, customer I transmits, utilizing participant network station 1720A, a P-2-P invitation request to central network station 1710A. This request includes information identifying an invitee, in this example, customer J. At a minimum, the information identifying the invitee is the invitee's e-mail address, though preferably the information will also include a country of residence of the invitee. At step 1805 central network station 1710A determines if the invitee is already a customer of EFSN 200I, or if customer J has previously accepted an inter-network P-2-P invitation from EFSN 200I. This can be done by determining if the received identifying information is stored in a database of customers of EFSN 200I, or a database of customers of other EFSNs who have previously accepted a P-2-P invitation from EFSN 200I. If so, at step 1807, central network station 1710A transmits a message to participant network station 1720A to inform customer I that customer J is already an available P-2-P participant. If the invitee is already a customer of EFSN 200I, and if the invitation includes an indication of funds for customer J, it will be understood that central network station 1710A performs funds transmission to customer J according to conventional P-2-P funds transfer techniques. If the invitee has previously accepted an inter-network P-2-P invitation issued by EFSN, and if the invitation includes an indication of funds, P-2-P inter-network payment will be performed as described below.

In this example, customer J is not a customer of EFSN 200I and has not previously accepted an invitation from EFSN 200I. The central network station 1710A prepares an e-mail message invitation, including a link back to central network station 1710A for customer J to become a customer of EFSN 200I, and transmits the message to the e-mail address of customer J, step 1810, as typically done in P-2-P invitation processing. It should be noted that at this point the fact that customer J is a customer of EFSN 200J is not known to central network station 1710A. If customer J chooses, customer J activates the link to central network station 1710A included in the e-mail invitation utilizing his participant network station 1720B. At step 1812, central network station determines if the invitee has responded to the invitation. This step can be taken at a predetermined time after transmission of the invitation, or at another time. If not, operations continue with step 1813. In this step, central network station 1710A transmits a message to participant network station 1720A informing customer I that customer J did respond to the invitation. This transmission can be made at a predetermined time after transmission of the invitation. At step 1815, when customer J activates the link, central network station 1710A begins an interface with customer J by transmitting an enrollment page to the participant network station 1720B associated with customer J. This transmission could be either via the World Wide Web, via an e-mail protocol, or via some other messaging protocol, though preferably it is via the World Wide Web.

The enrollment page preferably includes a section directed to those invitees who are customers of other EFSNs and do not wish to become a customer of EFSN 200I, but still wish to participant in P-2-P transactions with customers of EFSN 200I. This section includes an entry point for an invitee to enter information identifying an EFSN of which he is already a customer or a sponsor, also known as a customer service provider, that provides access to an EFSN for the invitee. It should be noted that this entry point could be in the form of a pull down menu or other selectable list. The list contains information identifying other EFSNs and sponsors that participate in inter-network person-to-person transactions, as discussed herein. The central network station presenting this list preferably obtains a list of participating EFSNs and sponsors from the inter-network directory server, as is shown in FIG. 18A at step 1800. Alternatively, the enrollment page would not include this section, but rather a link to a second enrollment page containing the described entry point.

At step 1820 customer J transmits information identifying his home EFSN, EFSN 200J, to central network station 1710A. Of course, if customer J were associated with a sponsor instead of an EFSN, the transmitted information would identify the sponsor. Central network station 1710A then transfers the interface to central network station 1710B, which is associated with the home EFSN, or sponsor, of customer J, step 1825. Customer J then identifies himself to central network station 1710B, step 1830. This identification can be any known means of identification, such as a user name and password. Upon successful identification, central network station 1710B then transfers the interface back to central network station 1710A, step 1835. At this step, central network station 1710B also transmits an identifier of customer J to central network station 1710A. Central network station 1710A then stores this identifier, along with the identifying information received from customer I. Customer J, the home EFSN, or sponsor, with which customer J is associated, as well as the unique identifier by which customer J is known to his home network, are now known by EFSN 200I, step 1840. Customers of EFSN 200I can now direct P-2-P payments to customer J. At this point, any person-to-person payment directed to customer J is initiated, as described below.

Inter-network P-2-P payments are similar to other inter-network payments described above, except the operations to locate a payee do not have to be performed, as customer J and the home EFSN with which this customer is associated are known. Central network station 1710A prepares and transmits an inter-network P-2-P payment directive message, including at least the unique identifier and payment amount, to central network station 1710B, as described above and shown in FIG. 9B. This P-2-P payment directive message is structured according to payment message subset 415 of CMS 401 criteria, and secured as described above if necessary. The person-to-person payment could fail at this point. For example, the recipient could have dropped out of the person-to-person program offered by his EFSN, or the recipient could decline the payment. In such a case, central network station 1710B transmits a message to central network station 1710A indicating unavailability of the transaction. This information is preferably propagated by central network station 1710A to customer I. As described above in inter-network payments, central network station 1710A debits an account associated with customer I, and central network station 1710B credits an account associated with customer J. Central network station 1710B also transmits a message to participant network station 1720B informing customer J of the credit and the identity of the party making initiating the payment. It should be noted that the account associated with customer J could be a different type account than that associated with customer I. Therein after, settlement between the participating EFSNs is performed, as described above. It will be appreciated that currency conversion, if necessary, is performed as described above in relation to international inter-network payments. Furthermore, for future dated inter-network P-2-P payments, the payments are warehoused by the home EFSN of the payer until the date for their execution has arrived.

International Inter-Network Person-to-Person Invitations

Discussed above, typically an EFSN located in a given country cannot facilitate payments in a currency other than the currency of that country. Also discussed above, the present invention enables inter-network international payments. The present invention also enables international P-2-P invitations and payments.

Figure 19:
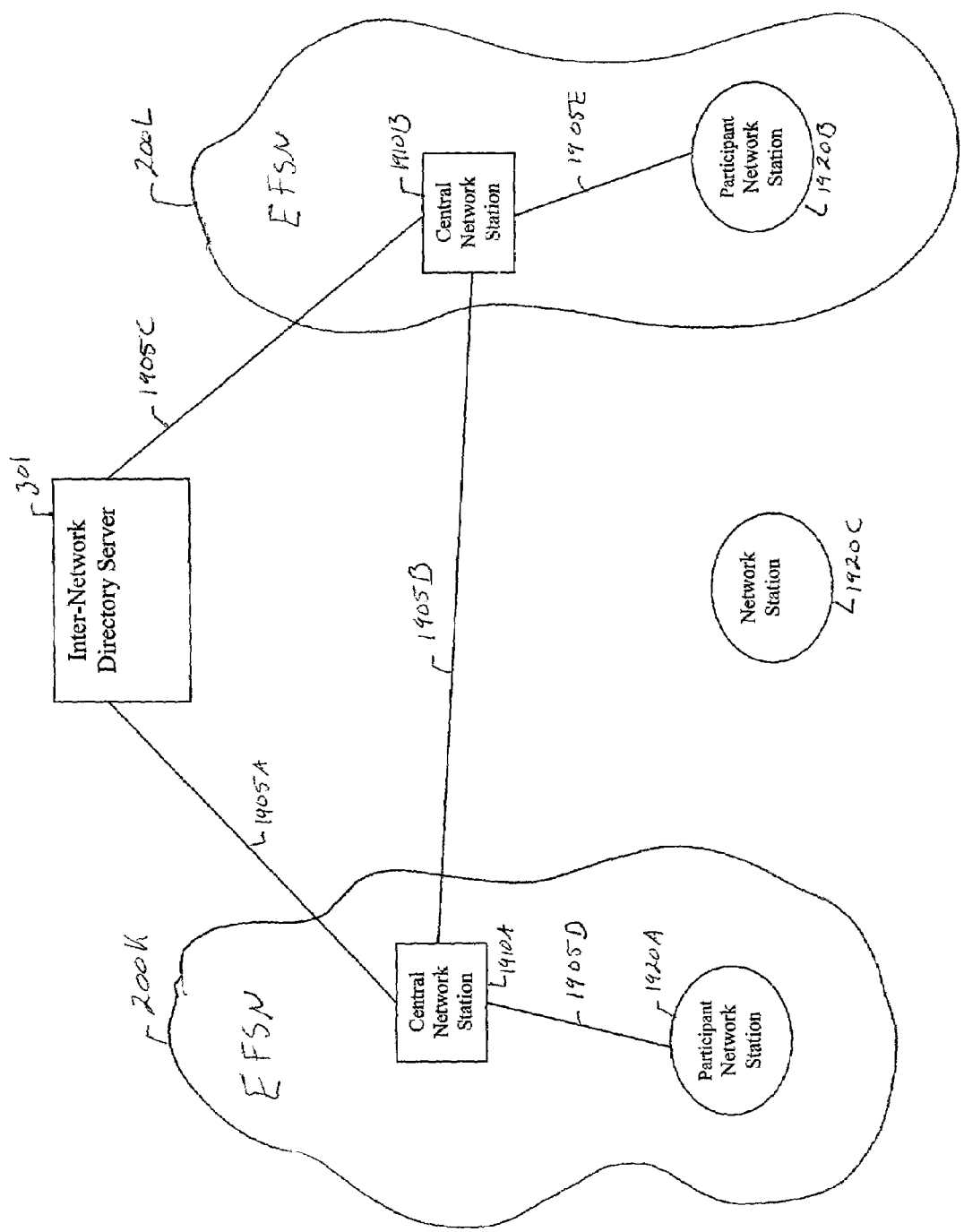
FIG. 19 is a schematic diagram of the communication links between the inter-network directory server, two central network stations, two participant network stations, and a network station unassociated with any electronic financial service network in accordance with a sixth aspect of the present invention.

As shown in FIG. 19, EFSN 200K is in communication with the inter-network directory server 301 via communication link 1905A and in communication with EFSN 200L via communication link 1905B. FIG. 19 also depicts EFSN 200L in communication with the inter-network directory server 301 via communication link 1905C. It should be noted that CA 701 is not shown in FIG. 19 because, in this example, both EFSNs 200K and 200L do not require security. Though, it will be understood that both, or only one of, EFSN 200K and 200L could require security for inter-network transmissions. Though not shown, other components and devices could be present in one or both of EFSN 200K and EFSN 200L.

Also shown in FIG. 19, EFSN 200K includes a central network station 1910A which, among other capabilities, as will be understood from the discussion herein, issues P-2-P invitations and executes inter-network P-2-P payments. Also shown, EFSN 200L includes a central network station 1910B which also, among other capabilities, facilitates P-2-P invitations issued by other EFSNs and P-2-P payments initiated in other EFSNs. As in the previous examples, central network stations 1910A and 1910B are shown in direct communication with the inter-network directory server 301. And, also as in the previous examples, one or more other processors and/or servers could be between a central network station and one or more of these components.

Also depicted is participant network station 1920A, which is associated with customer K of EFSN 200K, in communication with central network station 1910A via communication link 1905D. Thus, EFSN 200K is the home EFSN of customer K. Also shown is participant network station 1920B in communication with central network station 1910B via communication link 1905E. Participant network station 1920B is associated with customer L of EFSN 200L. Thus, EFSN 200L is the home network of customer L. Also shown is user network station 1920C, which is not associated with an EFSN. User network station 1920C is associated with network user M. In this example, EFSN 200K is located in the United States of America, and EFSN 200L is located in South Africa.

Figure 20A:
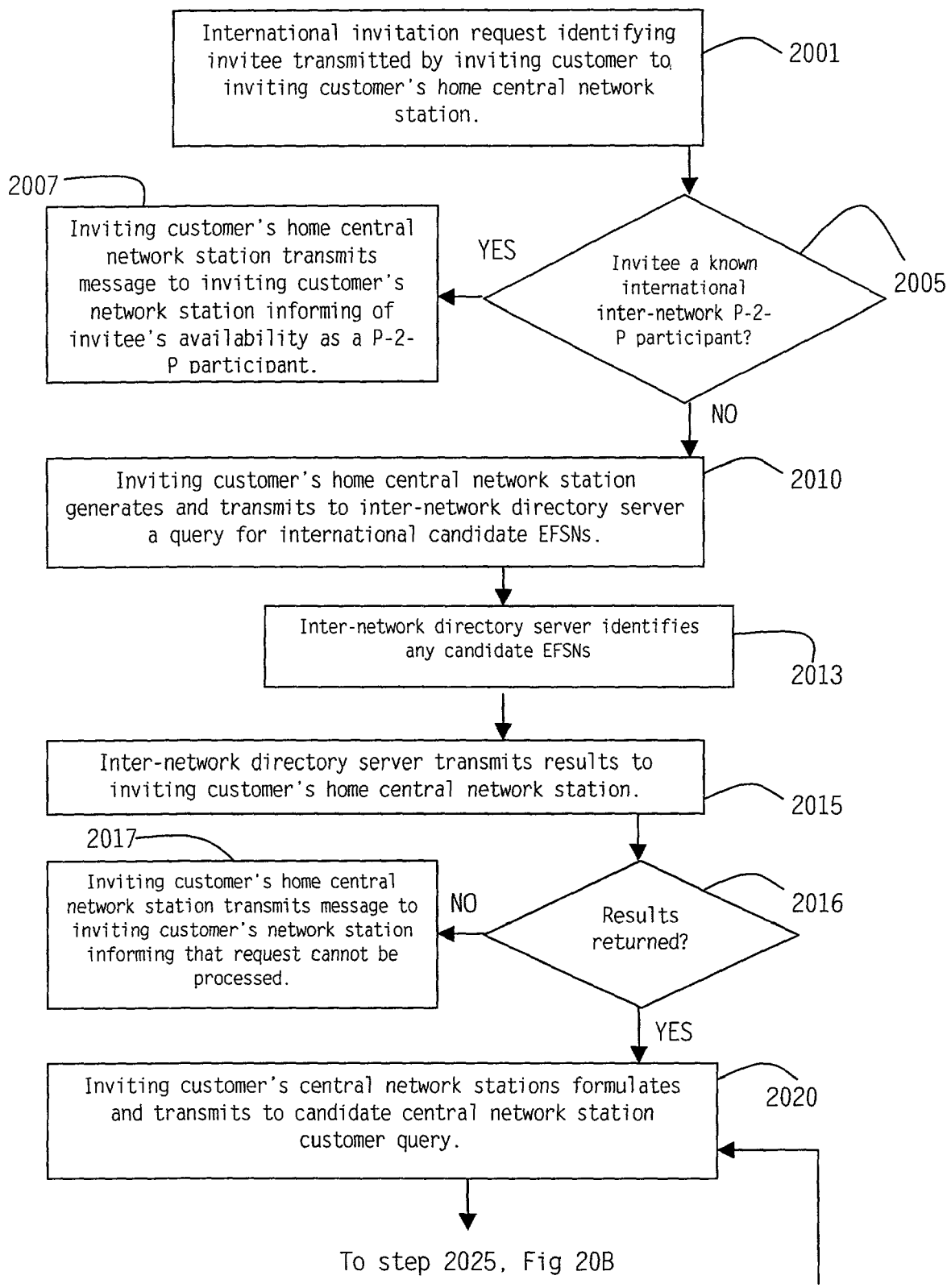
FIGS. 20A–20C are simplified flow diagrams of processing to execute an international inter-network person-to-person invitation and payment in accordance with the present invention.
Figure 20B:
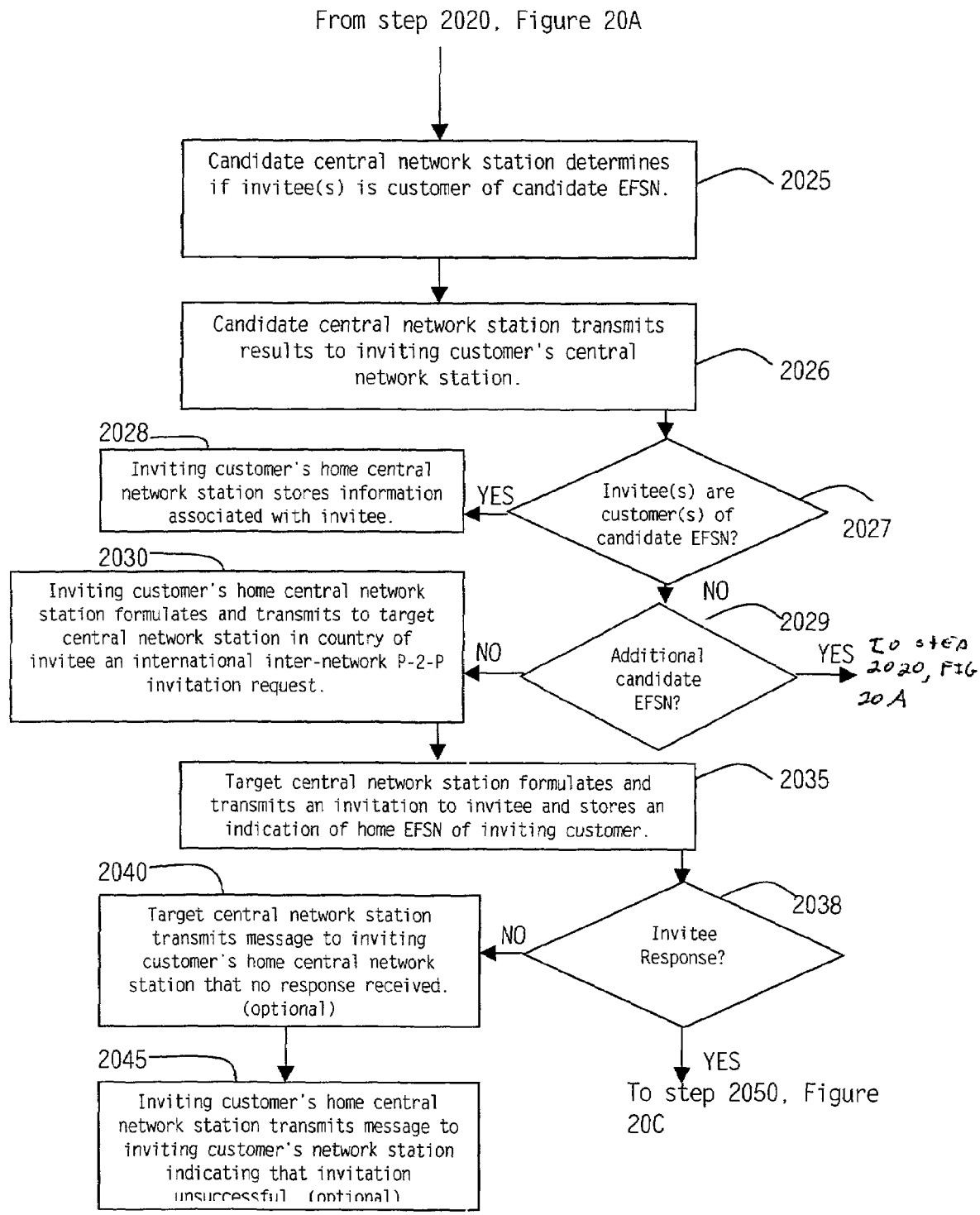
Figure 20C:
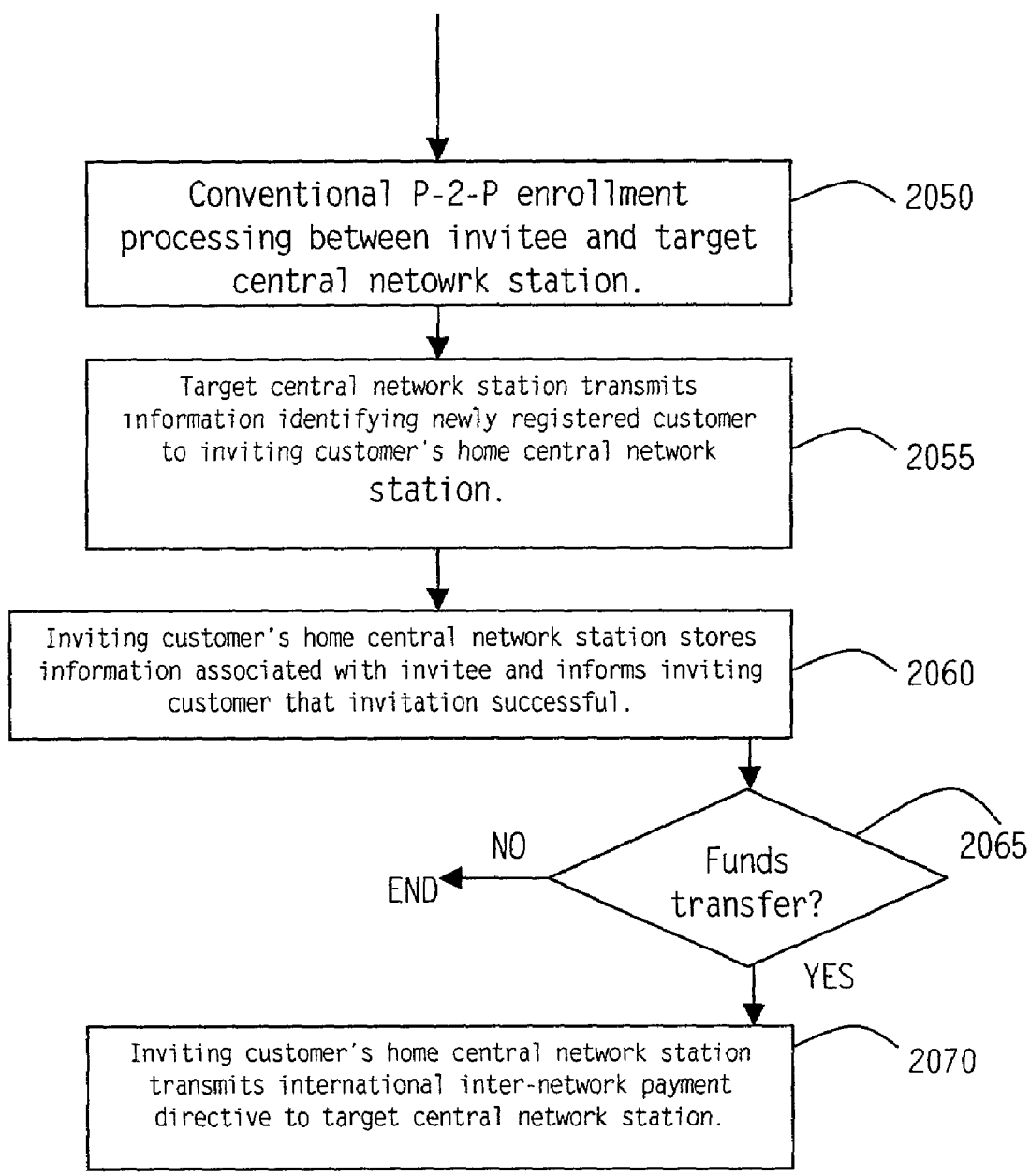

FIGS. 20A–20C depict the processing to issue an international inter-network P-2-P invitation and to make an international inter-network P-2-P payment subsequent to acceptance of an invitation. At step 2001, and via communication link 1905D, customer K transmits a P-2-P invitation request to central network station 1910A. This request includes information identifying an invitee, as described above. In should be noted that for international P-2-P invitations, the country of residence of the invitee is required to be included with a P-2-P invitation request. At step 2005 central network station 1910A determines if information identifying the invitee is stored in a list of customers of other EFSNs who have previously accepted an inter-network P-2-P invitation. If so, at step 2007, central network station 1910A transmits a message to participant network station 1920A to inform customer K that the invitee has previously accepted an invitation. In this example of international inter-network P-2-P invitation, customer K invites two invitees, customer L and user M. Both of these invitees are residents of South Africa.

At step 2010 central network station 1910A transmits a query to inter-network directory server 301 via communication link 1905A. This query is structured according to universal directory and security message set 405 criteria set forth in the CMS 401. The query is a request for the inter-network directory server 301 to identify candidate EFSNs in South Africa which offer P-2-P services. The inter-network directory server, at step 2013, identifies candidate EFSNs. At step 2015, the inter-network directory server 301 returns the results of the query to central network station 1910A via communication link 1905A, also according to the CMS 401. These results include identifiers of candidate EFSNs and identifiers of paths to electronically reach the candidate EFSNs.

In the present example, the inter-network directory server 301 returns only one candidate EFSN, EFSN 200L. However, it should be understood that multiple candidate EFSNs could be returned. Also, no candidate EFSN could be returned. At step 2016, central network station 1910A determines if any candidate EFSNs have been returned. If not, at step 2017 and via communication link 1905D, a message is transmitted to participant network station 1920A notifying customer K that the invitation cannot be processed. If candidate EFSNs have been returned, operations continue with step 2020. In this step, an inter-network P-2-P customer query is formulated, according to the CMS 401, and transmitted to the candidate EFSN, or EFSNs, by central network station 1910A. This query seeks to determine if invitees L and M are customers of the candidate EFSN. In the present example, multiple invitees are included in a single query. However, multiple queries could be transmitted instead. At step 2025 central network station 1910B, associated with the candidate EFSN, determines if the invitees are customers of the candidate network.

At step 2026, central network station 1920B transmits a return message to the originating EFSN, according to the CMS 401, indicating the results of the determination. In this example, confirming that the invitee L is a customer and that invitee M is not a customer. This return message includes the unique EFSN 200L identifier for customer L. At step 2027, central network station 1920A determines if the invitees are customers of EFSN 200L. If so, operations continue with step 2028, if not, with step 2029. At step 2029 central network station 1920A determines if additional candidate EFSNs exist. If so, operations continue with step 2020. At step 2028, central network station stores information associated with customer L. This can include a unique identifier by which customer L is known to his home EFSN. If the invitation includes a payment, an international inter-network P-2-P payment is then propagated between EFSN 200K and EFSN 200L, as will be described below.

The operations to propagate an international inter-network P-2-P invitation to a party who is not a customer of an EFSN, in this example, invitee M, continue as depicted in step 2030 of FIG. 20B. At this step, central network station 1910A formulates and transmits, via communication link 1905B an international inter-network P-2-P invitation request directed to an identified target EFSN, that supports P-2-P transactions, in the country of the invitee. In this example EFSN 200L has been identified, as described above. The request includes at least the public identifier of the inviting party, in this example customer K, and the e-mail address of the invitee. Optionally, as in all P-2-P invitations, text from the inviting party to the invitee could also be included, as well as an indication that funds are available, if a payment of some type is being made by the inviting party. Upon receipt of the request, target central network station 1910B formulates and transmits an e-mail invitation to the invitee, step 2035. Central network station also stores an indication of the originating EFSN, EFSN 200K, so enrollment/acceptance information can be propagated back to central network station 1920A. It should be understood that this invitation is an invitation to join EFSN 200L, not EFSN 200K. The invitation could include enrollment and log-in links.

At step 2038, target central network station determines if the invitee has responded to the invitation. This step can be taken at a predetermined time after transmission of the invitation to the invitee, or at another time. If the invitee has not responded to the invitation, target central network station 1910B transmits a message to central network station 1910A, via communication link 1905B, that no response has been received, step 2040. At step 2045 this information is then in turn propagated to participant network station 1920A by central network station 1920A. Steps 2040 and 2045 are optional steps.

If the invitee responds to the invitation, at step 2050, any conventional P-2-P enrollment processing is performed between EFSN 200L and invitee M. Upon successful enrollment, central network station 1910B transmits the new unique identifier for invitee, now customer, M to central network station 1910A, step 2055. At step 2060, central network station 1910A, after receiving enrollment confirmation from central network station 1910B, stores information associated with the invitee and informs customer K that the invitation was accepted. At step 2065 central network station 1910A determines if the initial invitation request from customer K included an indication of a funds transfer of some type. If not, operations end. If so, central network station 1910A transmits a P-2-P payment directive to central network station 1910B via communication link 1905B, step 2070. Central network station 1910B then transfers funds to an account associated with customer M, step 2065. Central network station 1910A could obtain funds from an account associated with customer K at any time, including upon receipt of the invitation request from customer K, and up to and including receipt of enrollment confirmation from central processor 1910B. It will be understood that currency conversion and international funds settlement, discussed above, will also be performed, though not depicted in FIG. 20C.

Inter-Network Payment-on-Delivery

Introduced above, some EFSNs offer payment-on-delivery services. The present invention facilitates performance of such transactions across and among EFSNs. Introduced above, the inter-network directory server 301 stores information related to EFSNs. This information includes information identifying if a given EFSN supports payment-on-delivery transactions. Thus, the directory can be searched for not only candidate networks, but also for candidate networks which provide payment-on-delivery functionality.

Figure 10:
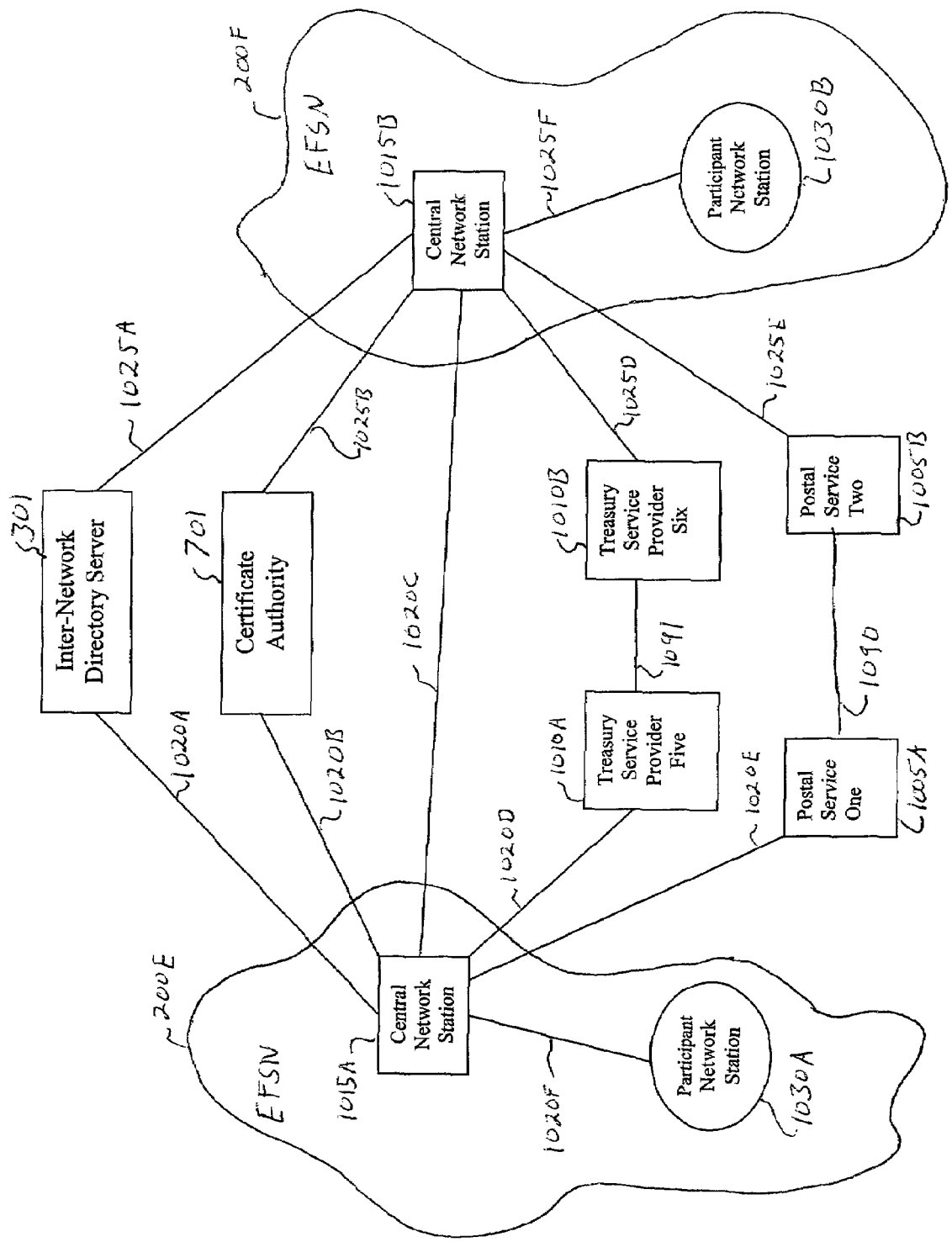
FIG. 10 is a schematic diagram of the communication links between the inter-network directory server, optional certificate authority, two central network stations, two treasury service providers, two participant network stations, and two postal services in accordance with a third aspect of the present invention.

FIG. 10 depicts two EFSNs, EFSN 200E and EFSN 200F, and postal services with which each is associated. EFSN 200E is associated with postal service one (PS) 1005A and EFSN 200F is associated with PS two 1005B. Also shown are the inter-network directory server 301, CA 701, TSP five 1010A, TSP six 1010B, central network station 1015B, and central network station 1015B. Central network station 1015B communicates with the inter-network directory server 301 via communication link 1020A, with the CA 701 via communication link 1020B, with central network station 1015B via communication link 1020C, with TSP five 1010A via communication link 1020D, and with PS one 1005A via communication link 1020E. Central network station 1015B communicates with the inter-network directory server 301 via communication link 1025A, with the CA 701 via communication link 1025B, with central network station 1015B via communication link 1020C, with TSP six 1010B via communication link 1025D, and with PS two 1005A via communication link 1025E. PS one 1005A and PS two 1005B communicate via link 1090, which could be part of an existing network. The two TSPs communicate via link 1091, which also could be part of an existing network.

In the following example, customer G is a customer of EFSN 200E, and customer H is a customer of EFSN 200F. It will be understood that each customer communicates with a respective central network station by way of a participant network station. Customer G is associated with participant network station 1030A, which communicates with central network station 1015A via communication link 1020F. Customer H is associated with participant network station 1030B, which communicates with central network station 1015B via communication link 1025F. Customer G is the purchaser/payer in this example, and customer H is the seller/payee. The purchase could arise from a networked transaction, such as an on-line auction or an on-line retail sale, or the purchase could arise otherwise. The parties to the transaction, customers G and H, negotiate the terms of the sale. That is, the purchase price and that the determination that payment will be made upon delivery. Customer H provides a delivery address to customer G, and preferably customer H's unique identifier and EFSN or sponsor identifier. Though, it will be appreciated that the unique identifier and EFSN or sponsor identifier may not be provided. In such a case, the payee locate functionality described earlier will be utilized to 'find' customer H. In this example, each of the address, the unique identifier, and the EFSN or sponsor identifier are provided by customer H. Customer G transmits a payment-on-delivery directive including this information to central network station 1015B. Central network station then debits an account associated with customer G. The corresponding credit to this debit is directed to an account associated with EFSN 200E. As will be understood from the discussion above, the EFSN 200E account is maintained at TSP five 1010A. Central network station 1015B also generates an inter-network payment-on-delivery notification message directed to central network station 1015B. This message is structured according to the payment-on-delivery message subset 425 of the CMS 401 criteria, and is secured if necessary. This message includes an indication that a payment-on-delivery transaction is in process and identifies customer H as the seller. When funds from the customer G account are deposited into the EFSN 200E account, central network station 1015B generates an inter-network funds-availability message directed to central network station 1015B. This message also is structured according to payment-on-delivery message subset 425 criteria, and secured if necessary. This message informs central network station 1015B that funds are now available and that customer H should be notified to ship the goods to customer G. If customer G has not previously provided a shipping address to customer H, this message also includes a shipping address. Central network station 1015B then notifies customer H that the goods should be shipped.

Customer H delivers packaged goods to PS TWO 1005B. This package is assigned a unique package identifier. Central network station 1015B is made aware of the unique identifier, either by PS two 1005B or customer H. The package is delivered to customer G. It will be appreciated that this delivery could be made by PS two 1005B alone. However, if PS two 1005B is not able to deliver to the shipping address provided by customer G, PS two 1005B will deliver the package to PS one 1005A. Then, PS one 1005A will deliver the package to customer G.

For delivery to customer G by PS two 1005B, whenever the package is delivered, PS two 1005B transmits a 'completed delivery' notification to central network station 1015B. When delivery involves both PS one 1005A and PS two 1005B, two delivery notifications are generated. When PS two 1005B delivers the package to PS one 1005A, PS two 1005B transmits an 'in-process delivery' notification to central network station 1015B. Then, when PS one 1005A delivers the package to customer G, PS one 1005A transmits a 'completed delivery' notification to PS two 1005A, who in turn transmits a 'completed delivery' notification to central network station 1015B.

Alternatively, if the two postal services cannot communicate, other processing is supported by the present invention to ensure notification of delivery, to central network station 1015B. In this alternative, central network station 1015B transmits the unique package identifier to central network station 1015A upon receipt of the unique identifier. PS one provides 'completed delivery' information to central network station 1015A. Then, central station 1015A propagates the 'completed delivery' information to central network station 1015B. Upon receipt of the 'completed delivery' notification, central network station 1015B transmits an indication to central network station 1015A that the goods have been delivered. When central network station 1015A receives such a message, it generates and transmits an inter-network payment directive to central network station 1015B, as described above in "INTER-NETWORK PAYMENTS". Payment is then made to customer H, also as described above, by central network station 1015B.

In an alternate payment-on-delivery scenario, funds are not released until the purchaser approves the goods instead of upon notification by a PS. For example, customer G, if the packaged goods are found acceptable, transmits a 'package acceptance' message to central network station 1015A. This message preferably includes the unique package identifier for event tracking. When central network station 1015A receives such a message, it generates and transmits an inter-network payment directive to central network station 1015B, as described above in "INTER-NETWORK PAYMENTS". Payment is then made to customer H, also as described above, by central network station 1015B.

If customer G finds the packaged goods not acceptable, customer G transmits a 'package not accepted' message to central network station 1015A. Central network station 1015A then generates an inter-network 'package return' message and transmits it to central network station 1015B. As with all inter-network messages between central network stations, this message is structured according to payment on delivery message subset 425 criteria, and is secured if necessary. Central network station 1015B in turn notifies customer H that the goods are being returned.

Customer G ships the goods to customer H using PS one 1005A. This return package is assigned a unique identifier. Central network station 1015A in made aware of this unique identifier. This identifier may also be propagated to central network station 1015B. Upon return delivery of the return package to customer H, PS one 1005A transmits a notice to central network station 1015B that the return package has been delivered. Of course, if PS two 1005B must assist in delivery of the return package, PS two 1005B notifies PS one 1005A when the packaged goods are delivered to customer H. Upon receipt of the return package, customer H notifies central network station 1015B that the goods have been returned.

Central network station 1015B generates an inter-network 'goods returned' message and transmits this message to central network station 1015A, according to payment-on-delivery message subset 425 criteria, and secured if necessary. Central network station 1015A then credits funds back to the customer G account, as will be understood from the discussion above.

It will also be recognized by those skilled in the art that, while the invention has been described above in terms of one or more preferred embodiments, it is not limited thereto. Various features and aspects of the above-described invention may be used individually or jointly. Further, although the invention has been described in the context of its implementation in a particular environment and for particular purposes, e.g. inter-network operability in providing and/or facilitating financial services and/or transactions, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

We claim:

1. A method for making payments across multiple payment networks including a first payment network having a first payment service provider and a plurality of associated payers and payees, and a second payment network having a second payment service provider and a plurality of associated payers and payees, comprising:
   receiving, at a first payment service provider, a request to make a payment on behalf of a payer to a payee not associated with the first payment network;
   transmitting a request of the first payment service provider to determine a payment network within the multiple payment networks with which the payee is associated;
   receiving information indicating that the payee is associated with the second payment network; and
   transmitting a payment instruction from the first payment service provider to the second payment service provider to make the payment to the payee wherein the request to determine a payment network is transmitted to an inter-network directory provider.

2. The method of claim 1, wherein:
   the received information includes a unique identifier which identifies the payee to the second payment service provider; and
   the transmitted payment instruction includes the unique identifier.

3. The method of claim 2, wherein the request to make a payment on behalf of the payer to the payee is a first request to make a first payment to the payee, and the payment instruction is a first payment instruction, and further comprising:
   storing the received information indicating that the payee is associated with the second payment network, the stored information including the received unique identifier;
   receiving, at the first payment service provider, a second request to make a second payment to the payee;
   retrieving the stored information indicating that the payee is associated with the second payment network;
   transmitting a second payment instruction, including the retrieved unique identifier, from the first payment service provider to the second payment service provider to make the second payment to the payee.

4. The method of claim 3, wherein:
   the first request is a request to make a payment on behalf of a first payer; and
   the second request is a request to make a payment on behalf of one of the first payer or a second payer.

5. The method of claim 1, further comprising:
   identifying one or more of the multiple payment networks as candidate payment networks with which the payee may be associated based upon the transmitted request;
   transmitting information, by the inter-network directory provider, indicating the one or more identified candidate payment networks to the first payment service provider;
   wherein the transmitted information indicating the one or more identified candidate payment networks includes information identifying the second payment network as a candidate payment network.

6. The method of claim 5, further comprising:
   transmitting a request to the second payment service provider to determine if the payee is associated with the second payment network;
   wherein the received information indicating that the payee is associated with the second payment network is received from the second payment service provider in response to the transmitted request to determine if the payee is associated with the second payment network.

7. The method of claim 6, wherein the received information indicating that the payee is associated with the second payment network includes information identifying the payee as one candidate payee and at least one other payee as another candidate payee associated with the second payment network, and further comprising:

identifying, by the second payment service provider, the payee as a candidate payee and the at least one other payee as another candidate payee based upon the received request; and determining, prior to transmitting the payment instruction, that the one candidate payee, and not the at least one other candidate payee, is the payee based upon at least one of 1) information included in the request transmitted to the second payment service provider, and 2) received information identifying the one and the at least one other candidate payees.

8. The method of claim 7, wherein the payer is associated with the first payment network, the request to make a payment on behalf of the payer is received from the payer, and the determination that the one candidate payee is the payee is made by the payer, further comprising:

transmitting the received information identifying the one and the at least one other candidate payees to the payer; and receiving, at the first payment service provider, the determination that the one candidate payee is the payee from the payer.

9. The method of claim 7, wherein the determination that the one candidate payee is the payee is made by the first payment service provider.

10. The method of claim 6, wherein the received information from the inter-network directory provider further includes information identifying a third payment network as a candidate payment network, and further comprising:

transmitting a request to a third payment service provider associated with the third payment network to determine if the payee is associated with the third payment service network;

determining that the payee is not associated with the third payment service network responsive to the request to the third payment service provider; and transmitting the result of the determination by the third payment service provider to the first payment service provider.

11. The method of claim 6, wherein the received information from the inter-network directory provider includes information indicating that the second payment service provider requires secured communications, further comprising:

accessing a certificate authority to retrieve an encryption key associated with the second payment service provider; and encrypting the request transmitted to the second payment service provider with the encryption key prior to transmission of the request.

12. The method of claim 6, wherein the received information indicating that the payee is associated with the second payment network is a positive declaration that the payee is associated with the second payment network.

13. The method of claim 1, wherein:

the inter-network directory provider stores information associated with each of the multiple payment networks and information indicating a network path over which to communicate with a certificate authority; and the information associated with each of the multiple payment networks includes at least one of 1) information indicating a country in which a payment service provider associated with that payment service network is located, 2) information identifying a network path over which to communicate with the associated payment service provider, 3) information indicating types of financial transactions supported by the associated payment service provider, 4) information indicating secured communications requirements of the associated payment service provider, 5) information identifying a treasury service provider associated with the associated payment service provider, 6) information identifying a deposit account associated with the associated payment service provider, 7) information identifying a processing model associated with the associated payment service provider, 8) and information identifying a settlement method associated with the associated payment service provider.

14. The method of claim 13, wherein the information stored by the inter-network directory provider is accessed and searched by the first payment service provider.

15. The method of claim 13, wherein the information stored by the inter-network directory provider is downloaded and searched by the first payment service provider.

16. The method of claim 1, wherein the inter-network directory provider stores information for each of the multiple payment networks indicating associations between its payment service provider and its payees, and the received information indicating that the payee is associated with the second payment network is received from the inter-network directory provider and is a positive determination that the payee is associated with the second payment network, further comprising:

determining, by the inter-network directory provider, the payment network with which the payee is associated based upon the transmitted request and the stored information.

17. The method of claim 1, wherein the request to determine the payment network with which the payee is associated is transmitted to the second payment service provider, and the received information indicating that the payee is associated with the second payment network is received from the second payment service provider.

18. The method of claim 1, wherein:

the request to make the payment on behalf of the payer is received from a third payment service provider; and the payer and the third payment service provider are associated with a third payment network.

19. The method of claim 1, wherein the payment is one of a payment of a bill, a payment of an invoice, a gift payment, a person-to-merchant payment, or a person-to-person payment.

20. The method of 1, wherein:

the request to make the payment is structured according to a first message set; and the request to determine the payment network with which the payee is associated, the information indicating that the payee is associated with the second payment network, and the payment instruction are each structured according to a second message set different than the first message set.

21. The method of claim 1, further comprising:
transferring funds from an account associated with the payer to an account associated with the first payment service provider;
transferring funds from an account associated with the first payment service provider to an account associated with the second payment service provider; and
transferring funds from an account associated with the second payment service provider to an account associated with the payee.

22. The method of claim 21, wherein at least one of 1) the transfer of funds from the account associated with the payer to an account associated with the first payment service provider, 2) the transfer of funds from an account associated with the second payment service provider to the account associated with the payee, and 3) the transfer of funds from an account associated with the first payment service provider to an account associated with the second payment service provider is an electronic funds transfer.

23. The method of claim 1, further comprising:
transmitting remittance advice associated with the payment from the first payment service provider to the second payment service provider; and
transmitting the remittance advice associated with the payment from the second payment service provider to the payee.

24. The method of claim 23, wherein:
the remittance advice transmitted from first payment service provider to the second payment service provider is structured according to a first message set; and
the remittance advice transmitted from the second payment service provider to the payee is structured according to a second message set different than the first message set.

25. The method of claim 1, further comprising:
determining, at the second payment service provider, if the payment instruction will be accepted;
transmitting the results of the determination to the first payment service provider; and
transmitting the received results of the determination to the payer.

26. A system for making payments across multiple payment networks including a first payment network having a plurality of associated payers and payees, and a second payment network having a plurality of associated payers and payees, comprising:
a first payment processing station associated with the first payment network configured to 1) receive a request to make a payment on behalf of a payer to a payee not associated with the first payment network, 2) to transmit a request to determine a payment network within the multiple payment networks with which the payee is associated, 3) to receive information indicating that the payee is associated with the second payment network, and 4) to transmit a payment instruction to the second payment network to make the payment to the payee; and
a second payment processing station associated with the second payment network and configured to receive the transmitted payment instruction an inter-ntework directory station configured to receive the transmitted request to determine the payment network with which the payee is associated.

27. The system of claim 26, wherein:
the received information includes a unique identifier which identifies the payee to the second payment processing station; and
the transmitted payment instruction includes the unique identifier.

28. The system of claim 27, wherein:
the request to make a payment on behalf of the payer to the payee is a first request to make a payment to the payee;
the payment instruction is a first payment instruction;
the first payment processing station is further configured to 1) store the received information indicating that the payee is associated with the second payment network, including the unique identifier, 2) receive a second request to make a second payment to the payee, 3) retrieve the stored information indicating that the payee is associated with the second payment network, 4) transmit a second payment instruction, including the retrieved unique identifier, to the second payment network; and
the second payment processing station is further configured to receive the second payment instruction.

29. The system of claim 28, wherein:
the first request is a request to make a payment on behalf of a first payer; and
the second request is a request to make a payment on behalf of one of the first payer or a second payer.

30. The system of claim 26, wherein:
the inter-network directory station is further configured to identify one or more of the multiple payment networks as candidate payment networks with which the payee may be associated based upon the transmitted request, and to transmit information indicating the one or more identified candidate payment networks to the first payment network;
the first payment processing station is further configured to receive the information indicating the one or more identified candidate payment network; and
the information indicating the one or more identified candidate payment networks includes information identifying the second payment network as a candidate payment network.

31. The system of claim 30, wherein:
the first payment processing station is further configured to transmit a request to the second payment network to determine if the payee is associated with the second payment network; and
the second payment processing station is further configured to receive the transmitted request and to transmit the information indicating that the payee is associated with the second payment network.

32. The system of claim 31, wherein:
the received information indicating that the payee is associated with the second payment network includes information identifying the payee as one candidate payee and at least one other payee as another candidate payee associated with the second payment network;
the second payment processing station is further configured to identify the payee as a candidate payee and the at least one other payee as another candidate payee based upon the received request, and to transmit the information identifying the one candidate payee and the at least one other candidate payee to the first payment network; and
the first payment processing station is further configured to receive the transmitted information identifying the one candidate payee and the at least one other candidate payee.

33. The system of claim 32, further comprising:
a payer network station associated with the first payment network and configured to transmit, via the network, the payment request to the first payment processing station;
wherein the first payment processing station is further configured to transmit, via the network, the received information identifying the one candidate payee and the at least one other candidate payee to the payer network station;
wherein the payer network station is further configured to receive the transmitted information and to transmit a payer selection of the payee from the information identifying the one candidate payee and the at least one other candidate payee to the first payment processing station.

34. The system of claim 32, wherein:
the first payment processing station is further configured to determine, prior to transmitting the payment instruction, that the one candidate payee, and not the at least one other candidate payee, is the payee based upon at least one of 1) information included in the request transmitted to the second payment processing station, and 2) the received information identifying the one and the at least one other candidate payees.

35. The system of claim 31, wherein the received information from the inter-network directory station further includes information identifying a third payment network as a candidate payment network, further comprising:
a third payment processing station associated with the third payment network;
wherein the first payment processing station is further configured to transmit a request to the third payment network to determine if the payee is associated with the third payment network and to receive results of the determination of if the payee is associated with the third payment network;
wherein the third payment processing station is configured to receive the request transmitted to the third payment network, to determine if the payee is associated with the third payment network, and to transmit, the results of the determination; and
wherein the results of the determination are that the payee is not associated with the third payment network.

36. The system of claim 31, further comprising:
a certificate authority configured to store a plurality of encryption keys, each associated with one of a plurality of payment processing stations;
wherein the information received from the inter-network directory station includes information indicating that the second payment processing station requires secured communications;
wherein the first payment processing station is further configured to access the certificate authority to retrieve an encryption key associated with the second payment processing station and to encrypt the request with the encryption key prior to transmission of the request.

37. The system of claim 31, wherein:
the received information indicating that the payee is associated with the second payment network is a positive declaration that the payee is associated with the second payment network.

38. The system of claim 26, wherein:
the inter-network directory station is further configured to store information associated with each of the multiple payment networks and information indicating a network path over which to communicate with a certificate authority;
the information associated with each of the multiple payment networks includes at least one of 1) information indicating a country in which a payment processing station associated with that payment network is located, 2) information identifying a network path over which to communicate with the associated payment processing station, 3) information indicating types of financial transactions supported by the associated payment processing station, 4) information indicating secured communications requirements of the associated payment processing station, 5) information identifying a treasury service provider associated with the associated payment processing station, 6) information identifying a deposit account associated with the associated payment processing station, 7) information identifying a processing model associated with the associated payment processing station, 8) and information identifying a settlement method associated with the associated payment processing station.

39. The system of claim 38, wherein:
the inter-network directory station is further configured such that the stored information is accessed and searched by the first payment processing station.

40. The system of claim 38, wherein:
the inter-network directory station is further configured such that the stored information is downloaded and searched by the first payment processing station.

41. The system of claim 26, wherein:
the received information indicating that the payee is associated with the second payment network is received from the inter-network directory station and is a positive determination that the payee is associated with the second payment network; and
the inter-network directory station is further configured to store information for each of the multiple payment networks indicating associations between its payment processing station and it payees, and to determine the payment network with which the payee is associated based upon the transmitted request and the stored information.

42. The system of claim 26, wherein:
the request to determine the payment network with which the payee is associated is transmitted to the second payment network;
the received information indicating that the payee is associated with the second payment network is received from the second payment processing station;
the second payment processing station is further configured to determine if the payee is associated with the second payment network based upon the received request.

43. The system of claim 26, further comprising:
a third payment processing station associated with a third payment network;
wherein the request to make a payment on behalf of the payer is received from the third payment processing station; and
the payer is associated with the third payment network.

44. The system of claim 26, wherein the payment is one of a payment of a bill, a payment of an invoice, a gift payment, a person-to-merchant, or a person-to-person payment.

45. The system of 26, wherein:

the request to make the payment is structured according to a first message set;

the request to determine the payment network with which the payee is associated, the information indicating that the payee is associated with the second payment network, and the payment instruction are each structured according to a second message set different than the first message set.

46. The system of claim 26, wherein:

the first payment processing station is further configured to cause funds to be transferred from an account associated with the payer to an account associated with the first payment processing station and to cause funds to be transferred from an account associated with the first payment processing station to an account associated with the second payment processing station; and the second payment processing station is further configured to cause funds to be transferred from an account associated with the second payment processing station to an account associated with the payee.

47. The system of claim 46, wherein and least one of 1) the transfer of funds from the account associated with the payer to an account associated with the first payment processing station, 2) the transfer of funds from an account associated with the first payment processing station to an account associated with the second payment processing station, and 3) the transfer of funds from an account associated with the second payment processing station to the account associated with the payee is an electronic funds transfer.

48. The system of claim 26, further comprising:

a payee network station associated with the second payment network;

wherein the first payment processing station is further configured to transmit remittance advice associated with the payment to the second payment network; and wherein the second payment processing station is further configured to receive the transmitted remittance advice and to further transmit the remittance advice to the payee network station.

49. The method of claim 48, wherein:

the remittance advice transmitted from first payment processing station to the second payment network is structured according to a first message set; and the remittance advice transmitted from the second payment processing station to the payee network station is structured according to a second message set different than the first message set.

50. The method of claim 26, wherein:

the second payment processing station is further configured to determine if the payment instruction will be accepted for execution, and to transmit the results of the determination to the first payment network; and the first payment processing station is further configured to receive transmitted results and to propagate the results to the payer.

* * * * *